(12) United States Patent
Ban

(10) Patent No.: US 10,097,494 B2
(45) Date of Patent: Oct. 9, 2018

(54) APPARATUS AND METHOD FOR PROVIDING INFORMATION

(71) Applicant: SAMSUNG ELECTRONICS CO., LTD., Suwon-si (KR)

(72) Inventor: Dae-hyun Ban, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/813,673

(22) Filed: Jul. 30, 2015

(65) Prior Publication Data
US 2016/0036751 A1 Feb. 4, 2016

(30) Foreign Application Priority Data

Jul. 31, 2014 (KR) .................. 10-2014-0098633
Feb. 13, 2015 (KR) .................. 10-2015-0022720
Mar. 31, 2015 (KR) .................. 10-2015-0044996

(51) Int. Cl.
| H04W 4/00 | (2018.01) |
| H04L 12/58 | (2006.01) |
| H04W 4/60 | (2018.01) |
| H04W 4/02 | (2018.01) |
| H04W 4/14 | (2009.01) |
| H04M 1/725 | (2006.01) |
(Continued)

(52) U.S. Cl.
CPC .......... H04L 51/20 (2013.01); G06F 17/3087 (2013.01); H04L 51/046 (2013.01); H04L 51/18 (2013.01); H04M 1/72552 (2013.01); H04M 3/42 (2013.01); H04W 4/003 (2013.01); H04W 4/023 (2013.01); H04W 4/14 (2013.01); H04W 4/60 (2018.02); H04W 88/02 (2013.01)

(58) Field of Classification Search
CPC ...... H04W 4/12; H04W 4/02; H04L 12/5895; H04L 29/08108; H04L 29/08756; H04L 29/08657; H04M 3/533; H04M 2207/18
USPC ... 455/412.1, 412.2, 413, 414.1, 414.2, 415, 455/466, 456.1, 456.3, 457
See application file for complete search history.

(56) References Cited

U.S. PATENT DOCUMENTS

2007/0088687 A1 4/2007 Bromm et al.
2008/0201434 A1 8/2008 Holmes et al.
(Continued)

FOREIGN PATENT DOCUMENTS

CN 101611398 A 12/2009
CN 102760174 A 10/2012
(Continued)

OTHER PUBLICATIONS

International Search Report [PCT/ISA/210] dated Nov. 11, 2015, issued in counterpart International Application No. PCT/KR2015/007866.
(Continued)

*Primary Examiner* — Dai A Phuong
(74) *Attorney, Agent, or Firm* — Sughrue Mion, PLLC

(57) ABSTRACT

An electronic apparatus includes a display configured to display one or more messages in response to an execution of an application for exchanging the one or more messages between the electronic apparatus and another electronic apparatus; and a processor configured to extract a keyword from the one or more messages for processing a search query by using the keyword and location information of the electronic apparatus.

21 Claims, 88 Drawing Sheets

(51) Int. Cl.
  *H04M 3/42* (2006.01)
  *G06F 17/30* (2006.01)
  *H04W 88/02* (2009.01)

(56) References Cited

U.S. PATENT DOCUMENTS

| | | | |
|---|---|---|---|
| 2009/0077548 A1* | 3/2009 | Kelley | G06F 17/30637 717/171 |
| 2010/0004980 A1* | 1/2010 | Bowen | G06Q 30/02 705/7.31 |
| 2010/0312646 A1 | 12/2010 | Gupta et al. | |
| 2011/0010376 A1* | 1/2011 | Kawauchi | G01C 21/36 707/758 |
| 2011/0077046 A1* | 3/2011 | Durand | G06Q 30/02 455/550.1 |
| 2011/0161315 A1* | 6/2011 | Bonnet | G06F 17/2705 707/723 |
| 2011/0230176 A1 | 9/2011 | Kumar et al. | |
| 2012/0209804 A1 | 8/2012 | Lee et al. | |
| 2012/0239761 A1* | 9/2012 | Linner | G06F 17/2765 709/206 |
| 2012/0240062 A1 | 9/2012 | Passmore et al. | |
| 2013/0069976 A1* | 3/2013 | Lee | G06F 3/016 345/619 |
| 2013/0151336 A1* | 6/2013 | Goralnick | G06Q 30/0252 705/14.54 |
| 2013/0174058 A1 | 7/2013 | Kaul et al. | |
| 2013/0331147 A1* | 12/2013 | Chang | H04W 4/18 455/556.1 |
| 2014/0019462 A1* | 1/2014 | Heck | G06F 17/30286 707/754 |
| 2014/0046923 A1 | 2/2014 | Ruble et al. | |
| 2014/0059030 A1 | 2/2014 | Hakkani-Tur et al. | |
| 2014/0135069 A1* | 5/2014 | Jung | G06F 3/041 455/566 |
| 2014/0141810 A1* | 5/2014 | Shin | G01C 21/3611 455/456.3 |
| 2014/0256292 A1* | 9/2014 | Son | H04W 4/14 455/412.1 |
| 2014/0310108 A1* | 10/2014 | Ryu | G06Q 30/0276 705/14.72 |
| 2014/0315527 A1* | 10/2014 | Ramer | G06F 17/30749 455/414.2 |
| 2014/0324986 A1* | 10/2014 | Zhang | H04L 51/046 709/206 |
| 2015/0020087 A1* | 1/2015 | Rose | H04N 21/4316 725/20 |
| 2015/0213142 A1* | 7/2015 | Li | H04L 12/1818 707/722 |
| 2016/0078480 A1* | 3/2016 | Gross | G06F 17/30867 705/14.54 |

FOREIGN PATENT DOCUMENTS

| | | |
|---|---|---|
| KR | 10-2009-0107602 A | 10/2009 |
| KR | 10-2012-0092433 A | 8/2012 |
| TW | 200935338 | 8/2009 |
| WO | 2007/127642 A2 | 11/2007 |
| WO | 2008/100690 A1 | 8/2008 |

OTHER PUBLICATIONS

Written Opinion [PCT/ISA/237] dated Nov. 11, 2015, issued in counterpart International Application No. PCT/KR2015/007866.
Communication dated Nov. 23, 2015, issued by the European Patent Office counterpart European Application No. 15179391.6.
Communication dated May 4, 2016 issued by the Taiwanese Patent Office in counterpart Taiwanese Patent Application No. 104124449.
"How Microsoft could beat Siri and Google Now: A modern Microsoft Bob" http://www.pcworld.com/article/2045086/how-microsoft-could-beat-siriand-google-now-a-modern-microsoft-bob.html, Jun. 30, 2015, 13 pgs total.
Communication dated Mar. 26, 2018 issued by the State Intellectual Property Office of P.R. China in counterpart Chinese Patent Application No. 201510463539.5.

* cited by examiner

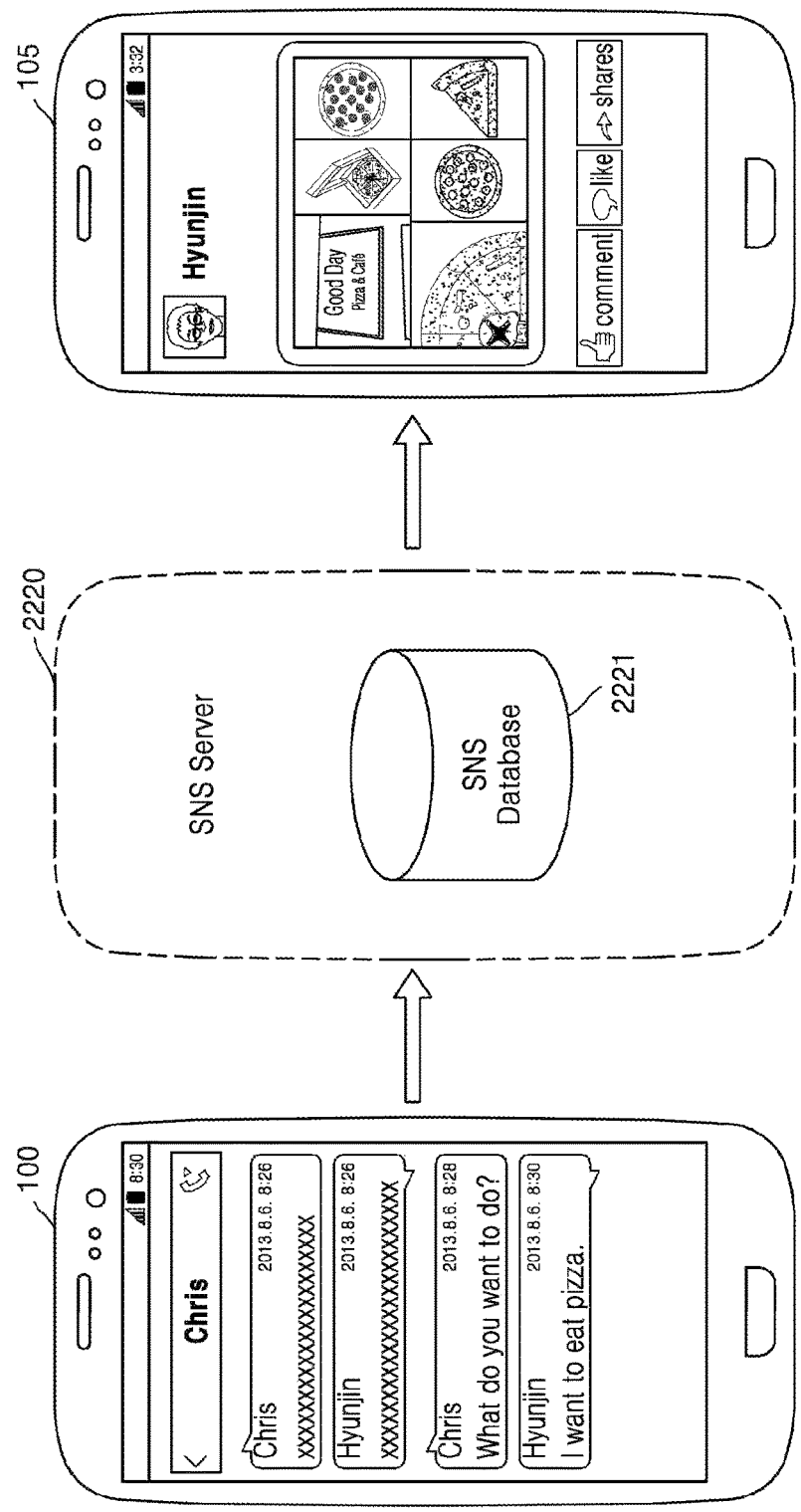

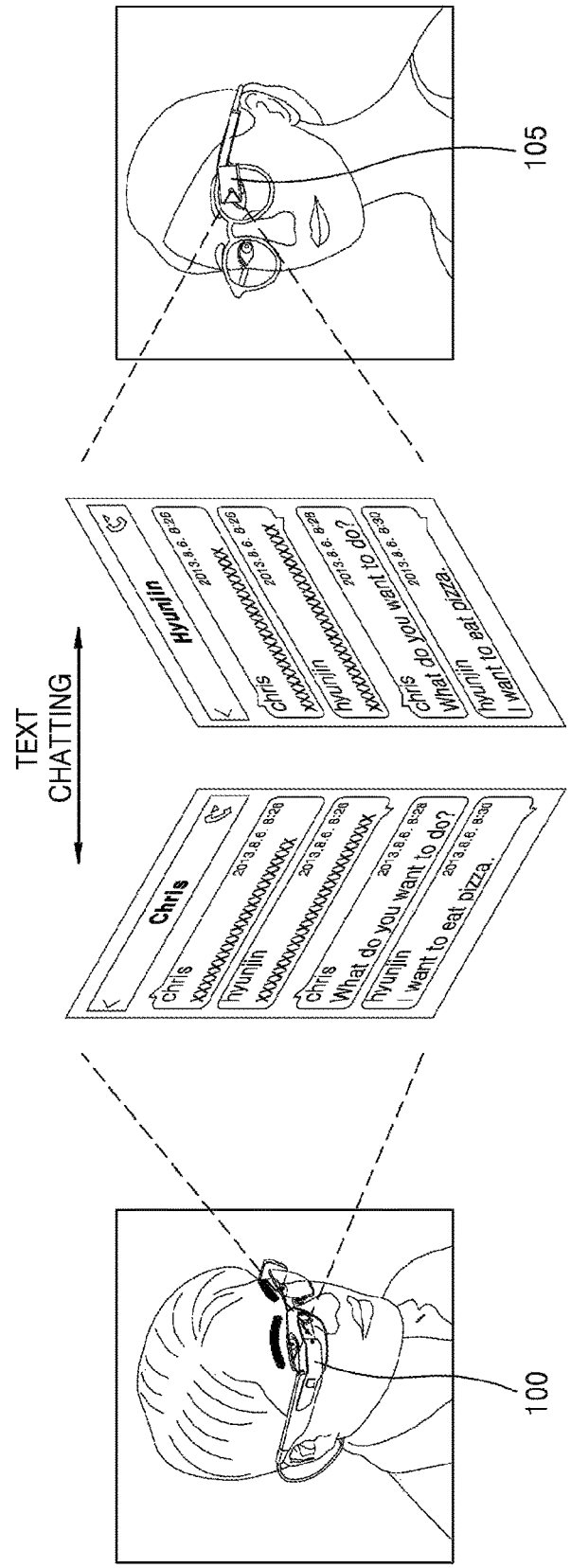

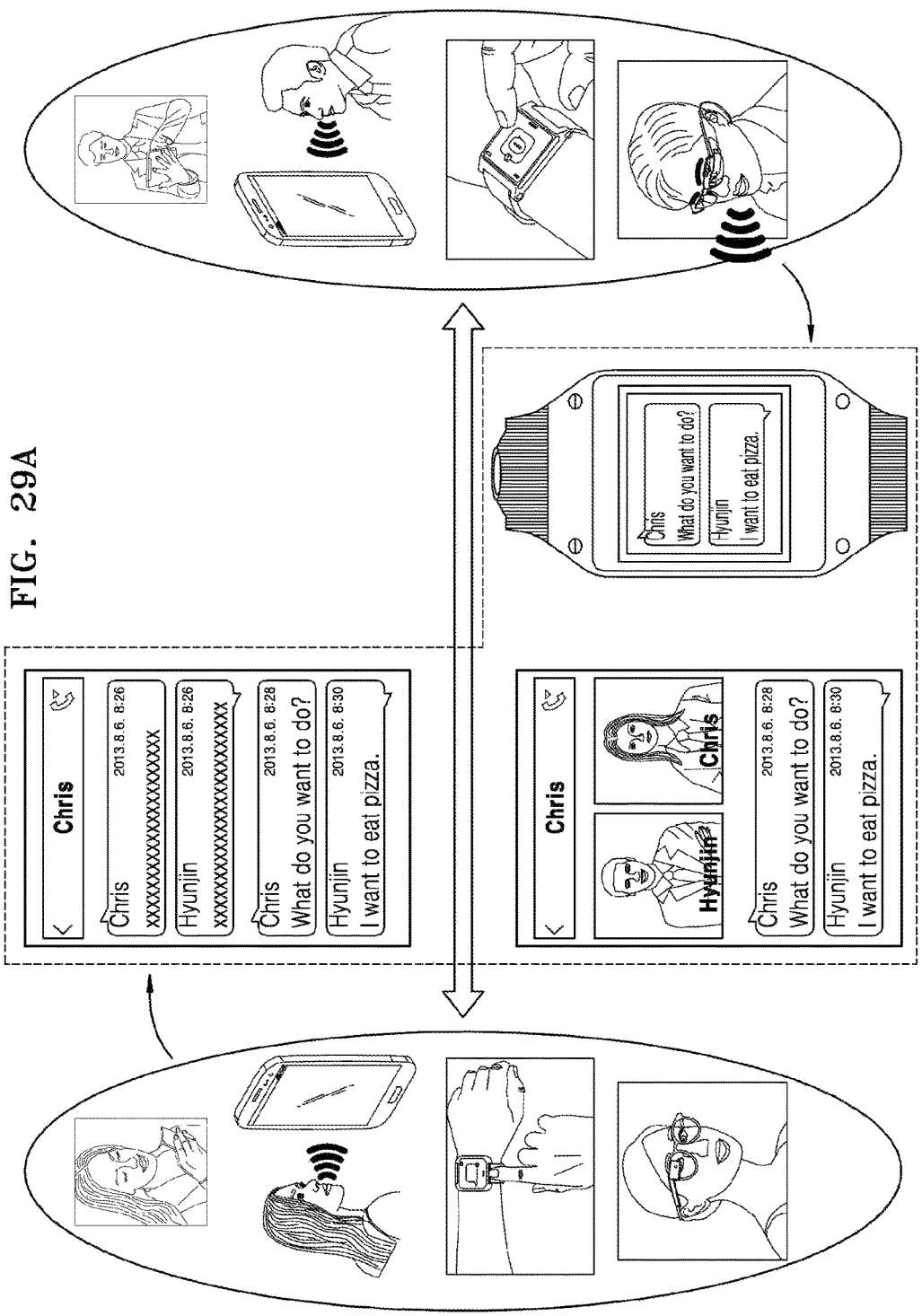

FIG. 41

| ENTITY | RELEVANCE | SENTIMENT | TYPE | LINKED DATA |
|---|---|---|---|---|
| Peter Higgs | 0.98893 | positive | positive | DBpedia \| Yago |
| European Center for Nuclear Research | 0.69407 | neutral | Organization | Website \| Lat:46.23_Lon:6.06\| DBpedia \| Yago \| OpenCyc \| GeoNames |
| United States | 0.461032 | neutral | Country | Website \| DBpedia \| Yago \| OpenCyc \| CIA Factbook |
| Switzerland | 0.445847 | neutral | Country | Website \| Lat:46.83_Lon:8.33\| DBpedia \| Yago \| OpenCyc \| CIA Factbook |

APPARATUS AND METHOD FOR PROVIDING INFORMATION

CROSS-REFERENCE TO RELATED APPLICATIONS

This application claims priority from Korean Patent Application Nos. 10-2014-0098633, filed on Jul. 31, 2014, 10-2015-0022720, filed on Feb. 13, 2015, and 10-2015-0044996, filed on Mar. 31, 2015, in the Korean Intellectual Property Office, the disclosures of which are incorporated herein by reference in their entireties.

BACKGROUND

1. Field

Apparatuses and methods consistent with exemplary embodiments relate to an apparatus and a method for providing information.

2. Description of the Related Art

Due to a rapid distribution of portable terminals, the use of the portable terminals becomes important in daily life. The portable terminals may provide various functions such as a voice call service, a data transmission service, and various additional services.

In particular, communication between users using smart terminals becomes increasingly popular. With this trend, various techniques for providing a more convenient communication environment for the communication are being developed.

However, existing techniques cannot provide a customized service by using user's information such as user's location information.

SUMMARY

One or more exemplary embodiments provide a method and an electronic apparatus for providing information of interest of a user by considering location information of the user, and for obtaining information of interest of the user.

One or more exemplary embodiments include an electronic device that generates a query that a user may need while the user uses an application, performs a search operation, and obtains information of interest.

Additional aspects will be set forth in part in the description which follows and, in part, will be apparent from the description, or may be learned by practice of exemplary embodiments.

According to an aspect of an exemplary embodiment, there is provided an electronic apparatus including: a display configured to display one or more messages in response to an execution of an application for exchanging the one or more messages between the electronic apparatus and another electronic apparatus; and a processor configured to extract a keyword from the one or more messages for processing a search query by using the keyword and location information of the electronic apparatus.

The display may be further configured to display a graphical user interface (GUI) configured to receive a user input with respect to the keyword, and the processor may be further configured to obtain information related to a result of the search query, according to the user input, and the display may be further configured to display the information.

The processor may be further configured to obtain the information via at least one from among a second application that is installed in the electronic apparatus and an Internet search service.

The processor may be further configured to execute the second application, and to obtain the information by inputting the search query to the second application.

The display may be further configured to display a graphical user interface (GUI) configured to receive a user input with respect to the keyword, and to display a query editing window for editing the search query, according to the user input.

The display may be further configured to display the search query determined by the processor via the query editing window, and to receive editing on the search query by a user.

The processor may be further configured to obtain information related to a result of the search query edited according to the received editing.

The processor may be further configured to obtain at least one of the location information of the electronic apparatus measured by using a global positioning system (GPS) processor included in the electronic apparatus and the location information of the electronic apparatus extracted from the one or more messages.

The processor may be further configured to determine the search query by prioritizing use of the location information extracted from the one or more messages over use of the location information obtained by using the GPS processor.

The processor may be configured to determine the search query based on user information associated with the electronic apparatus.

According to an aspect of an exemplary embodiment, there is provided a method of providing information in an electronic apparatus, the method including: displaying one or more messages in response to execution of an application for exchanging the one or more messages to between the electronic apparatus and another electronic apparatus; and extracting a keyword from the one or more messages; and processing a search query using the keyword and location information of the electronic apparatus.

The method may further include receiving a user input with respect to the keyword; and obtaining information related to a result of the search query, in response to the user input; and displaying the information.

The obtaining may include obtaining the information via at least one from among a second application that is installed in the electronic apparatus and an Internet search service.

The obtaining may include executing the second application, and obtaining the information by inputting the search query to the second application.

The method may further include receiving a user input with respect to the keyword; and displaying a query editing window for editing the search query, according to the user input.

The method may further include displaying the search query via the query editing window; and receiving editing on the search query by a user.

The obtaining may include obtaining information related to a result of the search query edited according to the received editing.

The method may further include obtaining at least one of the location information of the electronic apparatus measured by using a global positioning system (GPS) processor included in the electronic apparatus and the location information from the one or more messages.

The determining may include determining the search query by prioritizing use of the location information extracted from the one or more messages over use of the location information obtained by using the GPS processor.

The determining may include determining the search query based on user information associated with the electronic apparatus.

According to an aspect of an exemplary embodiment, there is provided an electronic apparatus may include: a display configured to display a message transmitted to or received from another electronic apparatus; and a processor configured to determine a keyword based on the message, and to determine a search query by using the keyword and information of a user.

The processor may be further configured to determine the keyword by using a previous message, and a current message that is displayed on the display.

The processor may be further configured to perform a search operation by using the search query, and to control the display to display a result of the search operation.

The processor may be further configured to execute the search query corresponding to the keyword, in response to a user input with respect to the keyword displayed on the display, and to control the display to display a result of executing the search query.

The user information may include at least one from among location information of the electronic apparatus of the user, communication history information of the user, and search log information of the user.

The processor may be further configured to display the result of executing the search query on the display together with the message.

The processor may be further configured to control the display to display the keyword in an original display state after a lapse of a preset time period.

The display may be further configured to distinguishably display the keyword in the one or more messages.

The method may further include distinguishably displaying the keyword in the one or more messages.

The display may be further configured to distinguishably display the keyword in the message.

According to an aspect of an exemplary embodiment, there is an electronic apparatus including: a processor configured to extract a keyword from application content that is communicated between the electronic apparatus and another electronic apparatus via an application, generate a search query based on the keyword, and obtain information based on a result of the search query; and an output interface configured to provide the obtained information to a user while the application is executed.

The application may include at least one from among an application for performing text chatting, an application for performing voice chatting, and an application for performing video chatting.

When at least one of the application for performing voice chatting and the application for performing video chatting is performed, the processor may be further configured to convert a voice signal into text by using a speech to text (STT) engine, and to extract the keyword from the converted text.

The processor may include a natural language processor configured to recognize a meaning of words included in the content, and the processor may be further configured to determine whether to extract the keyword based on the recognized meaning of the words.

The output interface may be further configured to provide the obtained information to the user by using at least one of converting an application execution screen, partitioning the application execution screen, outputting a voice signal, performing a messaging service, performing an e-mail service, performing a social network service (SNS), and performing an application service.

The electronic apparatus may be interoperated with a second electronic apparatus, and the processor may be further configured to extract the keyword from content that is communicated between the second electronic apparatus and the another electronic apparatus by executing the application in the second electronic apparatus, generate the search query based on the keyword, and obtain the information based on a result of executing the search query; and the output interface is configured to provide the obtained information to the user through the electronic apparatus.

BRIEF DESCRIPTION OF THE DRAWINGS

The above and/or other aspects will become more apparent by describing certain exemplary embodiments with reference to the accompanying drawings in which:

FIGS. 22A through 22I illustrate examples in which, when an electronic device is a smartphone or a tablet personal computer (PC) and a user performs text chatting by using the smartphone or the tablet PC, information obtained by the electronic device is provided to the user via an output interface;

FIGS. 27A and 27B illustrate still other examples in which, when an electronic device is smartglasses and a user performs text chatting by using the smartglasses, information obtained by the electronic device is provided to the user via an output interface;

FIGS. 29A and 29B illustrate examples in which, when an electronic device includes various electronic devices, and a user communicates with another user via at least one of voice chatting and text chatting by using the electronic device, information obtained by the electronic device is provided to the user via an output interface;

FIG. 41 illustrates a table chart generated by a named-entity recognizer after the named-entity recognizer recognizes entities, according to an exemplary embodiment;

DETAILED DESCRIPTION

Figure 1A:
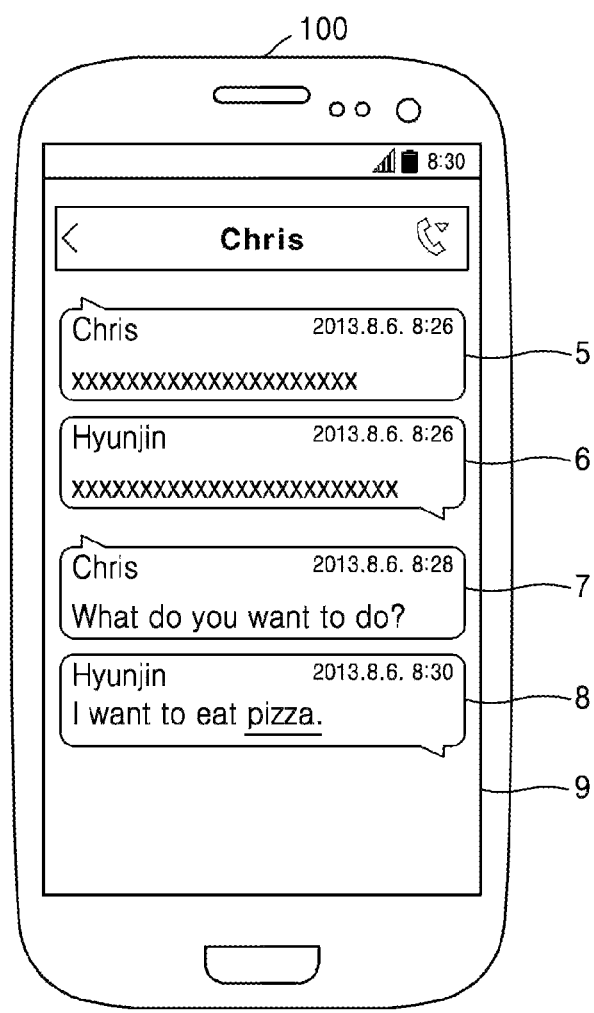
FIG. 1A illustrates a user interface (UI) of an electronic device, according to an exemplary embodiment.

Certain exemplary embodiments are described in greater detail below with reference to the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. Sizes of elements in the drawings may be exaggerated for convenience of explanation. In other words, since sizes and thicknesses of components in the drawings are arbitrarily illustrated for convenience of explanation, the following exemplary embodiments are not limited thereto.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

Throughout the specification, when a part "includes" or "comprises" an element, unless there is a particular description contrary thereto, the part can further include other elements, not excluding the other elements. Throughout the specification, it will also be understood that when an element is referred to as being "connected to" or "coupled with" another element, it can be directly connected to or coupled with the other element, or it can be electrically connected to or coupled with the other element by having an intervening element interposed therebetween. In the following description, terms such as "unit", "module" or the like indicate a unit for processing at least one function or operation, wherein the unit and the module may be embodied as hardware or software or embodied by combining hardware and software.

Throughout the specification, a term "user" may mean a user of an electronic device. Throughout the specification, a communication service may mean a one-to-one service, a one-to-many service, or a many-to-many service that facilitates an exchange of information between users, e.g., conversation between users.

Throughout the specification, an application indicates a set of computer programs designed to perform particular tasks. Throughout the specification, the application may vary. For example, the application may include, but is not limited to, a game application, a video reproducing application, a map application, a memo application, a calendar application, a phone-book application, a broadcasting application, an exercise support application, a payment application, a photo folder application, etc. The application may also be called an "App".

The inventive concept will now be described more fully with reference to the accompanying drawings, in which exemplary embodiments are shown. The inventive concept may, however, be embodied in many different forms and should not be construed as being limited to the exemplary embodiments set forth herein; rather, these exemplary embodiments are provided so that this disclosure will be thorough and complete, and will fully convey the inventive concept to those of ordinary skill in the art. In the following description, well-known functions or constructions are not described in detail since they would obscure the disclosure with unnecessary detail. Throughout the specification, like reference numerals in the drawings denote like elements.

As used herein, the term "and/or" includes any and all combinations of one or more of the associated listed items. Expressions such as "at least one of," when preceding a list of elements, modify the entire list of elements and do not modify the individual elements of the list.

Throughout the specification, a message may mean a unit text set or a unit voice set including at least one from among a word, a phrase, and a clause that may be a part of a conversation between users.

Throughout the specification, a keyword may be included in a message and may mean a word, a phrase, and/or a clause related to a meaning of the message obtained by performing natural language analysis on the message.

Throughout the specification, a query may mean a word, a phrase, and/or clause that is an object for searching for information that matches with a query condition.

FIG. 1A illustrates a user interface (UI) of an electronic device 100, according to an exemplary embodiment.

The electronic device 100 may be embodied as a smartphone, a tablet personal computer (PC), a wearable device, a personal digital assistant (PDA), a laptop computer, a cellular phone, a mobile phone, an enterprise digital assistant (EDA), a portable multimedia player (PMP), a personal navigation device (PND), a portable navigation device (PND), a handheld game console, a mobile internet device (MID), or an electronic book (e-Book).

Throughout the specification, the wearable device may include a head-mounted display (HMD) that is worn on a head. For example, the HMD may include, but is not limited to, glasses, a helmet, a hat, or the like. Throughout the specification, the wearable device may include a ring, a necklace, a bracelet, shoes, earrings, a hair band, cloth, gloves, a thimble, or the like.

The electronic device 100 according to an exemplary embodiment may display messages 5, 6, 7, and 8 on its screen via a communication service. Throughout the specification, a message may mean a unit set of texts or a unit set of voices, which is a part of a conversation between users and is exchanged as a set of sequence between the electronic device 100 and another electronic device. For example, referring to FIG. 1A, a user (Chris) transmits the message 7 'What do you want to do?' to Hyunjin at 08:28 A.M. on Aug. 6, 2013. Also, for example, referring to FIG. 1A, Hyunjin transmitted the message 8 'I want to eat pizza.' at 08:30 A.M. on Aug. 6, 2013. For example, in FIG. 1A, the text that is included in each speech balloon in a conversation between Chris and Hyunjin may be defined as a message.

The electronic device 100 according to an exemplary embodiment may determine whether to extract a keyword from the message. The electronic device 100 according to an exemplary embodiment may extract at least one keyword from a message displayed on a screen via a communication service. For example, the electronic device 100 may extract at least one keyword from text and image in the message. For example, the electronic device 100 may extract at least one keyword from a multimedia file attached in the message. The multimedia file may include a picture file, a video file and a sound file. The keyword may be included in a message or may be related to contents of the message, and may include at least one of a word, a phrase, and a clause related to a meaning of the message. For example, the electronic device 100 may extract 'pizza' as a keyword from the message 8.

The electronic device 100 according to an exemplary embodiment may display the extracted keyword. Referring to FIG. 1A, the electronic device 100 marks the keyword by using an underline. Alternatively, the electronic device 100 may differentiate the keyword from other contents of the message 8 by changing a font, by changing a font size, by highlighting the keyword, by performing bold lettering on the keyword, by flickering the keyword, by shading the keyword, or by shading a speech balloon.

The electronic device 100 according to an exemplary embodiment may generate a query related to the keyword extracted from the message, and may obtain information based on the query and location information of the electronic device 100. The query may mean at least one of a word, a phrase, and a clause that is an object for searching for information that matches with a query condition. The query may be related to the keyword. The query may be generated based on at least one keyword.

The electronic device 100 according to another exemplary embodiment may generate a query, based on a keyword and location information of the electronic device 100. For example, the electronic device 100 may obtain information via the query generated based on the keyword and the location information of the electronic device 100, and may display the information.

The electronic device 100 may obtain information in the electronic device 100 or may obtain information retrieved from a server. The electronic device 100 may obtain information from a search engine website.

Also, the electronic device 100 may provide information obtained by a processor of the electronic device 100. In an exemplary embodiment, the information is visually or acoustically provided to a user to be recognized. For example, when a user touches a keyword that is differently marked from the rest of contents of the message 8, the electronic device 100 may provide the obtained information.

In an exemplary embodiment, the processor of the electronic device 100 may obtain, regardless of a request from the user, information related to the keyword that is differently marked from the rest of contents of the message 8, and may store the information in a memory (not shown) of the electronic device 100. Also, when the user touches the differently marked (e.g., highlighted) keyword, the electronic device 100 may output, from the memory of the electronic device 100, the information that is obtained regardless of the request from the user and stored in the memory of the electronic device 100, and may provide the information to the user.

In an exemplary embodiment, when the user touches the differently marked (e.g., highlighted) keyword, the processor of the electronic device 100 may obtain the information related to the keyword and may provide the information to the user without storing the information in the memory of the electronic device 100.

A method of extracting the keyword, a method of generating the query based on the extracted keyword, and a method of obtaining the information based on the query and the location information of the electronic device 100, performed by the electronic device 100, will be described in detail later with reference to FIG. 2A.

Figure 1B:
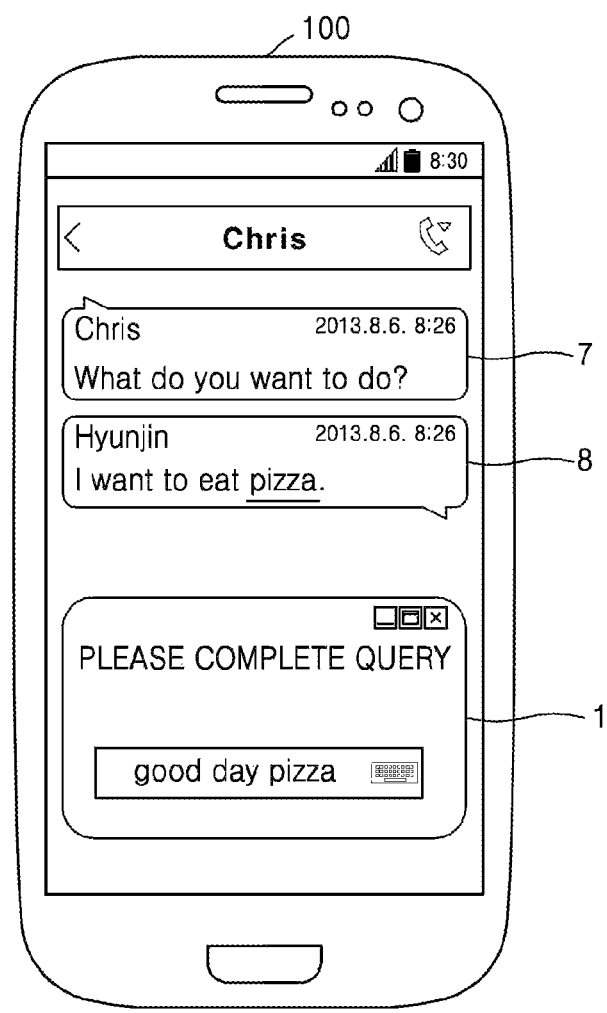
FIG. 1B illustrates a UI of an electronic device, according to another exemplary embodiment.

FIG. 1B illustrates a UI of the electronic device 100, according to another exemplary embodiment.

The electronic device 100 according to an exemplary embodiment may provide a query generated by a processor of the electronic device 100. The electronic device 100 according to an exemplary embodiment may receive a query edited by a user. For example, the user may compose a second query by editing a first query generated by the processor, and may input the second query to a query editing window 1 provided via a graphical user interface (GUI) of the electronic device 100. The user may input, as the second query, the first query, which is generated by the processor, to the electronic device 100. The electronic device 100 may obtain information, based on the edited second query, and may obtain information, based on the edited second query and the location information of the electronic device 100.

For example, as illustrated, the electronic device 100 may provide the query editing window 1, and may provide a word 'pizza' as a default value of a query. Also, the electronic device 100 may receive the query edited by the user, may obtain information by using various methods, and may provide the obtained information to the user. Detailed descriptions about operations of the electronic device 100 are provided in detail with reference to FIGS. 2A and 2B.

Hereinafter, the operations of the electronic device 100 are described.

Figure 2A:
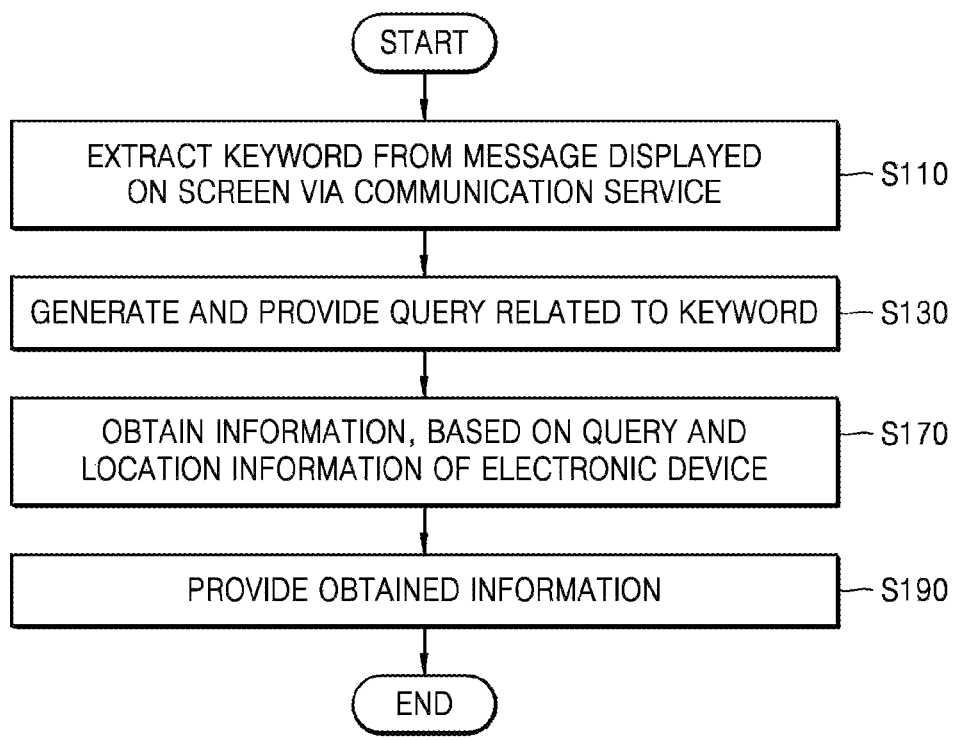
FIG. 2A illustrates a flowchart of a method, performed by an electronic device, of providing information, according to an exemplary embodiment.

FIG. 2A illustrates a flowchart of a method of providing information, the method being performed by the electronic device 100 and described in correspondence with FIG. 1A, according to an exemplary embodiment.

Referring to FIG. 2A, a processor of the electronic device 100 may extract a keyword from a message that is displayed on a screen of the electronic device 100 via a communication service (S110). A method used by the processor to extract the keyword may include semantic analysis and/or statistical analysis as shown in Table 1.

TABLE 1

| Method of extracting keyword | Base of analysis | Detailed examples of base of analysis |
|---|---|---|
| semantic analysis | content of conversation between users | content extracted from a conversation between a user and another communication party, conversation content about a location of the user, conversation content about a mental state of the user, conversation content about a past experience of the user |
| statistical analysis | log of user's location | frequency of the user passing a place where the user is currently located or of the user passing a particular place, the number of times that the user passed a place where the user is currently located or the number of times that the user passed a particular place, a total time during which the user stays in a place where the user is currently located or in a particular place, a total time during which the user stays in a place where the user is currently located or in a particular place during a particular time period, a time when the user first visits a current place or a particular place |
| | user input information | schedule of the user, address of the user, user's preference for a pizza restaurant, user's tendency in selecting a menu |
| | history information about the user | history information about the user including a current location of the user, a payment history of the user, an accumulated location history of the user, a call history of the user |
| | priority orders of reference contents or priority orders of results of semantic analysis | content of conversation between users, location log of the user, user input information, history information about the user |

[1. Extraction of Keyword]

For example, as illustrated in FIGS. 1A and 1B, a message displayed on the screen may be 'What do you want to do?' (a first message 7) and 'I want to eat pizza' (a second message 8). The processor may analyze meanings of the first and second messages 7 and 8, and may extract 'pizza' as a keyword from the second message 8.

The processor of the electronic device 100 may perform the semantic analysis and/or the statistical analysis on the message, and thus may extract 'pizza' as the keyword. The processor of the electronic device 100 may extract the keyword by considering a situation related to the message. For example, the processor of the electronic device 100 may extract the keyword, based on a type of words included in the message, a relation between the words, and meanings of the words.

The processor may recognize entities in messages by using a method described with reference to FIGS. 36 through 41, and may extract a keyword by considering the number of times each of the entities are used. The method, performed by the processor, of recognizing the entities will be described later.

The processor of the electronic device 100 may control various processing operations of the electronic device 100. For example, the processor of the electronic device 100 may include a processor such as a central processor unit (CPU), a micro controller unit (MCU), or a micro processor unit (MPU).

[1-1. Semantic Analysis]

The processor of the electronic device 100 may extract the keyword by performing the semantic analysis.

For example, the processor may extract 'pizza' as the keyword by further considering content of conversation between users and user-related information. Here, the user-related information may include at least one of a location log of the user, user's previously input information, and the history information about the user. The user-related information may mean information about only one user or information about at least two users.

The processor may extract the keyword, based on at least one of, for example but not limited to, 1) the content of conversation between the users, 2) a user's location log, 3) the user's previously input information, and 4) the history information about the user.

The processor may perform natural language analysis on the content of conversation between the users, may recognize the content of conversation between the users, and may extract the keyword. For example, in the exemplary embodiment of FIG. 1A, the processor may extract the keyword, based on content extracted from a conversation between the user and another communication party, conversation content about a location of the user, conversation content about a mental state (e.g., a feeling) of the user, and/or conversation content about a past experience of the user.

For example, the processor may perform extraction, based on the conversation content, and in the exemplary embodiment of FIG. 1A, the processor may extract 'pizza' as 'the keyword from the message 8. The processor may recognize a meaning of the message included in the conversation between the users, and may predict a type of information that is desired by the user, based on the meaning of the message. For example, the processor may analyze the meaning of the message as 'the user wants to eat pizza', and may predict, based on the meaning, that the user currently wants to find a pizza restaurant near a current location of the user (a first situation) or that the user needs a telephone number of the pizza restaurant near the current location of the user (a second situation). Here, a situation of the user may indicate environmental elements related to the user.

Also, when the processor extracts the keyword, based on the meaning of the message, the processor may consider the user's location log.

For example, the user's location log may include a frequency of the user passing a place where the user is currently located or of the user passing a particular place, the number of times that the user passed a place where the user is currently located or that the user passed a particular place, a total time during which the user stays in a place where the user is currently located or in a particular place, a total time during which the user stays in a place where the user is currently located or in a particular place during a particular time period, and/or a time when the user first visits a current place or a particular place.

The electronic device 100 may check location information of the user, and may use the location information to extract the keyword. The location information of the user may be continuously checked in real-time, and may be stored in the electronic device 100.

The location information of the user may be measured by location information of the electronic device 100. For example, the location information of the electronic device 100 may include a global positioning system (GPS)-coordinates value, identification (ID) of a base station, a service set identifier (SSID) and a network address of an access point (AP). The location information of the user may be measured by a measuring method using various wireless communication technologies including, for example, a diffuse-infrared ray, ultrasound, Bluetooth, ultra-wideband (UWB), radio-frequency identification (RFID), Wi-Fi protected setup (WPS), or the like.

The location information may indicate log information about a location of the user or the electronic device 100 with respect to a time. For example, the electronic device 100 may include a GPS module. A method, performed by the GPS module, of measuring the location of the electronic device 100, will be described in detail with reference to FIG. 45.

Also, when the processor extracts the keyword, based on the meaning of the message, the processor may consider information that is previously input by the user.

For example, the user's previously input information may include an address of the user, a user's preference for a pizza restaurant, a user's tendency in selecting a menu, and/or an estimated schedule of the user.

For example, when the address of the user is relatively far away from the current location, and a total time period in which the user stays in a current place is less than a reference time (e.g., one hour), the processor may recognize that the current location of the user is not a familiar place to the user. Based on the analysis, the processor may predict that the user currently wants to find the pizza restaurant near the current location of the user (the first situation) or that the user needs the telephone number of the pizza restaurant near the current location of the user (the second situation).

Also, when the processor predicts the keyword based on the meaning of the message, the processor may consider the history information about the user.

For example, the history information about the user may indicate a history about the user which is recorded in the electronic device 100 and a server. Also, the history about the user may include a history recorded by the user when the user uses the electronic device 100, and a history recorded to the server, by the user, when the user uses an App service. Also, the history about the user may include content that is not directly recorded by the user but is indirectly recorded when the user uses the electronic device 100 or the server. For example, the history information about the user may include user-related information such as the current location of the user, a payment history of the user, an accumulated history of the user, a call history of the user, or the like.

[1-2. Statistical Analysis]

The processor of the electronic device 100 may extract the keyword via the statistical analysis.

The processor may determine priority orders of reference contents. For example, when the processor performs the semantic analysis, based on the content of conversation between the users, the user's location log, the user input information, and the history information about the user, the processor may determine a base of analysis to be preferentially considered from among bases of analyses to extract the keyword. For example, when a location of the electronic device 100 measured by the GPS module of the electronic device 100 is different from location information mentioned in the content of conversation between the users, the processor may extract the keyword by preferentially considering the location information mentioned in the content of conversation between the users.

Also, the processor may determine priority orders of predicted situations of the user. For example, the processor may determine that one situation has a higher possibility of occurrence, wherein the situation is one of the first situation in which the user currently wants to find the pizza restaurant near the current location of the user and the second situation in which the user needs the telephone number of the pizza restaurant near the current location of the user in the exemplary embodiments of FIGS. 1A and 1B.

According to accumulated location information of the user, if the user frequently visited a particular pizza restaurant, the processor may determine, as a first priority, the first situation in which the user currently wants to find the pizza restaurant near the current location of the user.

Alternatively, for example, when a place where the user is currently located is outdoor, and according to accumulated location information (or accumulated location history) of the user, if the user moves over a predetermined time (e.g., 30 minutes), or if going out is recorded to a scheduler of the user, the processor may determine, as the first priority, the first situation in which the user currently wants to find the pizza restaurant near the current location of the user.

For example, when the number of times that the user calls a pizza restaurant is equal to or greater than a preset number of times in a call history of the user, the processor may determine, as the first priority, the second situation in which the user needs the telephone number of the pizza restaurant near the current location of the user.

Alternatively, for example, when a place where the user is currently located is a house of a friend of the user, and according to the scheduler of the user, the user intends to stay in the place over a predetermined time (e.g. 3 hours), the processor may determine, as the first priority, the second situation in which the user needs the telephone number of the pizza restaurant near the current location of the user.

Although it is described that the processor determines the first situation or the second situation in the above example, however, the exemplary embodiments are not limited thereto. The processor of the electronic device 100 may determine one of any number of different situations based on the meaning of the message and the history information of the user.

The processor may extract the keyword 'pizza' by performing the aforementioned statistical analysis and/or the semantic analysis.

[1-3. Limitation in Extraction of Keyword]

The processor of the electronic device 100 may set a keyword, in consideration of the number of times of occurrence of a corresponding word. For example, the processor may set, as the keyword, a word that is repeatedly mentioned over a predetermined number of times, by the user, in a conversation. For example, when the user mentions the word at least five times or with at least about 20% frequency of use in the conversation, the processor may set the word as the keyword.

For example, the processor may perform named-entity recognition, and may measure a number of times of repetition or a repetition rate (or a repetition frequency) of each of entities. For example, the processor measures a number of times of repetition or a repetition rate of each of entities that are recognized via an external server.

A method of recognizing an entity via the processor or a server will be described later.

Also, the external server may perform named-entity recognition, and may calculate a number of times of repetition or a repetition rate of each of the entities, and the processor may receive data about the number of times of repetition or the repetition rate of each of the entities and may refer to the data to set a keyword.

For example, the processor may not set, as the keyword, an entity that is mentioned less than a preset number of times. Also, for example, the processor may not set, as the keyword, an entity that is mentioned less than a preset rate. The aforementioned algorithm for limiting extraction of the keyword may also be applied to an algorithm for generating a query.

The processor may mark the extracted keyword differently from other words in the message. The processor may receive a user input of selecting the extracted keyword, and may perform operations S130 through S190. In another exemplary embodiment, the processor may perform operations S130 through S190 without receiving a user input.

Also, the processor may limit the extraction of the keyword by using the method of semantic analysis as described above. In other words, the electronic device 100 may recognize entities, based on 1) the content of conversation between the users, 2) the user's location log, 3) the user's previously input information, and 4) the history information about the user, and may limit recognition of the entities.

For example, when the electronic device 100 receives a message "Please come to a funeral hall next to a pizza restaurant", the processor, by performing the semantic analysis, may recognize <the funeral hall next to the pizza restaurant> as an entity, or may recognize <the pizza restaurant> as an entity but may not extract the recognized entity as the keyword.

For example, the processor may recognize that a connective word (e.g., next to, near, or rear) for connecting words expressing places is used in <the funeral hall next to the pizza restaurant>, and may recognize <the funeral hall next to the pizza restaurant> as an entity.

[1-4. Extraction of Keyword by User Input]

The processor may determine a keyword by receiving a user input. A user may select the keyword from messages of a conversation. The user may select the keyword in a preset manner. For example, the user may select the keyword in the manner that is preset via settings. For example, the user may select the keyword in a long press touch and drag operation.

The processor may generate and provide a query related to the keyword (S130). A method used by the processor to generate the query is semantic analysis and/or statistical analysis as shown in Table 2.

TABLE 2

| Method of determining a query | Base of analysis |
| --- | --- |
| Semantic analysis | Content of conversation between users<br>User's location log<br>User's previously input information<br>History information about the user |
| Statistical analysis | Priority orders of reference contents or priority orders of results of the semantic analysis |

[2. Generation of Query]

As shown in the exemplary embodiment of FIG. 1B, the processor may perform the semantic analysis and/or the statistical analysis, based on the extracted keyword, and may generate 'good day pizza' as the query. For example, the processor may generate 'good day pizza' as the query, based on at least one of 1) the content of conversation between the users, 2) the user's location log, 3) the user's previously input information, and 4) the history information about the user.

The processor may analyze the content of conversation between the users, and may generate 'good day pizza' as the query. For example, if the processor semantically recognizes, from the content of conversation between the users, that the user wants to eat at a restaurant 'good day pizza', the processor may generate 'good day pizza' as the query.

The processor may analyze the user's location log, and may generate 'good day pizza' as the query. The processor may analyze the user's location log, and may provide the query that matches with a situation of the user.

For example, if the processor recognizes that the user wants to find a pizza restaurant near a current location, and a record showing that the user visited the restaurant 'good day pizza' occurs frequently in an accumulated history of a user's location, the processor may generate 'location of good day pizza' as the query.

For example, if the processor recognizes that the user wants to have a telephone number of the pizza restaurant near the current location, and a record showing that the user called the restaurant 'good day pizza' occurs frequently in a call history of the user, the processor may generate 'telephone number of good day pizza' as the query.

For example, if the processor recognizes that the user wants to find the pizza restaurant near the current location or to have the telephone number of the pizza restaurant near the current location, and a record showing that the user paid a bill in the restaurant 'good day pizza' occurs frequently in payment detail reception messages in a history of the user, the processor may generate 'good day pizza' as the query.

The processor may analyze the user's previously input information, and may generate 'good day pizza' as the query. The processor may recognize, from the information input to the electronic device 100, that the restaurant 'good day pizza' is a user's favorite pizza restaurant.

The user may directly record the restaurant 'good day pizza' as the user's favorite pizza restaurant to the electronic device 100. Also, the user may record a plurality of pieces of information about the restaurant 'good day pizza' to the electronic device 100. In this case, the processor may recognize, by performing the statistical analysis, that the restaurant 'good day pizza' is the user's favorite pizza restaurant.

The processor may recognize, from information input to a server via an application service, that the restaurant 'good day pizza' is the user's favorite pizza restaurant. For example, by referring to a comment that is written by the user and is input to the server via a social network service (SNS), the processor may determine that the user prefers the restaurant 'good day pizza'.

The user may directly record the restaurant 'good day pizza' as the user's favorite pizza restaurant to a database of the server via an application service. Also, the user may record a plurality of pieces of information about the restaurant 'good day pizza' to the database of the server via the application service. In this case, the processor may recognize, by using a statistical method, that the restaurant 'good day pizza' is the user's favorite pizza restaurant.

As described above, the processor may perform the semantic analysis and/or the statistical analysis, and thus may extract 'good day pizza' as the query.

The electronic device 100 may receive an information provision request from the user, and may extract the query. For example, a display 9 (refer to FIG. 1A) may receive a user input (e.g., a touch) of selecting a portion corresponding to a keyword that is displayed on a screen, and may extract a query. For example, before the electronic device 100 receives the information provision request from the user, the electronic device 100 may determine a keyword, and may display the keyword by marking the keyword differently from other contents, and after the electronic device 100 receives the information provision request from the user, the electronic device 100 may extract the keyword.

Throughout the specification, the information provision request may include an input by the user to request the electronic device 100 to provide information. For example, the user may input the request by using various input methods (e.g., a touch, a click, a double click, etc.) to request the electronic device 100 to provide the information, and the request by the user may be referred to as the information provision request. Also, the user may input a particular command including a voice and/or a text to request the electronic device 100 to provide the information, and the request by the user may be referred to as the information provision request or an information provision request input.

The aforementioned algorithm for limiting the extraction of the keyword may also be applied to the algorithm for generating the query.

The processor may obtain the information, based on the query and the location information of the electronic device 100 (S170). A method used by the processor to generate the information is as shown in Table 3.

TABLE 3

Method of obtaining information

| | |
|---|---|
| Receive from an external source of an electronic device | Obtain information via an App service (e.g., Google map) |
| | Obtain information via an Internet search service (e.g., Yahoo) |
| Obtain from an internal source of the electronic device | Obtain, from an internal storage device, image files, a telephone number list, an address list, a recently-retrieved information list, etc. |

[3. Obtainment of Information]

The electronic device 100 may perform various types of information retrieving operation, based on the query and the location information of the electronic device 100, and thus may obtain the information. The information obtained by the electronic device 100 may include a two-dimensional (2D) image, a three-dimensional (3D) image, a 2D moving picture, a 3D moving picture, texts generated by using various languages, contents of various fields, and applications that provide various services.

After the electronic device 100 receives a user input of selecting a keyword, the electronic device 100 may perform an operation of obtaining information corresponding to the selected keyword.

Also, before the electronic device 100 receives the user input of selecting the keyword, the electronic device 100 may perform the operation of obtaining the information corresponding to the selected keyword, and may store the obtained information in a storage of the electronic device 100. The electronic device 100 may receive the user input of selecting the keyword, and may provide the information stored in the storage to the user.

Hereinafter, the operation of obtaining the information is described in detail.

[3-1. Obtainment of Information Via App Service]

The electronic device 100 may obtain related information from an external search server.

For example, the electronic device 100 may obtain information via an App service.

The electronic device 100 may determine a service according to a current state of an App, may perform various types of information retrieving operation, based on the query and the location information of the electronic device 100, and thus may obtain the information.

For example, according to the location information of the user, when the user is determined to be located in South Korea, the electronic device 100 may select a map application service provided by a South Korean service provider, and when the user is located in Japan, the electronic device 100 may select a map application service provided by a Japanese service provider.

For example, the electronic device 100 may refer to the number of times that the user uses map applications, and may select a map application service frequently used by the user of the electronic device 100.

The electronic device 100 may request the user to select an App service, may receive a response from the user, and may select the App service, based on the response from the user.

For example, the electronic device 100 may select candidate Apps (e.g., first through fifth Apps) to be used, in consideration of a user's situation, may request the user to select at least one of the first through fifth Apps, and when the user selects the first App, the electronic device 100 may retrieve information by using the first App.

According to an exemplary embodiment, the electronic device 100 may select, from among user-selected App services, an App service that matches with a user's current situation.

For example, the electronic device 100 may select, from among user-selected first through fifth Apps, the first App according to a current situation of the user. For example, if the user previously selected first through fifth restaurant Apps, the electronic device 100 may select a 'good day pizza' restaurant App, according to a current situation of the user.

According to an exemplary embodiment, the electronic device 100 may request the user to select at least one of the user-selected App services, may receive a response from the user, and may select an App service according to the response from the user.

For example, the electronic device 100 may request the user to select at least one of the user-selected first through fifth Apps, and when the user selects the first App, the electronic device 100 may retrieve information by using the first App.

[3-2. Obtainment of Information Via Internet Search Service]

The electronic device 100 may obtain related information from an external search server.

For example, the electronic device 100 may obtain information via an internet search service.

The electronic device 100 may determine the internet search service, may perform various types of information retrieving, based on a query and location information of the electronic device 100, and thus may obtain the information. The query may indicate an automatically extracted query or a query that is edited by a user.

For example, the internet search service may indicate a commercialized search service including Yahoo, Google, Bing, Naver, etc. For example, the internet search service may indicate a search service such as a library database of a university, a thesis search engine website, or a database of a research institute, which may be accessed by authorized users.

The electronic device 100 may obtain the information, based on the query and the location information of the electronic device 100, and may provide the information to the user.

Therefore, the electronic device 100 according to an exemplary embodiment may allow the user to conveniently receive information related to ongoing a communication service while the user uses the communication service.

[3-3. Obtainment of Information in Electronic Device]

The electronic device 100 may obtain information of interest from an internal storage device. Hereinafter, the information of interest is referred to as the interest information.

For example, the electronic device 100 may obtain the interest information from image files, a telephone number list, an address list, and a recently-retrieved information list that are stored in the internal storage device. When the electronic device 100 is a wearable device, the electronic device 100 may obtain the interest information from a storage device included in another electronic device that is connected with the electronic device 100 via short-distance communication such as Bluetooth.

Therefore, the electronic device 100 according to an exemplary embodiment may allow the user to conveniently receive information related to a communication service while the user uses the communication service.

An output interface may provide the information obtained by the processor (S190). A method used by the processor to provide the information is as shown in Table 4.

TABLE 4

| Type of electronic device | Communication method | Information providing method |
|---|---|---|
| Smartphone (or tablet PC) | Text chatting, voice chatting, video chatting | Screen conversion, screen partition, voice, voice and screen partition, voice and screen conversion, a messaging service, an e-mail service, an SNS service, an application service, etc. |
| Wearable device (smartwatch, HMD) | Text chatting, voice chatting, video chatting | Provision of summarized primary information (an image, a text, voice, etc.) |
| Smartphone (or tablet PC) interoperating with a wearable device | Text chatting, voice chatting, video chatting | A wearable device provides summarized information, and a smartphone (or a tablet PC) provides detailed information |

[4. Provision of Information]

The electronic device 100 may provide information, which is obtained based on a query and location information of the electronic device 100, to a user in various manners.

For example, the electronic device 100 may provide the obtained information to the user via at least one of voice, an image, and a text. A method of providing the obtained information, the method being performed by the electronic device 100, may vary according to types of the electronic device 100. The method, performed by the electronic device 100, of providing the obtained information, will be described in detail with reference to FIGS. 22 through 29.

Figure 2B:
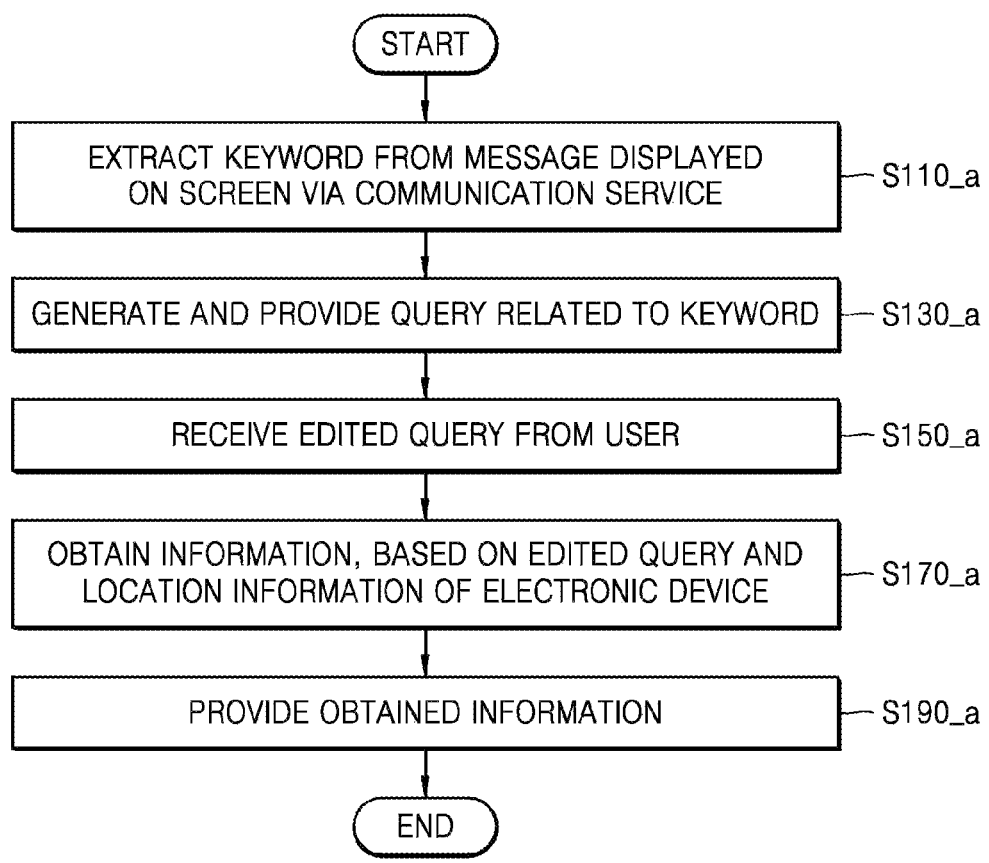
FIG. 2B illustrates a flowchart of a method, performed by an electronic device, of providing information, according to another exemplary embodiment.

FIG. 2B illustrates a flowchart of a method of providing information, the method being performed by the electronic device 100 and described in correspondence with FIG. 1B, according to another exemplary embodiment.

The electronic device 100 may extract a keyword from a message used in communication, may generate a first query related to the keyword, and may provide the first query to a user (S110_a and S130_a). The electronic device 100 may provide the first query by using various methods. For example, the electronic device 100 may provide a query by generating a speech balloon, by using a pop-up window, or by performing screen conversion.

The electronic device 100 may receive a second query edited by the user (S150_a).

[5. Editing Query]

The electronic device 100 may receive the edited second query from the user (S150_a). The electronic device 100 may allow the user to edit a query in a manner such that the query is edited in a text, a gesture, voice, or a sketch.

When the first query generated by the electronic device 100 is provided to the user, the user may edit the query by reflecting his/her exact intention to the query. Throughout the specification, the term 'edited query' may mean the query that is edited by the user.

The user may edit a query provided by the electronic device 100 via an output interface. For example, the user may edit the query provided by the electronic device 100 and may input the edited query to the electronic device 100. For example, the user may not change the query provided by the electronic device 100 and may input the query as provided. The electronic device 100 may receive the edited query or non-edited query that is input by the user.

The electronic device 100 may obtain information, based on the edited query and location information of the electronic device 100 (S170_a). The electronic device 100 may provide the obtained information in various manners (S190_a). The method of providing the obtained information, the method being performed by the electronic device 100, will be described in detail with reference to FIGS. 22 through 29.

Figure 2C:
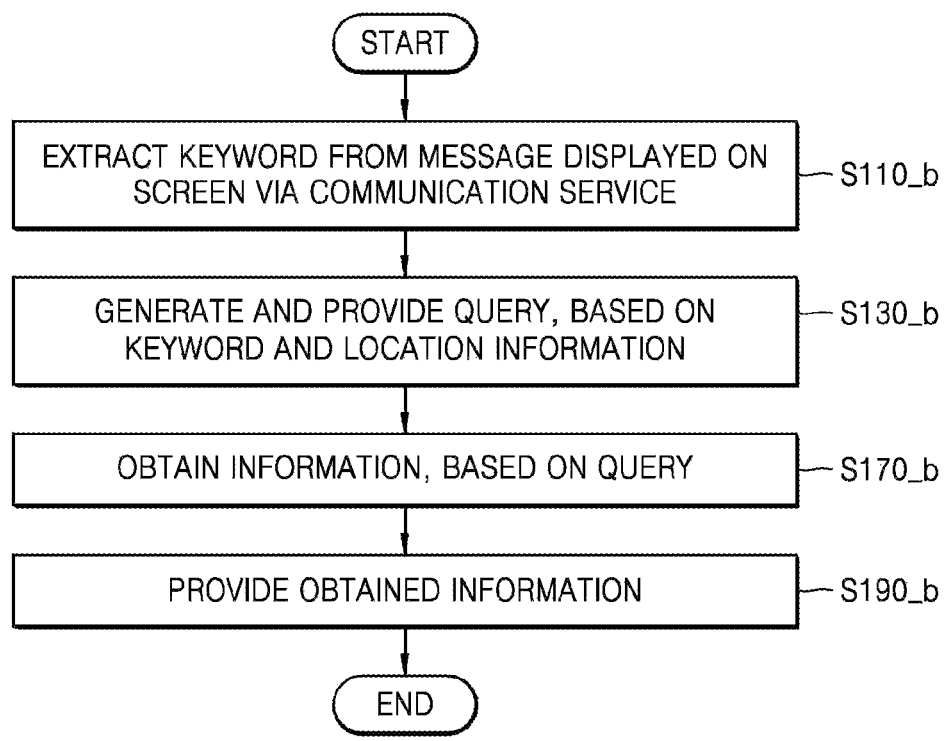
FIG. 2C illustrates a flowchart of a method, performed by an electronic device, of providing information, according to still another exemplary embodiment.

FIG. 2C illustrates a flowchart of a method, performed by the electronic device 100, of providing information, according to still another exemplary embodiment.

The electronic device 100 may extract a keyword from a message used in communication, may generate a query, based on the keyword and location information, and may provide the generated query to a user (S110_b and S130_b).

The electronic device 100 may recognize the location information in various manners, and may provide the query. For example, the electronic device 100 may generate the query by considering location information of the electronic device 100 that is obtained a GPS module of the electronic device 100, or may generate the query by considering location information obtained according to a word included in the message, connection relation between words (e.g., a connective word (e.g., next to, near, or rear) for connecting words expressing places), meaning of the word, etc.

The electronic device 100 may use the location information obtained in the aforementioned manners to generate a keyword and/or the query. Also, the electronic device 100 may use the location information to obtain information to be provided to the user.

The electronic device 100 may obtain the information, based on the query (S170_b). The electronic device 100 may provide the information in various manners (S190_b). The electronic device 100 may provide the information in various manners to be described with reference to FIGS. 22 through 29.

Hereinafter, detailed scenarios are described below.

[Scenario 1: Messaging Service]

FIGS. 3 through 7 illustrate detailed UI environments provided during communication via a messaging service.

Figure 3:
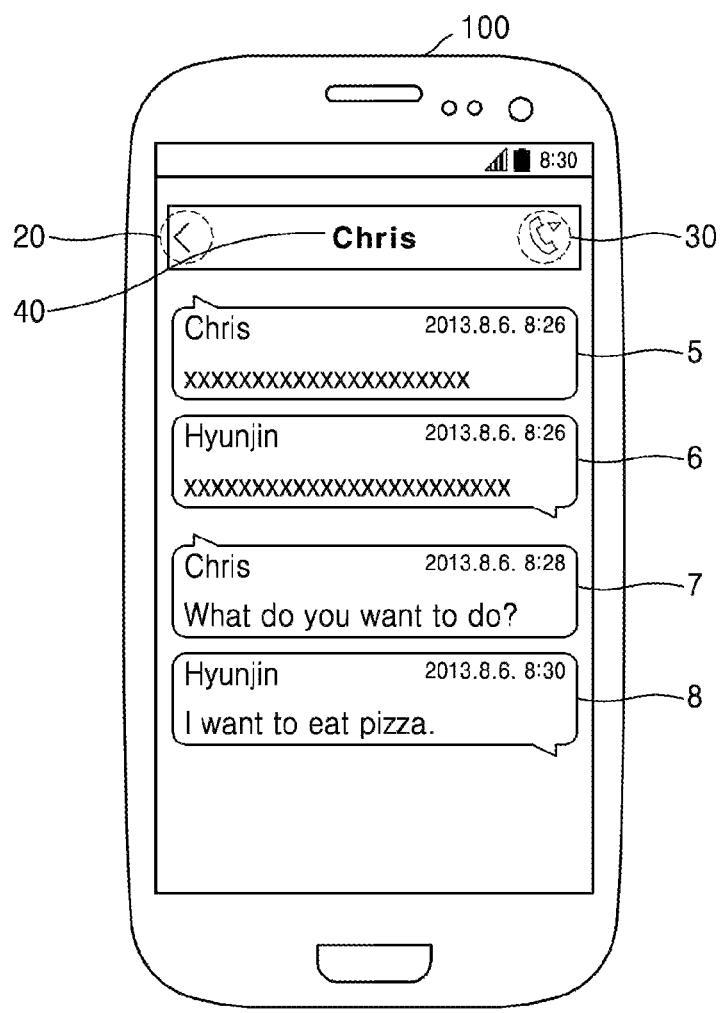
FIGS. 3, 4A-C, 5, 6A-C, and 7 illustrate detailed UI environments provided during communication via a messaging service.

Referring to FIG. 3, the electronic device 100 may display communication contents between users via the messaging service.

The electronic device 100 may provide an interface including a back button 20, a voice call connection button 30, a user name box 40, and a communication window (refer to reference numerals 5, 6, 7, and 8). The user name box 40 may include the back button 20 and the voice call connection button 30.

A user may return to a previous menu by using the back button 20 (e.g., touching or double-tapping the back button 20). The user may perform voice chatting by using the voice call connection button 30 (e.g., touching or double-tapping the voice call connection button 30). The user name box 40 may display a name or a nickname of another party in conversation. Also, the user name box 40 may display a name or a nickname of the user of the electronic device 100. The communication window may display messages 5, 6, 7, and 8 that are exchanged between the user and another party.

Figure 36:
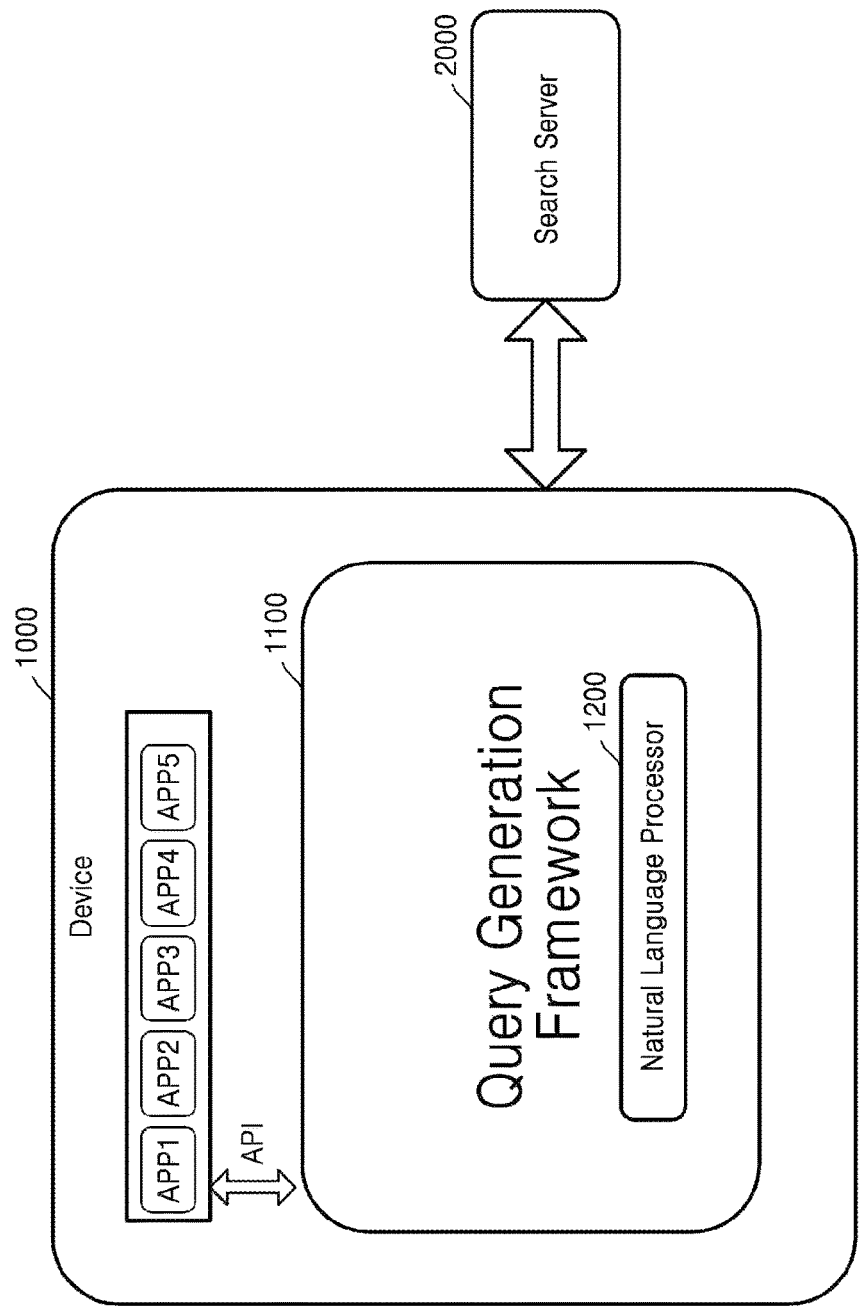
FIG. 36 illustrates an electronic device, according to an exemplary embodiment.

The electronic device 100 may determine whether to extract a keyword from each of messages 5, 6, 7, and 8, by using a natural language processor 1200 (refer to FIG. 36). The electronic device 100 may recognize a meaning of each of the messages 5, 6, 7, and 8, and may determine whether to extract a keyword therefrom.

Also, the electronic device 100 may extract 'pizza' as a keyword via a statistical analysis and/or a semantic analysis. For example, the electronic device 100 may extract 'pizza' as the keyword, based on 1) content of conversation between users, 2) a user's location log, 3) user's previously input information, and 4) history information about a user.

For example, the electronic device 100 may perform the natural language analysis on 1) the content of conversation between the users, and may extract 'pizza' as the keyword. The electronic device 100 may recognize a meaning of a message included in the content of conversation between the users, and may predict the user's need, based on the meaning of the message. For example, the electronic device 100 may analyze the meaning of the message as 'the user wants to eat pizza', may predict, based on the meaning, that 1) the user wants to find a pizza restaurant or 2) the user needs a telephone number of the pizza restaurant near a current location of the user, and may extract 'pizza' as the keyword.

Also, for example, the electronic device 100 may perform the natural language analysis on the content of conversation, and may extract 'pizza' as the keyword by further considering 2) the user's location log, 3) the user's previously input information, and 4) the history information about the user.

For example, the user's location log may include a frequency of the user passing a place where the user is currently located, the number of times that the user passed the place where the user is currently located, a total time during which the user stays in the place where the user is currently located, a total time during which the user stays in the place where the user is currently located during a particular time period, and/or a time when the user first visits the current place.

For example, the user's previously input information may include an address of the user, a user's preference for a pizza restaurant, a user's tendency in selecting menu, and/or a place according to an estimated schedule of the user.

For example, the history information about the user may indicate a history about the user which is recorded in the electronic device 100 and a server. Also, the history about the user may include a history recorded by the user when the user uses the electronic device 100, and a history recorded to the server, by the user, when the user uses an App service. Also, the history about the user may include content that is not directly recorded by the user but is indirectly recorded when the user uses the electronic device 100 or the APP service.

Figure 4A:
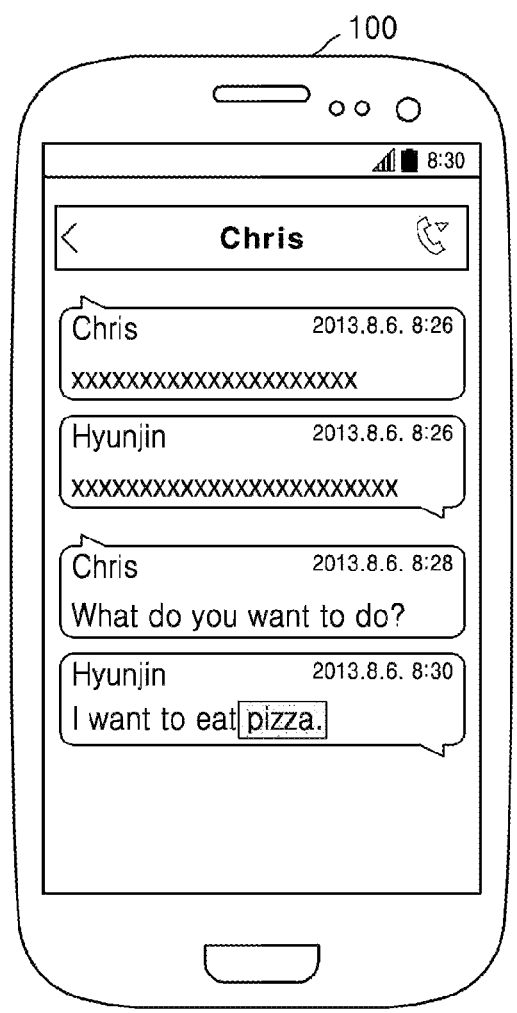
Figure 4B:
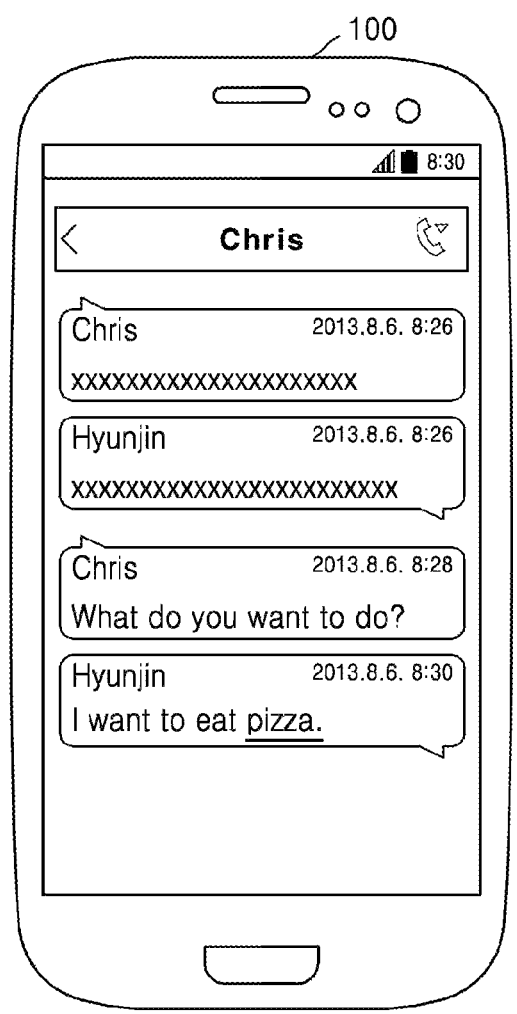
Figure 4C:
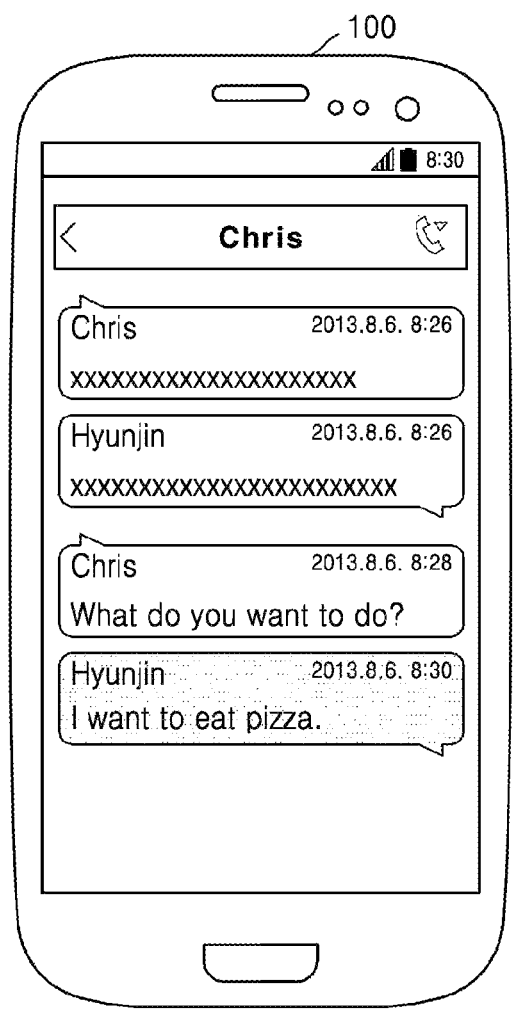

Referring to FIGS. 4A through 4C, the electronic device 100 may continuously monitor conversation content of the user, as shown in FIG. 4, and may separately indicate or mark a keyword included in a message.

For example, the electronic device 100 may highlight the keyword included in a message as shown in FIG. 4A, may underline the keyword as shown in FIG. 4B, or may change a color of a speech balloon including the keyword as shown in FIG. 4C.

The electronic device 100 may allow the user to adjust, via settings, a duration time of the separate indication or mark on the keyword (refer to FIG. 31E).

Although not illustrated, the electronic device 100 may indicate or mark, by using various methods, the keyword to differentiate the keyword from other contents of the message.

For example, the electronic device 100 may mark the keyword included in the message, by using a different font, or putting a box around the keyword.

For example, the electronic device 100 may mark the keyword included in the message, by using a hyperlink.

For example, the electronic device 100 may mark the keyword included in the message, by using a flickering effect.

For example, the electronic device 100 may mark the keyword included in the message, by using an avatar.

For example, the electronic device 100 may mark the keyword included in the message, by using a speech balloon.

For example, the electronic device 100 may mark the keyword included in the message, by using a superscript or a subscript.

For example, the electronic device 100 may mark the keyword included in the message, by using a color different from a color of other contents of the message.

The above examples are given only for illustrative purposes and the exemplary embodiments are not limited thereto. The electronic device 100 may indicate or mark the keyword by using any method to differentiate the keyword from other contents of the message.

Figure 5:
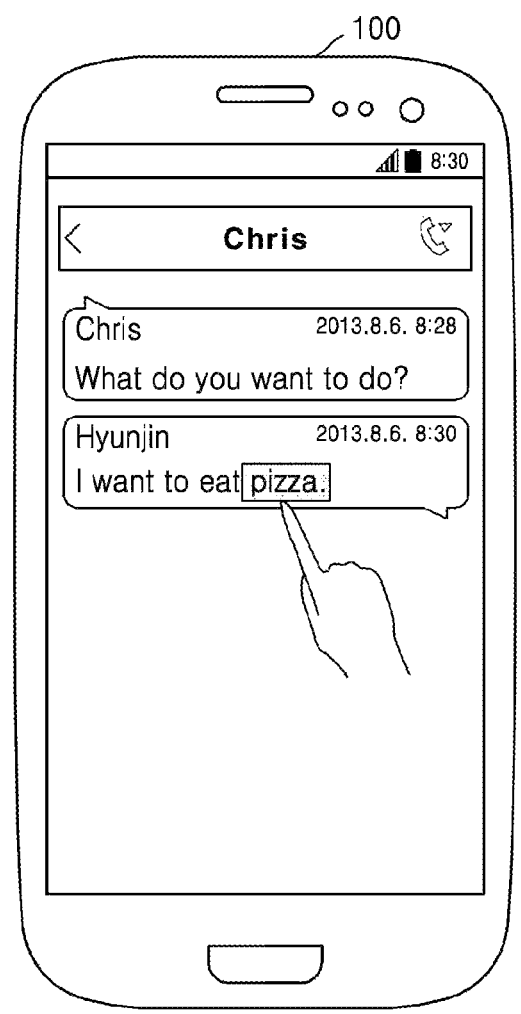

Referring to FIG. 5, the electronic device 100 may receive a user input corresponding to an indication or a mark that requires an input. The user may input a request by using various methods. The electronic device 100 may receive an information provision request input.

The information provision request input may indicate an input by the user to request the electronic device 100 to provide information. For example, the user may input the request by using various input methods (e.g., a touch, a click, a double click, etc.) to request the electronic device 100 to provide the information. Also, the user may input a particular command including a voice and/or a text to request the electronic device 100 to provide the information.

For example, the electronic device 100 may select the keyword by receiving voice of the user via a microphone or a voice recognition processor. For example, the electronic device 100 may select the keyword by receiving a click of the user via a mouse, a touch panel, or a touch pad. For example, the electronic device 100 may select the keyword by receiving a touch of the user via the touch panel or the touch pad. For example, the electronic device 100 may select the keyword by receiving a preset particular gesture of the user via a sensing camera. For example, the electronic device 100 may receive an input of selecting the keyword via a virtual keyboard or a virtual touchscreen.

Figure 6A:
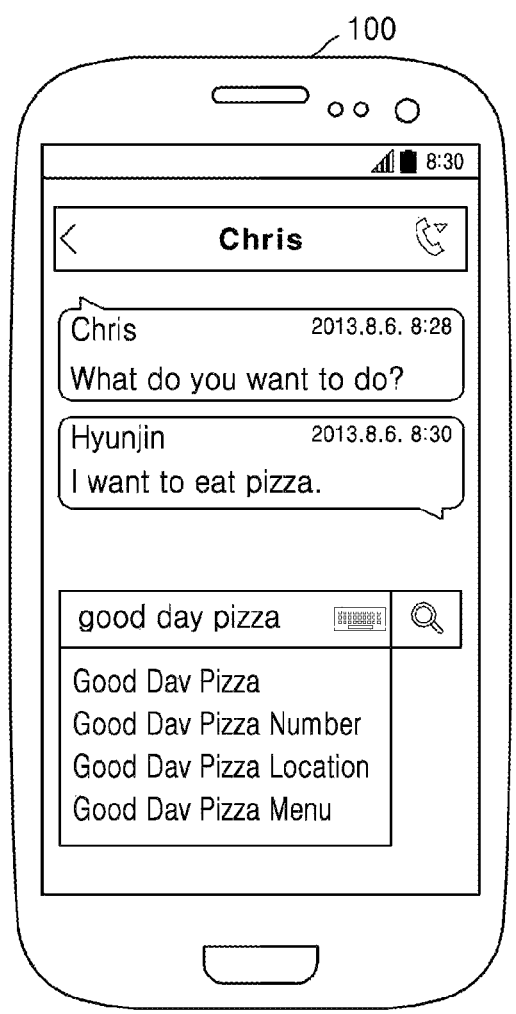
Figure 6B:
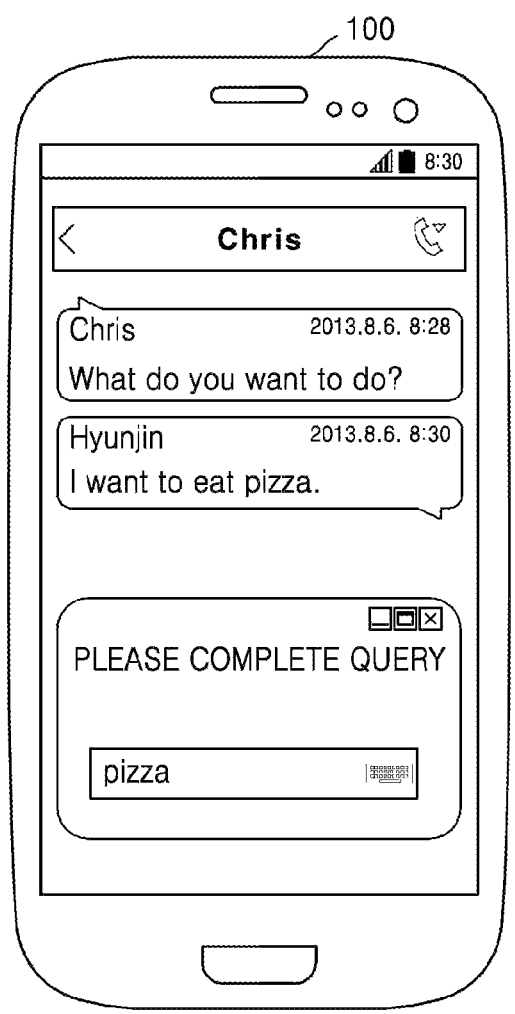
Figure 6C:
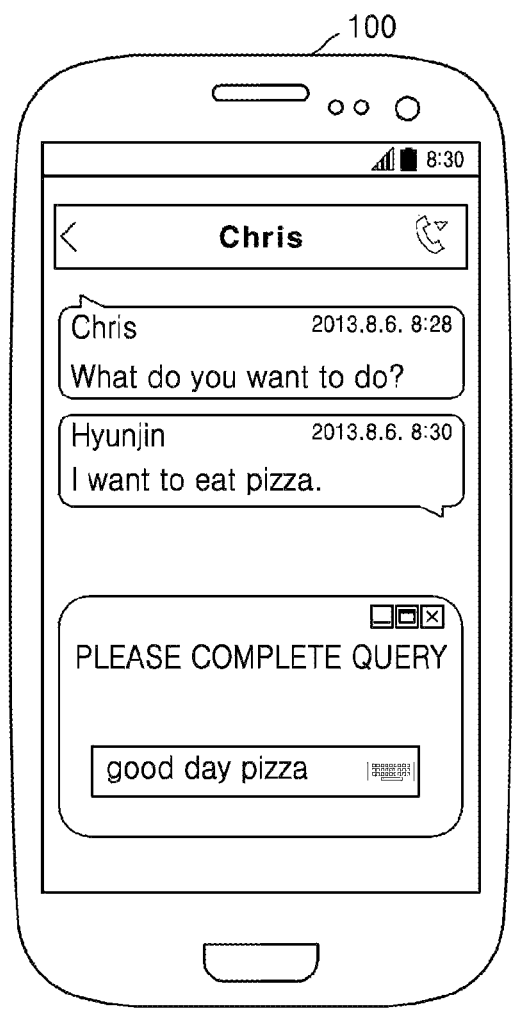

Referring to FIGS. 6A through 6C, the electronic device 100 may provide a query related to a keyword.

FIG. 6A illustrates a screen of the electronic device 100 that displays a keyword (e.g., 'pizza') in a main box and displays candidate queries in a candidate list window 610 below the main box. For example, candidate queries for the keyword 'pizza' may include 'good day pizza', 'good day pizza number', 'good day pizza location', and 'good day pizza menu'.

The electronic device 100 may generate the candidate queries by performing a statistical analysis and/or a semantic analysis, based on the extracted keyword. As illustrated, the electronic device 100 may generate the candidate queries 'good day pizza', 'good day pizza number', 'good day pizza location', and 'good day pizza menu', based on 1) content of conversation between users, 2) a user's location log, 3) user's previously input information, and 4) history information about a user.

The electronic device 100 may add a candidate query according to 1) the content of conversation between the users.

For example, the electronic device 100 may continuously perform natural language processing on the content of conversation between the users and may recognize a meaning of the content of conversation while the electronic device 100 monitors the content of conversation between the users. When the electronic device 100 recognizes that 'pizza' is a main topic and the user wants to order 'pizza', according to the content of conversation between the users, the electronic device 100 may predict that the user needs a telephone number of a pizza restaurant. Also, if a word 'good day pizza' is used in the content of conversation between the users, the electronic device 100 may add 'good day pizza number' as the candidate query.

For example, when the electronic device 100 recognizes that 'pizza' is the main topic and the user wants to order 'good day pizza', according to the content of conversation between the users, the electronic device 100 may predict that the user needs information about a pizza restaurant. Also, when a kind of pizza that the user wants to eat is included in the content of conversation between the users, the electronic device 100 may add 'good day pizza menu' as the candidate query.

The electronic device 100 may add a candidate query, according to 2) the user's location log.

For example, the electronic device 100 recognizes that the user wants to find a pizza restaurant near a current location or to have a telephone number of the pizza restaurant near the current location, and a record that the user paid a bill in the 'good day pizza' restaurant occurs frequent in payment detail reception messages in a history of the user, the electronic device 100 may add 'good day pizza' as the candidate query.

For example, if the electronic device 100 recognizes that the user wants to find a pizza restaurant near a current location, and a record that the user visited the 'good day pizza' restaurant occurs frequent in an accumulated history of a user's location, the electronic device 100 may add 'good day pizza location' as the candidate query.

For example, if the electronic device 100 recognizes that the user wants to have a telephone number of a pizza restaurant near a current location, and a record that the user called the 'good day pizza' restaurant occur frequent in a call history of the user, the electronic device 100 may add 'good day pizza number' as the candidate query.

The electronic device 100 may add a candidate query by analyzing 3) the user's previously input information.

For example, the electronic device 100 may analyze the user's previously input information, and may recognize that the 'good day pizza' restaurant is a user's favorite pizza restaurant.

The user may directly record the 'good day pizza' restaurant as the user's favorite pizza restaurant to the electronic device 100. Also, if the user recorded a plurality of pieces of information about the 'good day pizza' restaurant to the electronic device 100, the electronic device 100 may recognize that the 'good day pizza' is the user's favorite pizza restaurant. If there is no direct record about information of the user's favorite pizza restaurant, the electronic device 100 may recognize, by performing the statistical analysis, that the 'good day pizza' restaurant is the user's favorite pizza restaurant, and may add 'good day pizza number' as the candidate query.

The electronic device 100 may determine, from information input to a server via an application service, that the 'good day pizza' restaurant is the user's favorite pizza restaurant. The user may directly record the 'good day pizza' restaurant as the user's favorite pizza restaurant to a database of the server via the application service. Also, if the user recorded a plurality of pieces of information about the 'good day pizza' restaurant to the database of the server via the application service, the electronic device 100 may determine that the 'good day pizza' restaurant is the user's favorite pizza restaurant. If there is no direct record about information of the user's favorite restaurant in the server, the electronic device 100 may recognize, by performing the statistical analysis, that the 'good day pizza' restaurant is the user's favorite pizza restaurant, and may add 'good day pizza number' as the candidate query.

The electronic device 100 may add a candidate query, according to 4) the history information about the user. The electronic device 100 may check a payment history of the user, and a plurality of records of paying a bill in the 'good day pizza' restaurant are found, the electronic device 100 may determine that the 'good day pizza' restaurant is the user's favorite pizza restaurant. When the electronic device 100 checks a search history of the user, and detects that the user retrieved menus of the 'good day pizza' restaurant several times, the electronic device 100 may add 'good day pizza menu' as the candidate query.

FIG. 6B illustrates a UI that displays, in an input box, a query that is an extracted keyword (e.g., 'pizza') as a default value. The keyword may be determined by using various methods described with reference to FIGS. 2A through 2C. For example, the electronic device 100 may generate the query that is same as the determined keyword, and the query may be edited via an input interface provided by the electronic device 100.

FIG. 6C illustrates a UI that displays a query (e.g., 'good day pizza'), as a default value, in an input box.

The query may be determined by using various methods described with reference to FIGS. 2A through 2C. For example, the query may be generated based on a keyword and location information, as described with reference to FIG. 2C. For example, when the keyword is 'pizza', a word 'good day pizza' is mentioned several times in messages between users, the electronic device 100 may generate 'good day pizza' as the query.

The keyword may be edited via an input interface provided by the electronic device 100. For example, a user may edit the query 'good day pizza' to 'good day pizza location', 'good day pizza number', 'good day pizza menu', or the like. The electronic device 100 may obtain information, based on the query edited by the user.

Figure 7:
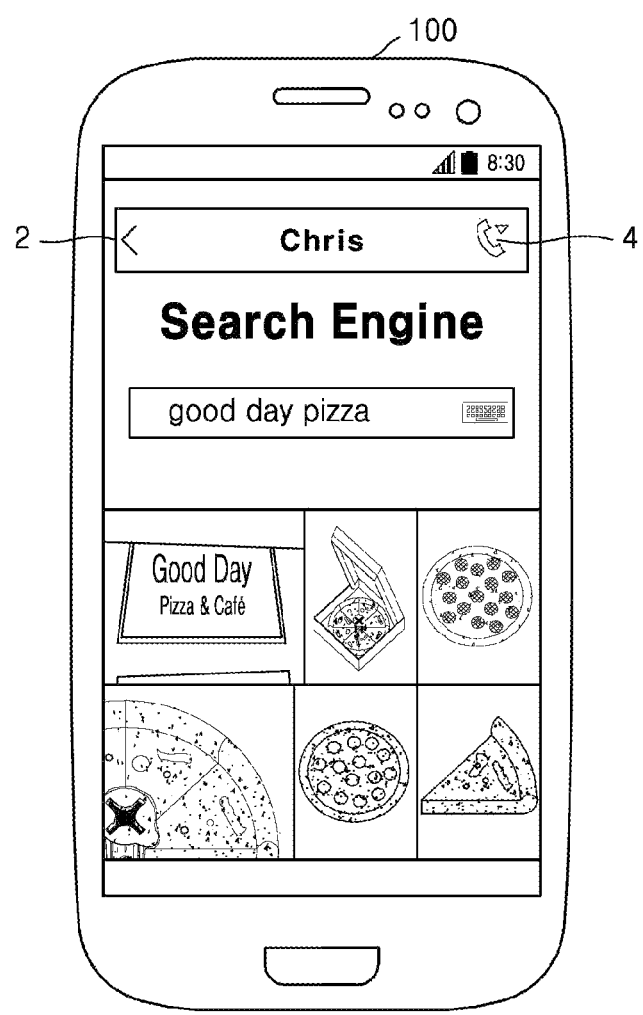

Referring to FIG. 7, the electronic device 100 may provide a search result via screen conversion. Also, the electronic device 100 may provide a search result by using various methods to be described with reference to FIGS. 22 through 29. The electronic device 100 may provide, in a user name box, a messaging service button 4 for returning to the messaging service. Alternatively, the electronic device 100 may provide a back button 2 for returning to the messaging service.

[Scenario 2: Voice Chatting Service]

Figure 8:
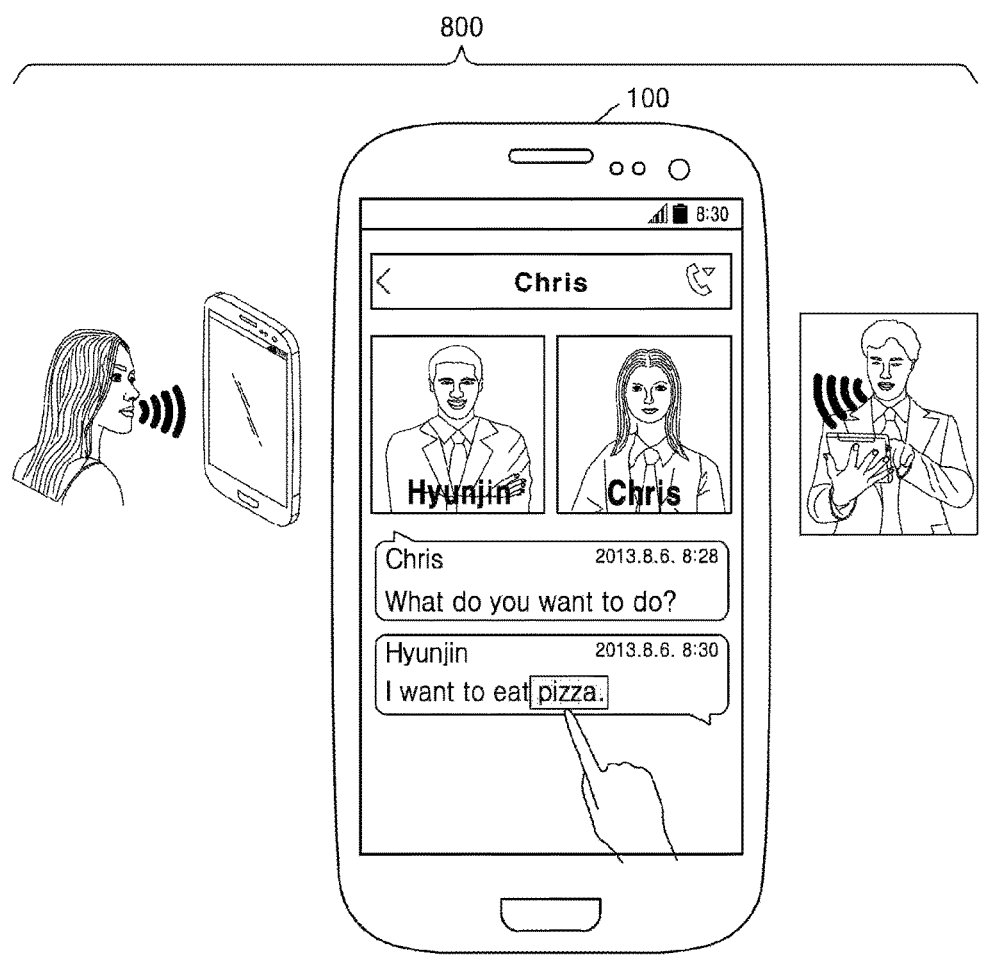
FIGS. 8, 9A-B, and 10 illustrate detailed UI environments that are provided during communication via a voice chatting service.
Figure 9A:
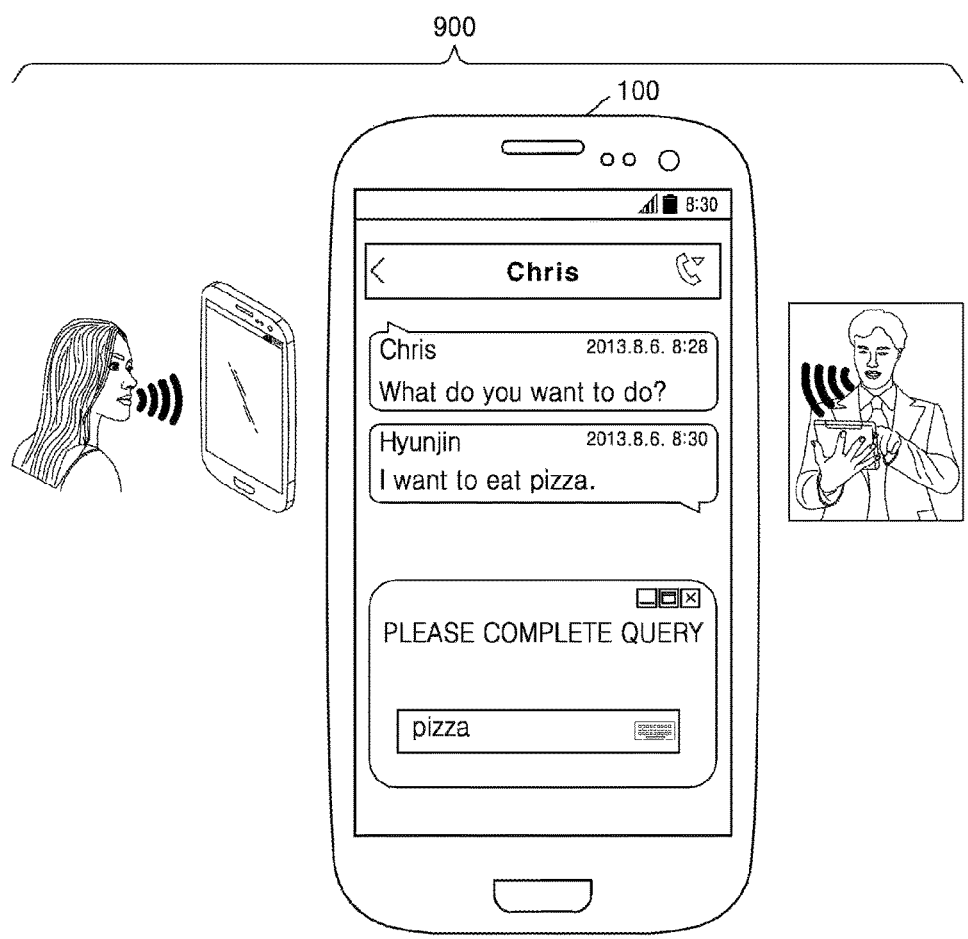
Figure 9B:
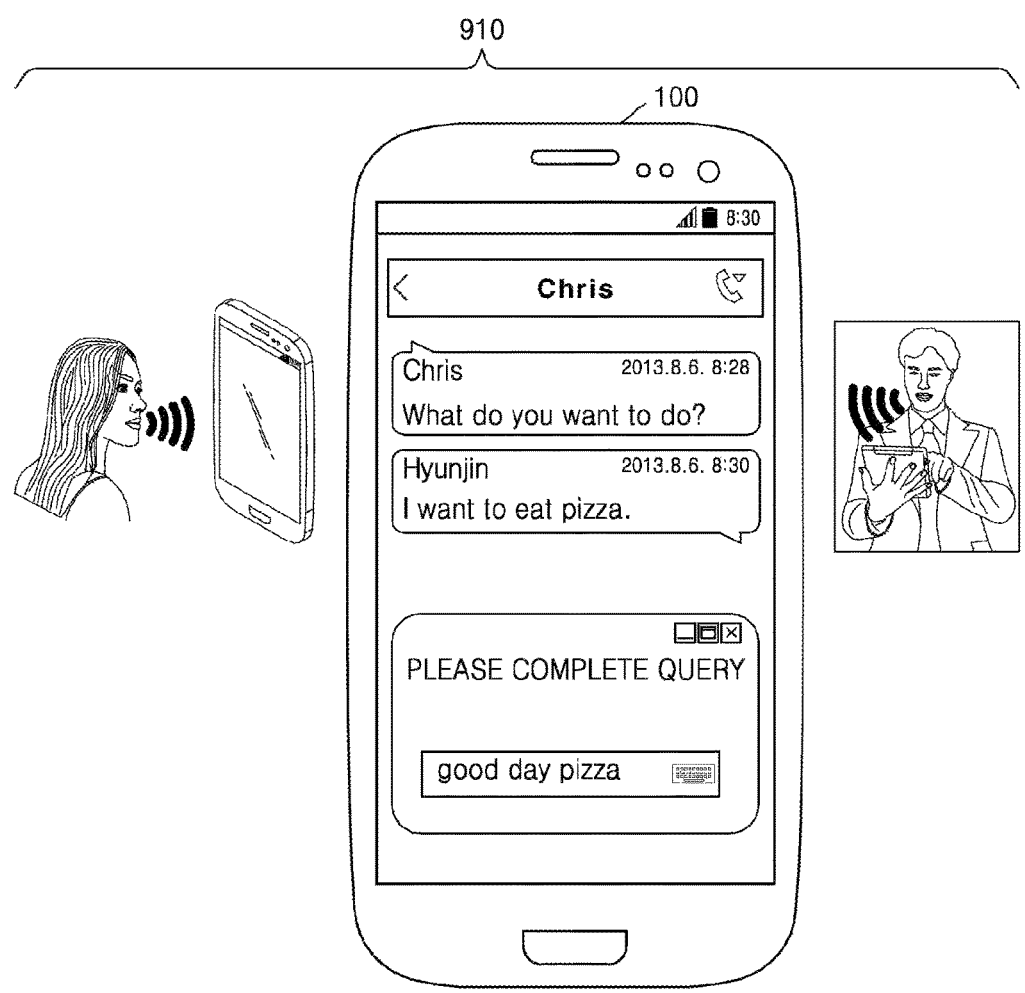
Figure 10:
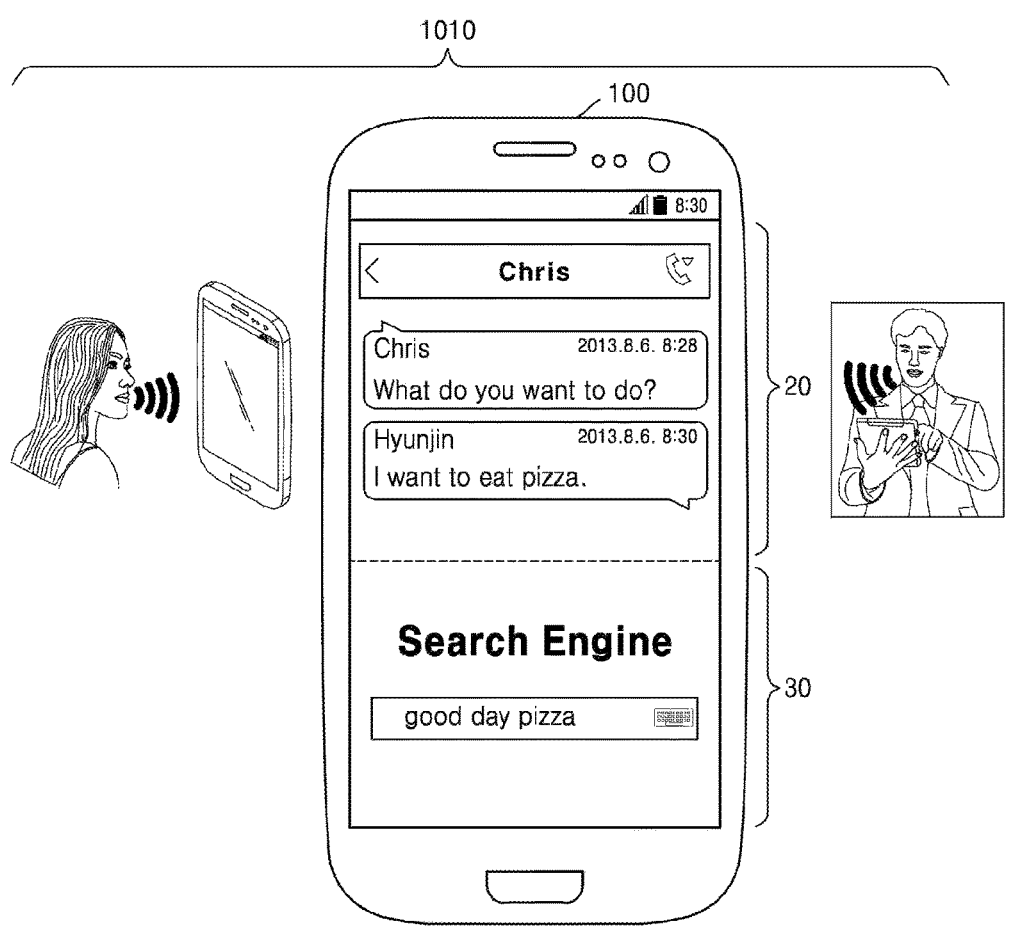

FIGS. 8 through 10 illustrate detailed UI environments that are provided during communication via a voice chatting service. Throughout the specification, the voice chatting service may include, but not limited to, a voice call service. Further, the voice chatting service may include, but not limited to, a video call service.

Referring to FIG. 8, in an example 800 of the voice chatting service (or the video call service), the electronic device 100 may display communication contents between users via the voice chatting service, as illustrated in FIG. 3.

A user of the electronic device 100 may have a conversation with another party via the voice chatting service. During the conversation between the user and the other party, the user delivers a voice message 'I want to eat pizza'. The voice message of the user may be converted to a text by using a speech to text (STT) module (or STT engine), and may be displayed on a screen of the electronic device 100.

The electronic device 100 may determine whether to extract a keyword from each of messages which are converted to texts by using the STT module via the natural language processor 1200 (refer to FIG. 36). The electronic device 100 may recognize a meaning of each of the messages, and may determine whether to extract the keyword from each of the messages.

Also, the electronic device 100 may extract 'pizza' as the keyword by performing a statistical analysis and/or a semantic analysis. A method of extracting the keyword, the method being performed by the electronic device 100, may include the method described with reference to FIG. 3.

For example, the electronic device 100 may perform the natural language analysis on 1) content of conversation between users, and extract 'pizza' as the keyword by further considering 2) a user's location log, 3) user's previously input information, and 4) history information about the user.

Similar to FIG. 4, the electronic device 100 may continuously monitor conversation content of the user, and may separately indicate or mark the keyword included in a message that is a keyword extraction target, in a similar manner to FIG. 4.

Also, similar to FIG. 5, the electronic device 100 may receive a user input corresponding to an indication or a mark that requires an input. The user may input a request by using various methods as described with reference to FIG. 5.

Referring to FIGS. 9A and 9B, the electronic device 100 may provide a query related to a keyword.

FIG. 9A illustrates an example 900 of the voice chatting service in which a UI that displays a keyword (e.g., 'pizza'), as a default value, in an input box is provided. The keyword may be determined by using various methods described in the operation S110 of FIG. 2A. The electronic device 100 may generate a query that is same as the keyword, and the query may be edited via an input interface provided by the electronic device 100.

FIG. 9B illustrates an example 910 of the voice chatting service in which a UI that displays a query (e.g., 'good day pizza'), as a default value, in an input box is provided. The query may be determined by using various methods as described in the operation S130 of FIG. 2A. The keyword may be edited via an input interface provided by the electronic device 100. Also, the electronic device 100 may provide candidate queries as shown in FIG. 6A, other than the methods shown in FIGS. 9A and 9B.

Referring to FIG. 10, in an example 1010 of the voice chatting service, the electronic device 100 may partition a screen of the electronic device 100 into two areas 20 and 30, and may provide a search result to the area 30 of the partitioned two areas 20 and 30. The electronic device 100 may partition the screen into the two areas 20 and 30, may display a chatting App screen on the area 20 in an upper part of the screen, and may display a search engine service screen on the area 30 in a lower part of the screen. Also, the user may select to display the chatting App screen on an entire portion of the screen by touching the chatting App screen in the upper part.

In addition, the electronic device 100 may provide the search result by using various methods to be described with reference to FIGS. 22 through 29.

[Scenario 3: Mailing Service]

FIGS. 11 through 15 illustrate detailed UI environments that are provided during communication via a mailing service.

Figure 11:
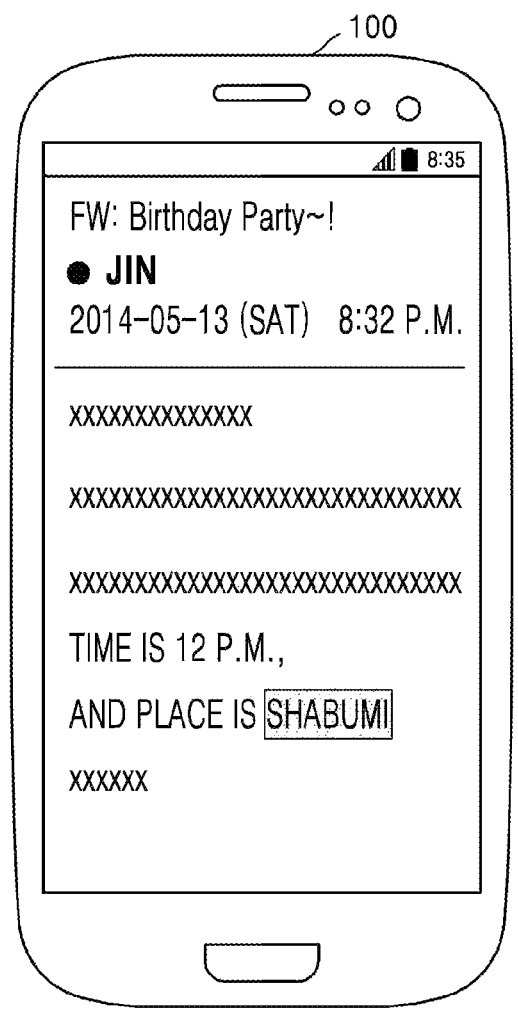
FIGS. 11 through 15 illustrate detailed UI environments that are provided during communication via a mailing service.

Referring to FIG. 11, the electronic device 100 may display communication content between users via the mailing service.

A user of the electronic device 100 may communicate with the other party via e-mailing. An e-mail received by the user includes a comment about an appointment time and place.

The electronic device 100 may determine whether to extract a keyword from each of sentences in messages via the natural language processor 1200 (refer to FIG. 36). The electronic device 100 may recognize a meaning of each of the messages, and may determine whether to extract the keyword.

Also, the electronic device 100 may extract the keyword by performing a statistical analysis and/or a semantic analysis. A method of extracting the keyword, the method being performed by the electronic device 100, may include the method described with reference to FIG. 3.

For example, the electronic device 100 may perform the natural language analysis on 1) content of conversation between users, and extract 'Shabumi' as the keyword by further considering 2) a user's location log, 3) user's previously input information, and 4) history information about the user.

Similar to FIG. 4, the electronic device 100 may continuously monitor conversation content of the user, and may separately indicate or mark the keyword included in a message that is a keyword extraction target, in a similar manner to FIG. 4.

Figure 12:
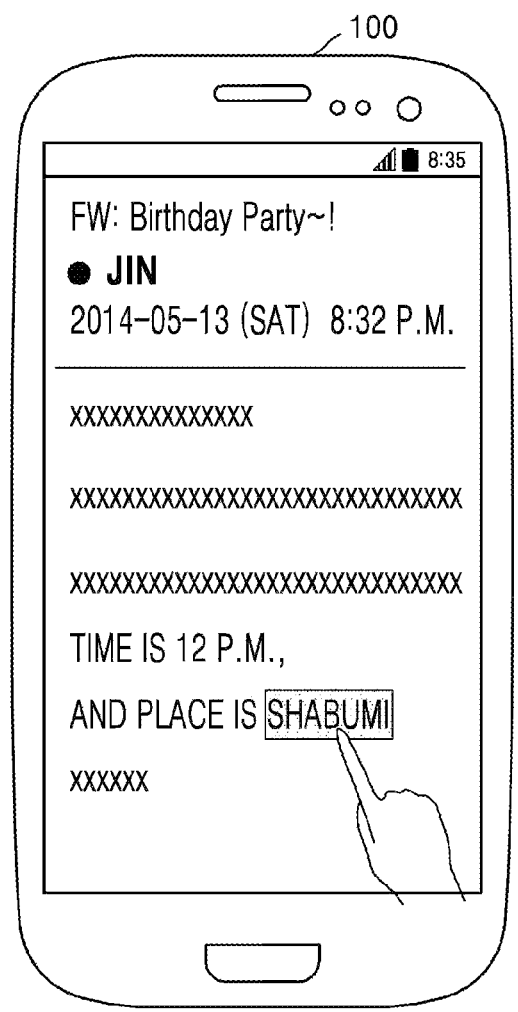

Referring to FIG. 12, similar to FIG. 5, the electronic device 100 may receive a user input corresponding to an indication or a mark. The user may input a request by using various methods as described with reference to FIG. 5.

Figure 13:
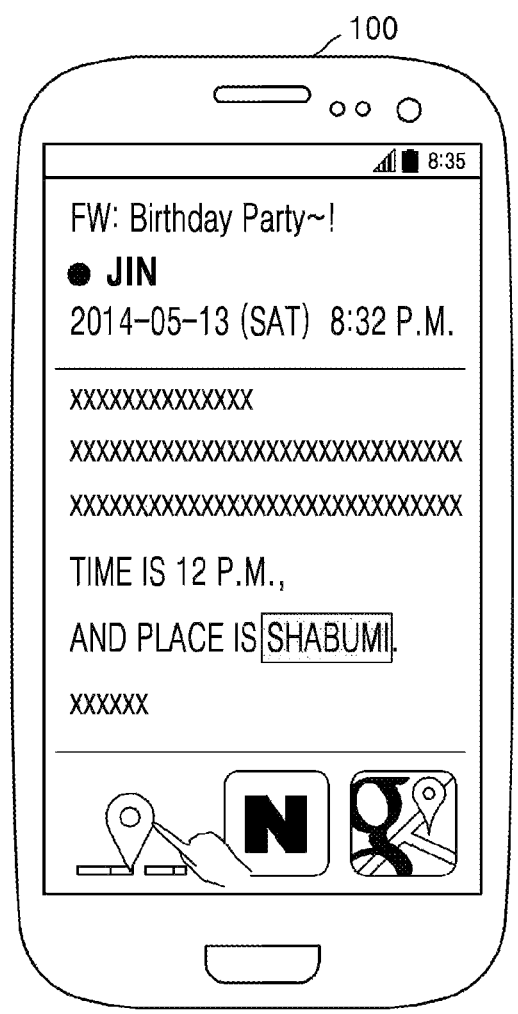

Referring to FIG. 13, the electronic device 100 may provide a list of Apps related to the keyword. For example, the electronic device 100 may check a category of the keyword, and if the keyword is a word related to a place, the electronic device 100 may recognize the place as the category, and may provide a list of Apps related to a map.

In another exemplary embodiment, the electronic device 100 may not provide the list of Apps related to the keyword, and may obtain information by using a preset App.

Figure 14:
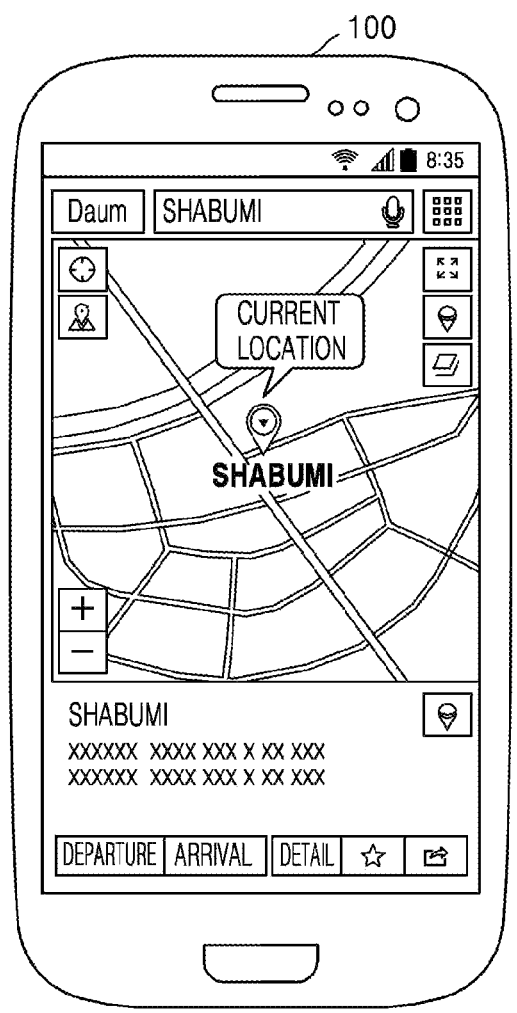

FIG. 14 illustrates a UI that displays a keyword (e.g., 'Shabumi'), as a default value, in an input box. The keyword may be determined by using various methods described in the operation S110 of FIG. 2A. For example, the electronic device 100 may generate a query that is same as the keyword. The query may be determined by using various methods as described in the operation S130 of FIG. 2A.

The query may be edited via an input interface. For example, the electronic device 100 may extract 'Shabumi' as the keyword, and may generate the query as 'Shabumi' same as the keyword. A user may edit the query to 'Shabumi Dogok branch' via the input interface. Also, the electronic device 100 may automatically generate the query as 'Shabumi restaurant'. The electronic device 100 may obtain information about a location of 'Shabumi restaurant' via an App service.

Figure 15:
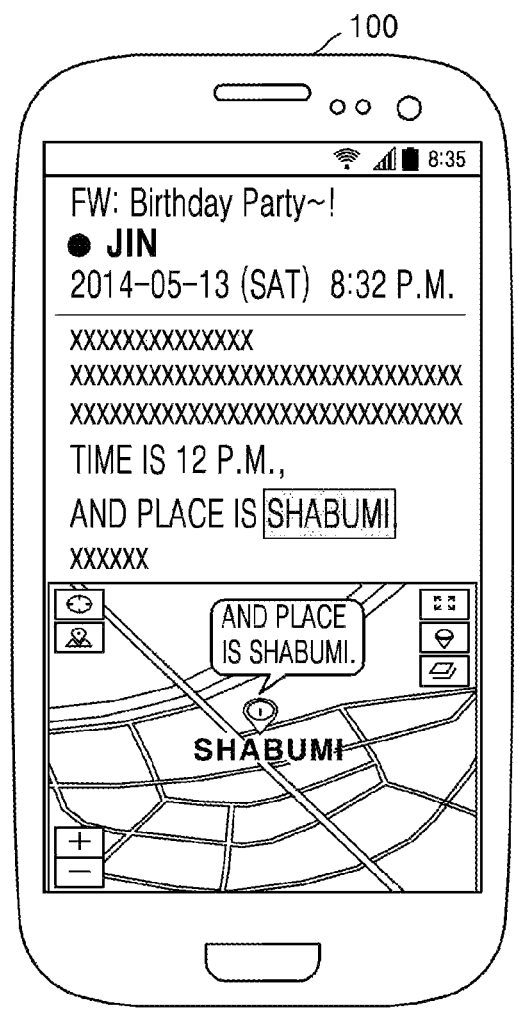

Referring to FIG. 15, the electronic device 100 may provide a search result via screen partition. Also, the electronic device 100 may provide the search result by using various methods to be described with reference to FIGS. 22 through 29.

[Scenario 4: Social Network Service]

FIGS. 16 through 19 illustrate detailed UI environments that are provided during communication via an SNS.

Figure 16:
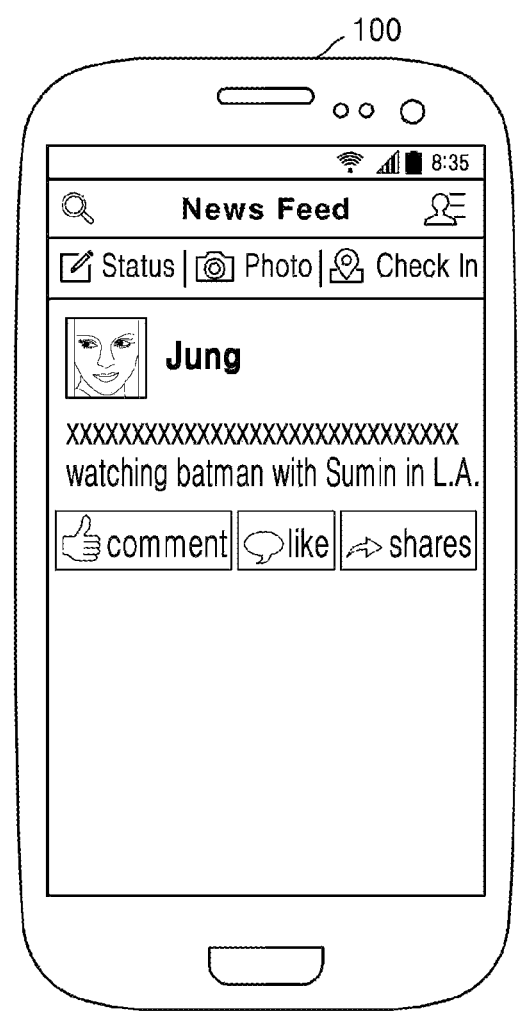
FIGS. 16 through 19 illustrate detailed UI environments that are provided during communication via a social network service (SNS)

Referring to FIG. 16, the electronic device 100 may display communication content between users via the SNS.

The electronic device 100 may display contents of a memo of another party via the SNS. As shown in FIG. 16, from the contents 'watching batman with Sumin in L.A.' of the memo of the other party (Jung), words such as 'batman', 'Sumin', and 'L.A.' may be extracted as keywords. The electronic device 100 may determine whether to extract a keyword from each of sentences included in messages via the natural language processor 1200 (refer to FIG. 36). The electronic device 100 may recognize a meaning of each of the messages, and may determine whether to extract the keyword.

Also, the electronic device 100 may extract 'batman', 'Sumin', and 'L.A.' as the keywords by performing a statistical analysis and/or a semantic analysis. A method of extracting the keyword, the method being performed by the electronic device 100, may include the method described with reference to FIG. 3.

For example, the electronic device 100 may perform the natural language analysis on 1) content of conversation between users, and extract 'batman', 'Sumin', and 'L.A.' as the keywords by further considering 2) a user's location log, 3) user's previously input information, and 4) history information about the user.

Also, similar to FIG. 4, the electronic device 100 may continuously monitor conversation content of the user, and may separately indicate or mark the keyword included in a message that is a keyword extraction target, in a similar manner to FIG. 4.

Figure 17:
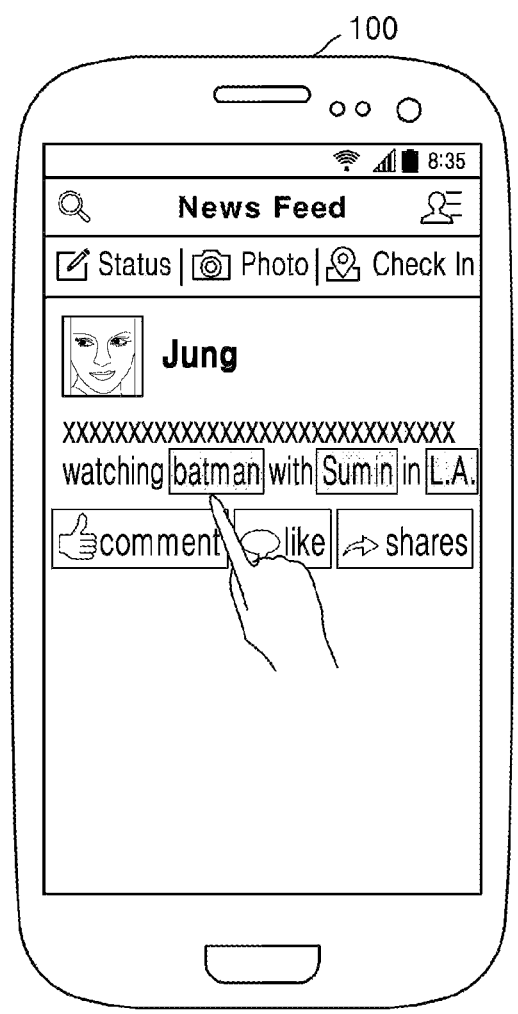

Referring to FIG. 17, similar to FIG. 5, the electronic device 100 may receive a user input corresponding to an indication or a mark. The user may input a request by using various methods as described with reference to FIG. 5. The user may select a query from among the keywords. When the user selects 'batman' as the keyword, the electronic device 100 may obtain information about 'batman' via an App service.

Figure 18:
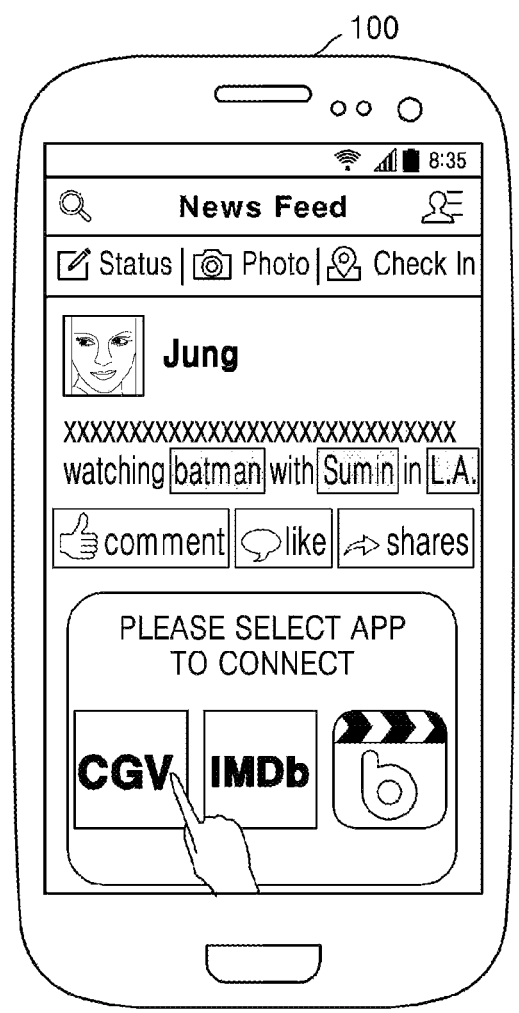

Referring to FIG. 18, the electronic device 100 may provide a list of Apps related to the keyword. For example, the electronic device 100 may check a category of the keyword, and if the keyword is a word related to a movie, the electronic device 100 may recognize the movie as the category, and may provide a list of Apps related to the movie.

Figure 19:
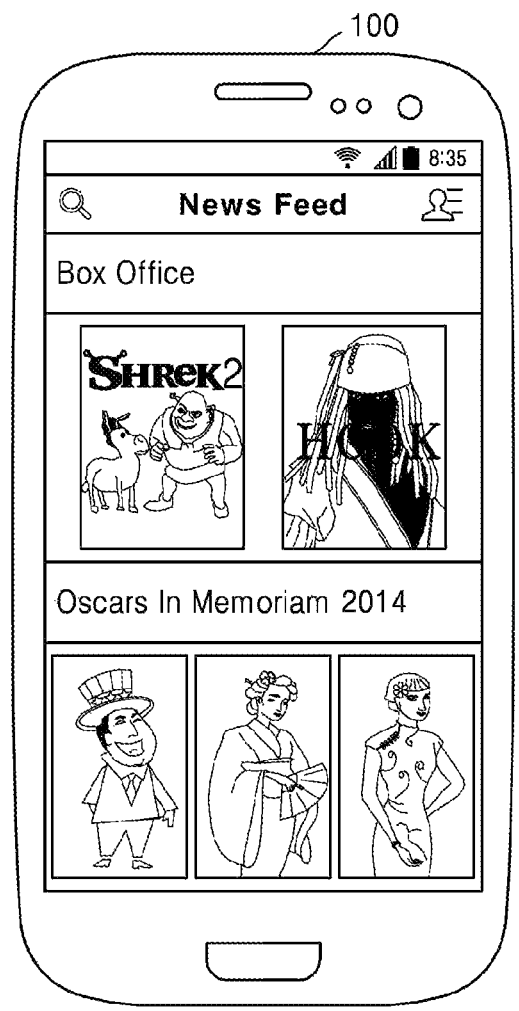

Referring to FIG. 19, the electronic device 100 may provide a search result via screen conversion. Also, the electronic device 100 may provide the search result by using various methods to be described with reference to FIGS. 22 through 29.

[Scenario 5: Scheduler]

Figure 20:
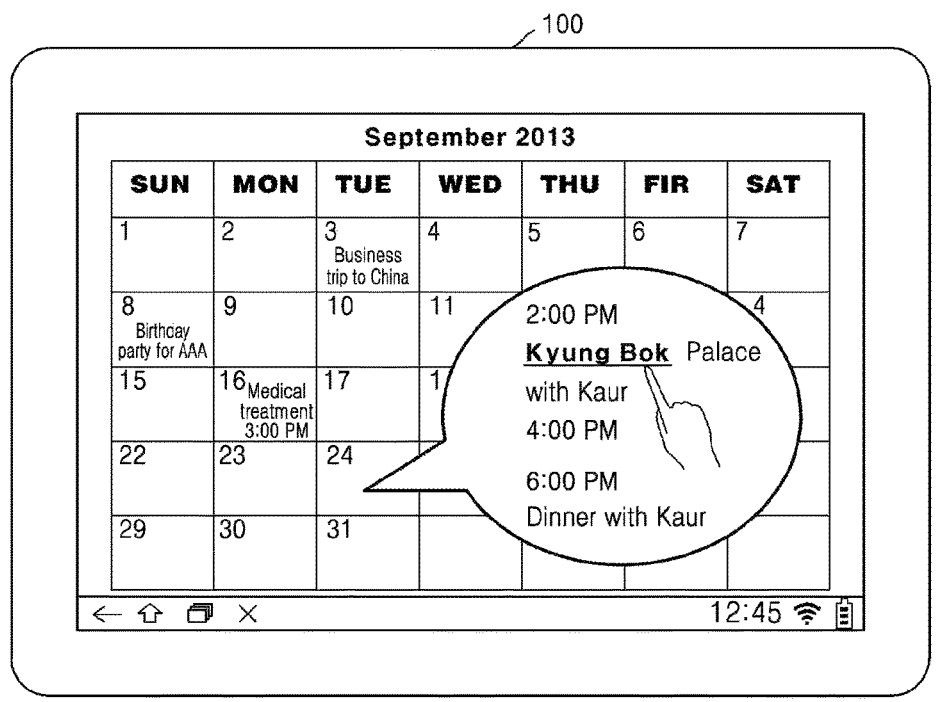
FIG. 20 illustrates a detailed UI environment that is provided while a scheduler service is used.

FIG. 20 illustrates a detailed UI environment that is provided while a scheduler service is used.

Referring to FIG. 20, the electronic device 100 may be a tablet PC. The electronic device 100 may provide a scheduler App service to a user. The user may manage his/her time schedules by using the scheduler App service.

For example, it is assumed that the user has a schedule registered with the scheduler APP for Sep. 24, 2013. Also, it is assumed that the registered schedule indicates that the user tours Kyung Bok Palace with 'Kaur' and has dinner with 'Kaur'.

The electronic device 100 may recognize, from a call history of the user, that the user did not call restaurants near Kyung Bok Palace, and may recognize, from an internet search history of the user, that the user did not search the restaurants near Kyung Bok Palace. Also, the electronic device 100 may recognize, by using a GPS module included in the electronic device 100, that the user did not visit Kyung Bok Palace. In this case, the electronic device 100 may extract, as a keyword, 'Kyung Bok' recorded on the scheduler App service, or 경복궁 that is a Korean character for Kyung Bok Palace, may automatically generate 'tasty restaurant near Kyung Bok Palace' as a query, and may provide an indication or a mark on 'Kyung Bok' recorded on the scheduler App service.

When the user selects a marked (e.g., highlighted) text 'Kyung Bok', the electronic device 100 may provide the generated query 'tasty restaurant near Kyung Bok Palace' to a search service, may obtain information about the query in real-time, and may provide the obtained information. Also, the electronic device 100 may retrieve information about the generated query 'tasty restaurant near Kyung Bok Palace', may store the obtained information in the electronic device 100, and may provide the stored information to the user whenever the user wants.

[Scenario 6: Word Processor]

Figure 21:
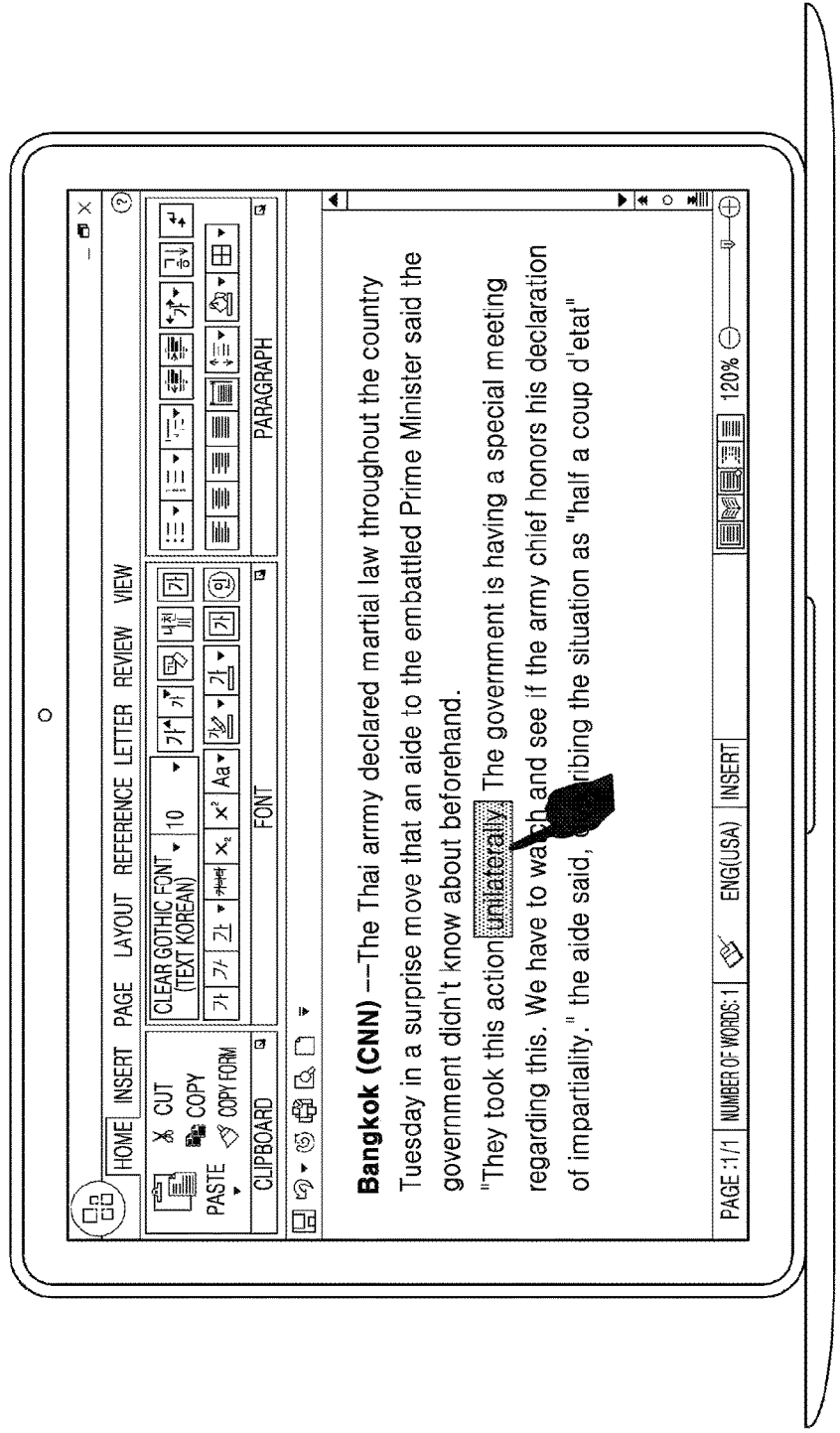
FIG. 21 illustrates a detailed UI environment that is provided while a word processer application is used.

FIG. 21 illustrates a detailed UI environment that is provided while a word processor App is used.

Referring to FIG. 21, the electronic device 100 may be a laptop computer. The electronic device 100 may provide a word processor App service to a user. The user may generate and edit a document by using the word processor App.

For example, the user may edit a news article that is written in English. The electronic device 100 may recognize an English vocabulary level of the user, in consideration of user information, and may indicate or mark a word that is likely difficult for the user to understand.

FIGS. 22A through 27B illustrate methods of providing obtained information to a user via an output interface, the methods being performed by the electronic device 100.

The electronic device 100 may provide the obtained information to the user via the output interface in various manners as described with reference to Table 4.

FIGS. 22A through 22I illustrate examples in which, when the electronic device 100 is a smartphone or a tablet PC and a user performs text chatting by using the smartphone or the tablet PC, information obtained by the electronic device 100 is provided to the user via an output interface.

Figure 22A:
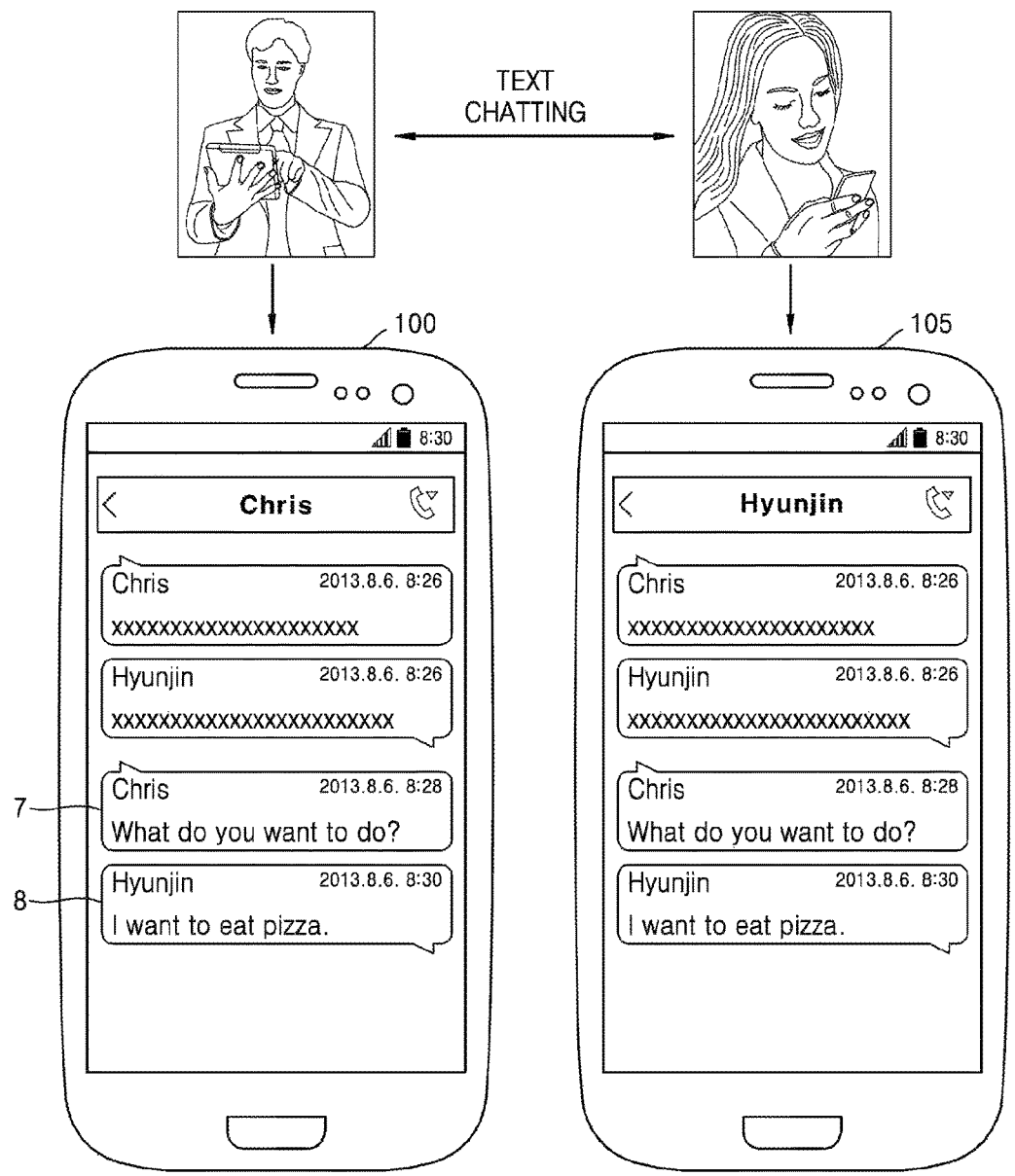

FIG. 22A illustrates a situation in which users perform text chatting by using electronic devices 100 and 105.

Referring to FIG. 22A, a first user of the electronic device 100 and a second user of the electronic device 105 have a conversation via the text chatting. During the conversation between the first user and the second user, the first user delivers a message 'I want to eat pizza' to the second user.

Referring to a chatting message 7, Chris who is the second user of the electronic device 105 asks a question 'What do you want to do?' to Hyunjin who is the first user of the electronic device 100 at 8:28 A.M., Aug. 6, 2013. Referring to a chatting message 8, Hyunjin who is the first user of the electronic device 100 replies to Chris who is the second user of the electronic device 105 that 'I want to eat pizza' at 8:30 A.M., Aug. 6, 2013. Thus, at time 8:30 A.M., Aug. 6, 2013, the conversation is ongoing.

While the electronic device 100 monitors the conversation between the first and second users, the electronic device 100 may extract a keyword from a message for which additional information is needed, and may provide a query to the first user. The first user may edit the provided query. The electronic device 100 may obtain information, based on the edited query and location information of the electronic device 100. The electronic device 100 may provide the information to the first user via the output interface in manners shown in FIGS. 22B through 22I.

Figure 22B:

FIG. 22B illustrates an example in which information obtained by the electronic device 100 of FIG. 22A is provided to the first user via screen conversion.

As illustrated in FIG. 22B, the electronic device 100 may convert a text chatting interface screen, which is displayed on a screen of the electronic device 100, to a screen that displays the obtained information. For example, the electronic device 100 may close the text chatting interface screen displayed on the screen, and may display the obtained information and an interface of a search engine providing the obtained information. The first user may return to the text chatting interface screen. The first user may return to the text chatting interface screen by touching or double tapping a user name box 4 at a top of the screen.

Figure 22C:

FIG. 22C illustrates an example in which information obtained by the electronic device 100 of FIG. 22A is provided to the first user via screen partition.

As illustrated in FIG. 22C, the electronic device 100 may convert a portion of an image of a text chatting interface, which is displayed on a screen of the electronic device 100, to an image that displays the obtained information. For example, the electronic device 100 may close a portion of a text chatting interface screen displayed on the screen of the electronic device 100, and may display the obtained information and an interface of a search engine providing the obtained information. The first user may return to the text chatting interface screen by selecting a back button 2 at a top of the screen of the electronic device 100.

Figure 22D:
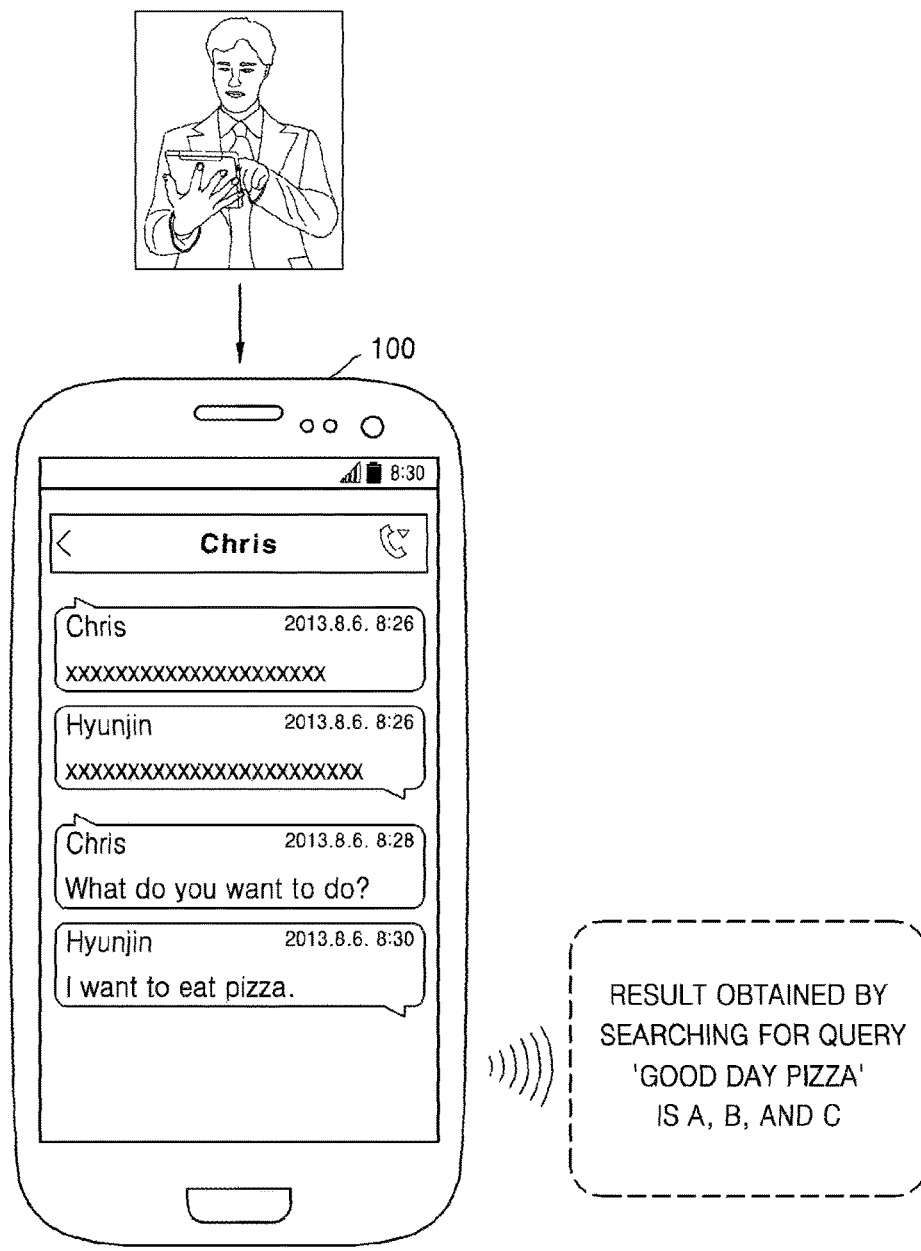

FIG. 22D illustrates an example in which information obtained by the electronic device 100 of FIG. 22A is provided to the first user by using voice.

As illustrated in FIG. 22D, the electronic device 100 may continuously display an image of a text chatting interface which is displayed on a screen of the electronic device 100, and may provide the obtained information by using voice. For example, the electronic device 100 may continuously display the image of the text chatting interface which is displayed on the screen of the electronic device 100, may summarize the obtained information, and may provide the information by outputting voice corresponding to speech data 'a result obtained by searching for a query 'good day pizza' is A, B, and C', via a speaker.

A type of a language provided by the electronic device 100 may vary, including Korean, English, French, German, Spanish, Japanese, Chinese, etc. For example, a type of a language provided by the electronic device 100 may be set by the first user via settings. For example, types of a language provided by the electronic device 100 may be provided by the electronic device 100.

Figure 22E:
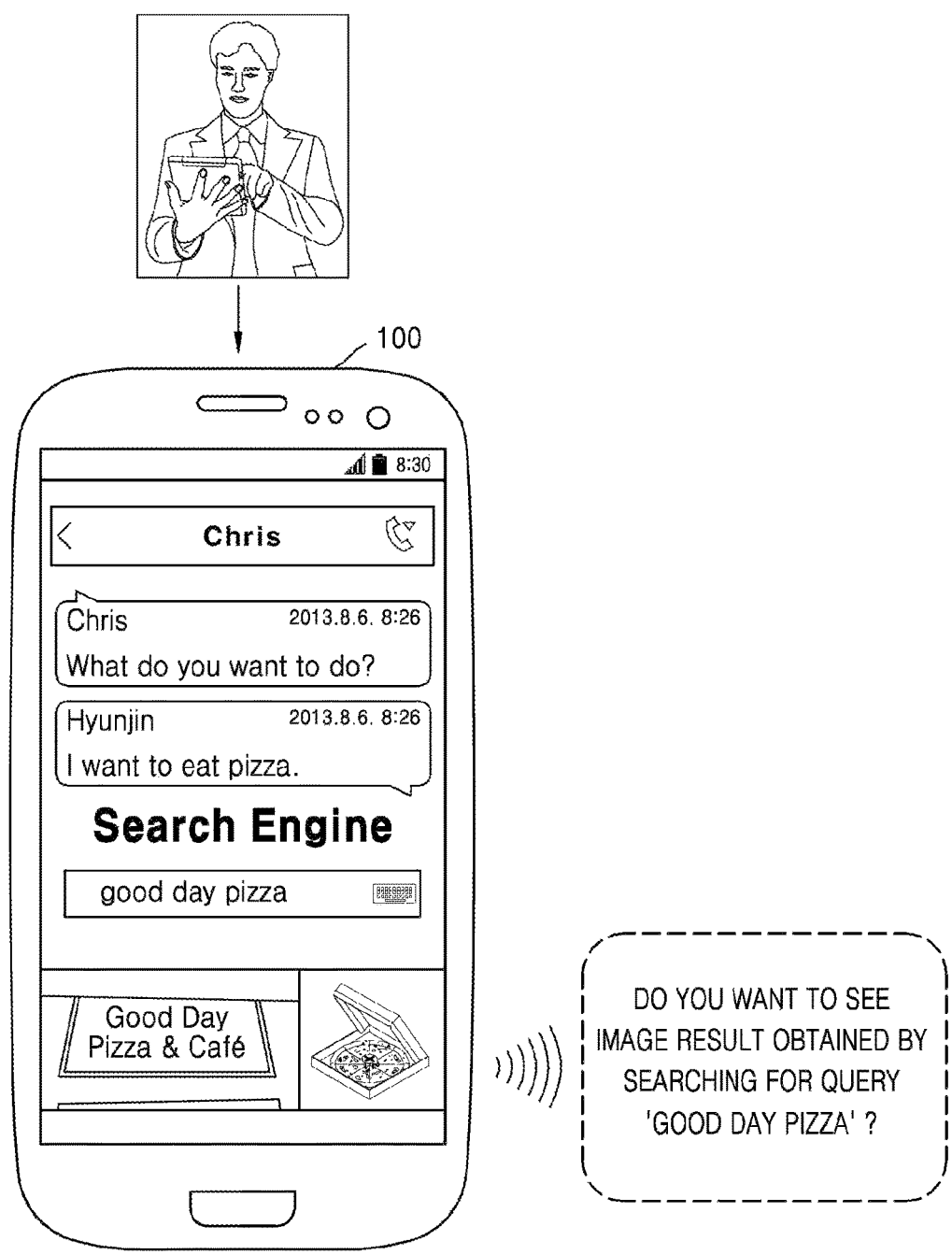

FIG. 22E illustrates an example in which information obtained by the electronic device 100 of FIG. 22A is provided to the first user via voice and screen partition.

As illustrated in FIG. 22E, the electronic device 100 may convert a portion of an image of a text chatting interface, which is displayed on a screen of the electronic device 100, to an image that displays the obtained information, and may provide the obtained information by using voice. Also, for example, the electronic device 100 may convert the portion of the image of the text chatting interface, which is displayed on the screen of the electronic device 100, to the image that displays the obtained information, and may display to the first user a message inquiring whether to summarize and provide a portion of the obtained information by using voice. For example, the electronic device 100 may display to the first user a question "Do you want to see an image result obtained by searching for a query 'good day pizza'?".

Figure 22F:
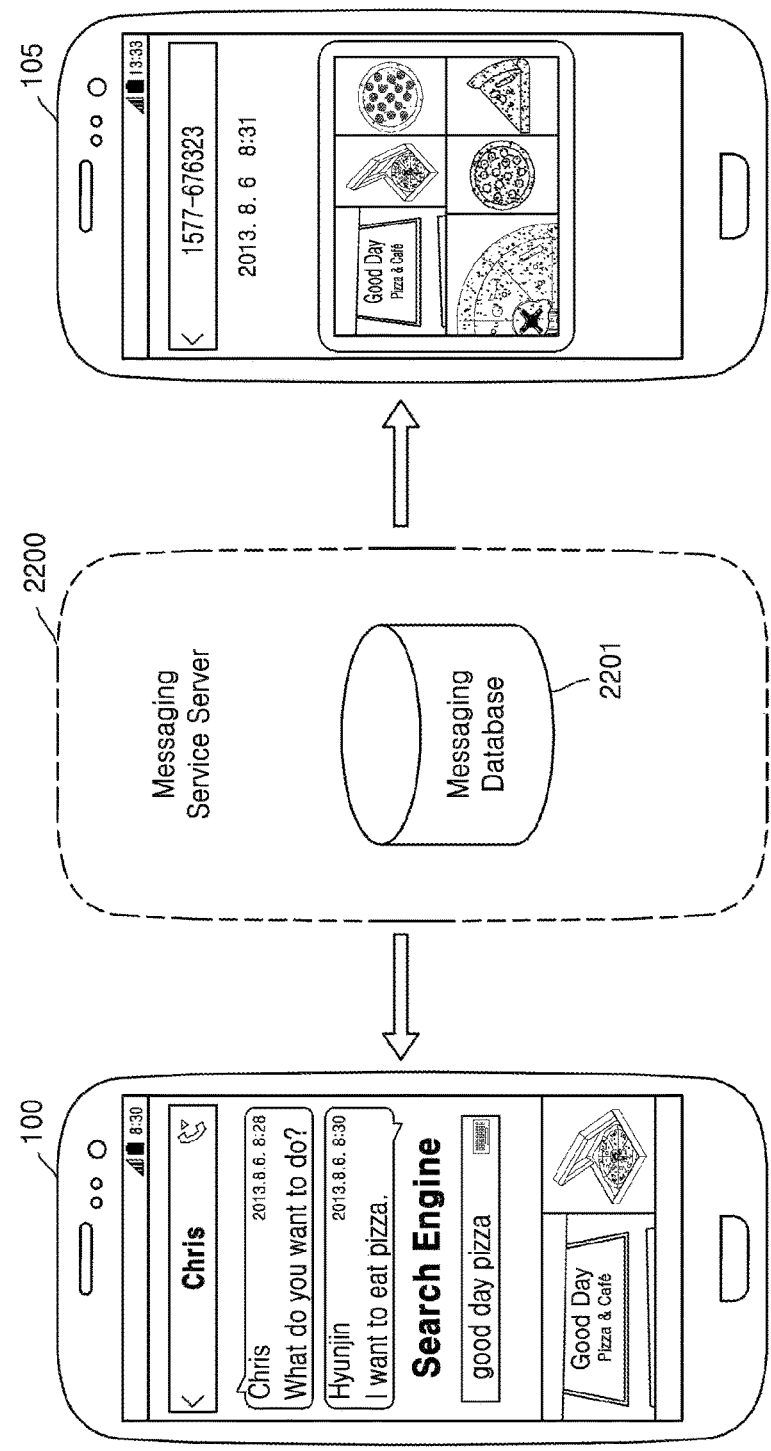

FIG. 22F illustrates an example in which information obtained by the electronic device 100 of FIG. 22A is provided to one or more users via a messaging service.

As illustrated in FIG. 22F, the electronic device 100 may continuously display an image of a text chatting interface on a screen of the electronic device 100, and a messaging service server 2200 may provide the obtained information to the electronic device 100 of the first user and/or the electronic device 105 of the second user via the messaging service. Also, for example, the electronic device 100 may continuously display the image of the text chatting interface on the screen of the electronic device 100 to allow the first user and the second user continue to perform text chatting, and the messaging service server 2200 may transmit the obtained information to a particular telephone number of one or more of a third user via the messaging service. For example, the messaging service server 2200 may retrieve the particular telephone number from a messaging database 2201.

Figure 22G:
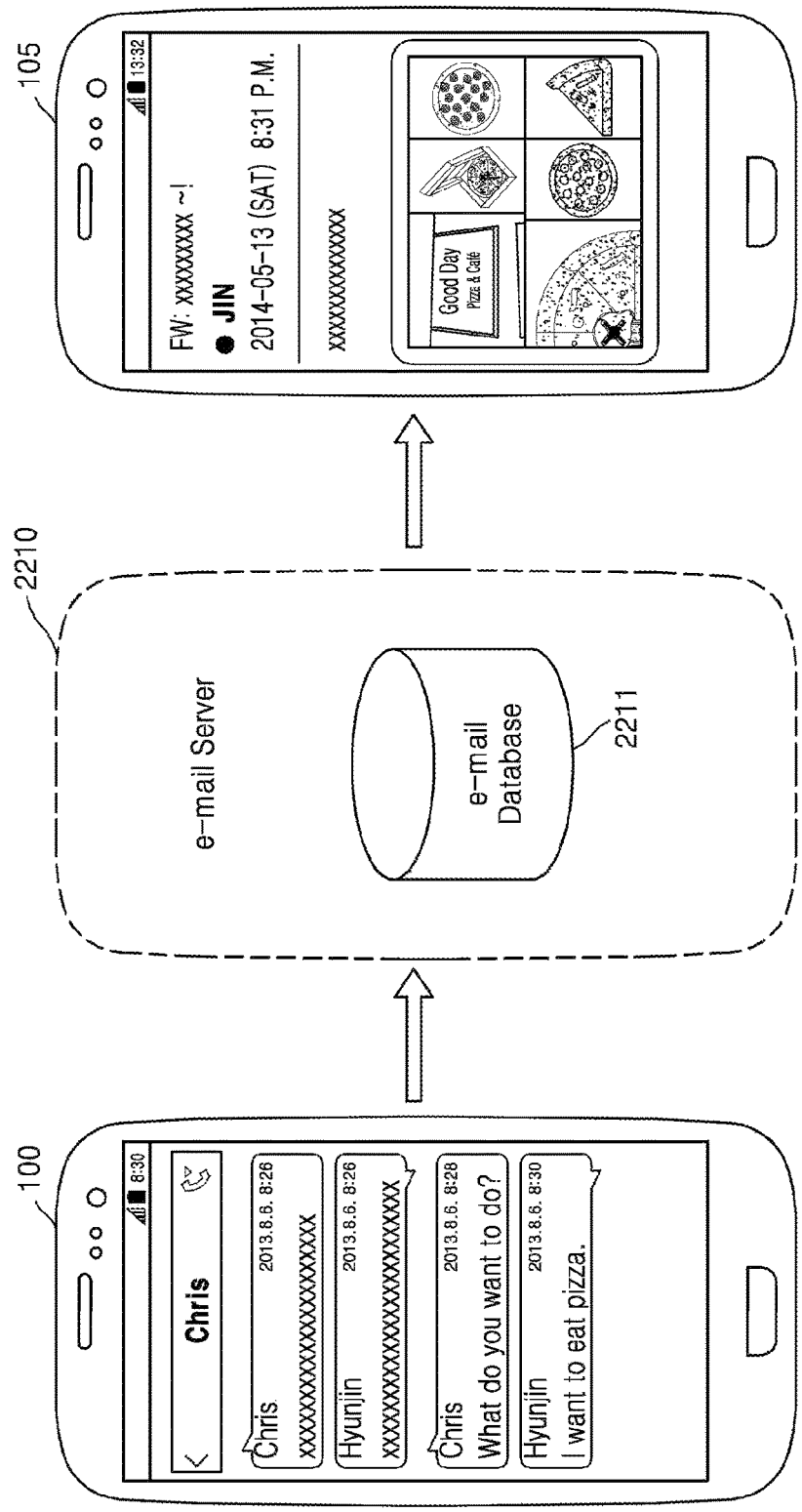

FIG. 22G illustrates an example in which information obtained by the electronic device 100 of FIG. 22A is provided to one or more users via an e-mail service.

As illustrated in FIG. 22G, the electronic device 100 may continuously display an image of a text chatting interface on a screen of the electronic device 100, and an e-mail server 2210 may provide the obtained information to an e-mail address of the first user and/or an e-mail address of the second user via the e-mail service. Also, for example, the electronic device 100 may continuously display the image of the text chatting interface on the screen of the electronic device 100 to allow the first user and the second user to continue to perform text chatting, and the e-mail server 2210 may transmit the obtained information to a particular e-mail account of one or more of a third user via the e-mail service. For example, the e-mail server 2210 may retrieve the particular e-mail account from an e-mail database 2211.

FIG. 22H illustrates an example in which information obtained by the electronic device 100 of FIG. 22A is provided to one or more users via an SNS.

As illustrated in FIG. 22G, the electronic device 100 may continuously display an image of a text chatting interface on a screen of the electronic device 100, and an SNS server 2220 may provide the obtained information to an SNS account of the first user and/or an SNS account of the second user via the SNS. Also, for example, the electronic device 100 may continuously display the image of the text chatting interface on the screen of the electronic device 100 to allow the first user and the second user to continue to perform text chatting, and the SNS server 2220 may transmit the obtained information to a message board of a particular SNS account of one or more of a third user via the e-mail service. For example, the SNS server 2220 may retrieve the particular SNS account from an e-mail database 2221.

Figure 22I:
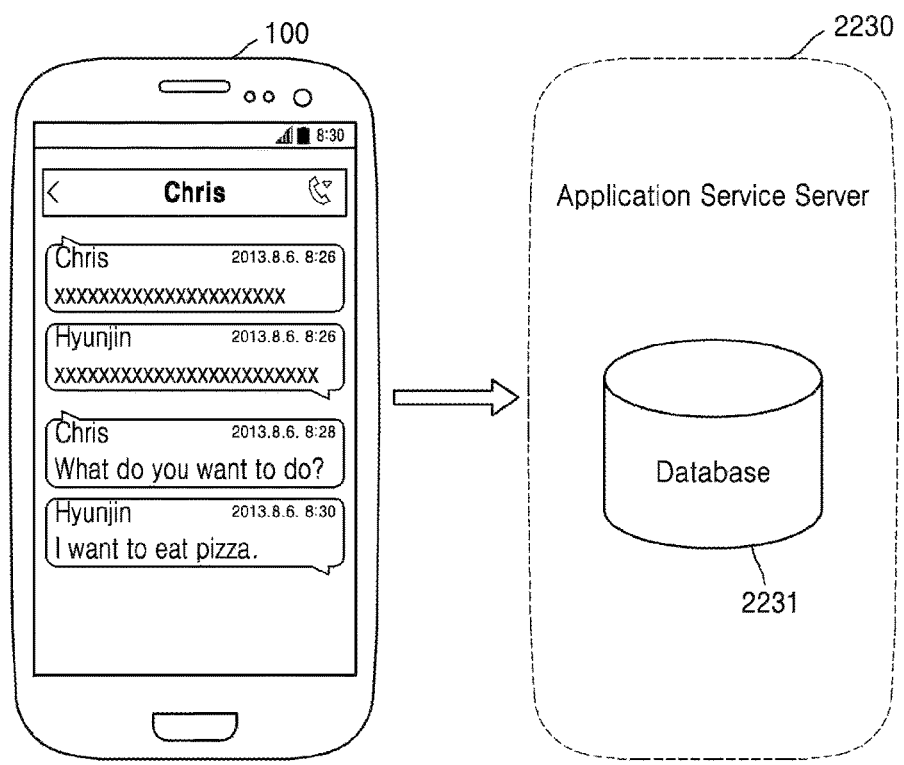

FIG. 22I illustrates an example in which information obtained by the electronic device 100 of FIG. 22A is provided to one or more users via an App service.

As illustrated in FIG. 22I, the electronic device 100 may continuously display an image of a text chatting interface on a screen of the electronic device 100, and an application service server 2230 may provide the obtained information to an App account of the first user and/or an App account of the second user via the App service. Also, for example, the electronic device 100 may continuously display the image of the text chatting interface on the screen of the electronic device 100 to allow the first user and the second user to continue to perform text chatting, and the application service server 2230 may transmit the obtained information to a message board of a particular App account of one or more of a third user via the App service. For example, the application service server 2230 may retrieve the particular App account from a database 2231.

FIGS. 23A through 23E illustrate examples in which, when the electronic device 100 is a smartphone or a tablet PC and a user performs voice chatting by using the smartphone or the tablet PC, information obtained by the electronic device 100 is provided to the user via an output interface.

Figure 23A:
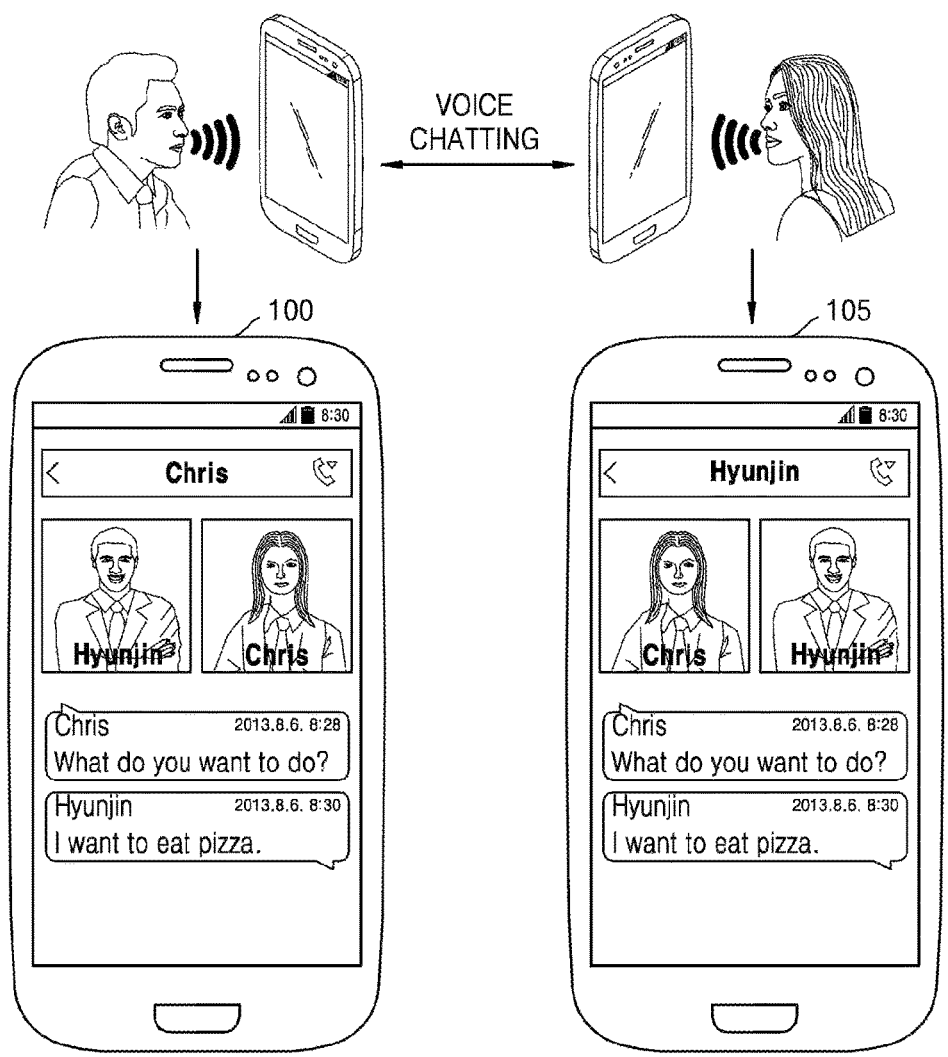
FIGS. 23A through 23E illustrate examples in which, when an electronic device is a smartphone or a tablet PC and a user performs voice chatting by using the smartphone or the tablet PC, information obtained by the electronic device is provided to the user via an output interface.

FIG. 23A illustrates a situation in which users perform voice chatting by using electronic devices 100 and 105.

Referring to FIG. 23A, a first user of the electronic device 100 and a second user of the electronic device 105 have a conversation via the voice chatting. During the conversation between the first user and the second user, the first user delivers a voice message 'I want to eat pizza'. The voice message of the first user may be converted to a text by using an STT module, and may be displayed on a screen of the electronic device 100.

While the electronic device 100 monitors the conversation, the electronic device 100 may extract a keyword from a message for which additional information is needed and may provide a query to the first user. The first user may edit the provided query. The electronic device 100 may obtain information, based on the edited query and location information of the electronic device 100. The electronic device 100 may provide the information to the first user via the output interface in manners shown in FIGS. 23B through 23E.

Figure 23B:

FIG. 23B illustrates an example in which information obtained by the electronic device 100 of FIG. 23A is provided to the first user via screen conversion.

As illustrated in FIG. 23B, the electronic device 100 may convert a voice chatting interface screen, which is displayed on a screen of the electronic device 100, to a screen that displays the obtained information. For example, the electronic device 100 may close the voice chatting interface screen displayed on the screen, and may display the obtained information and an interface of a search engine providing the obtained information.

Figure 23C:

FIG. 23C illustrates an example in which information obtained by the electronic device 100 of FIG. 23A is provided to the first user via screen partition.

As illustrated in FIG. 23C, the electronic device 100 may convert a portion of a screen of a voice chatting interface, which is displayed on a screen of the electronic device 100, to a screen that displays the obtained information. For example, the electronic device 100 may close a portion of a voice chatting interface screen displayed on the screen of the electronic device 100, and may display the obtained information and an interface of a search engine providing the obtained information.

Figure 23D:
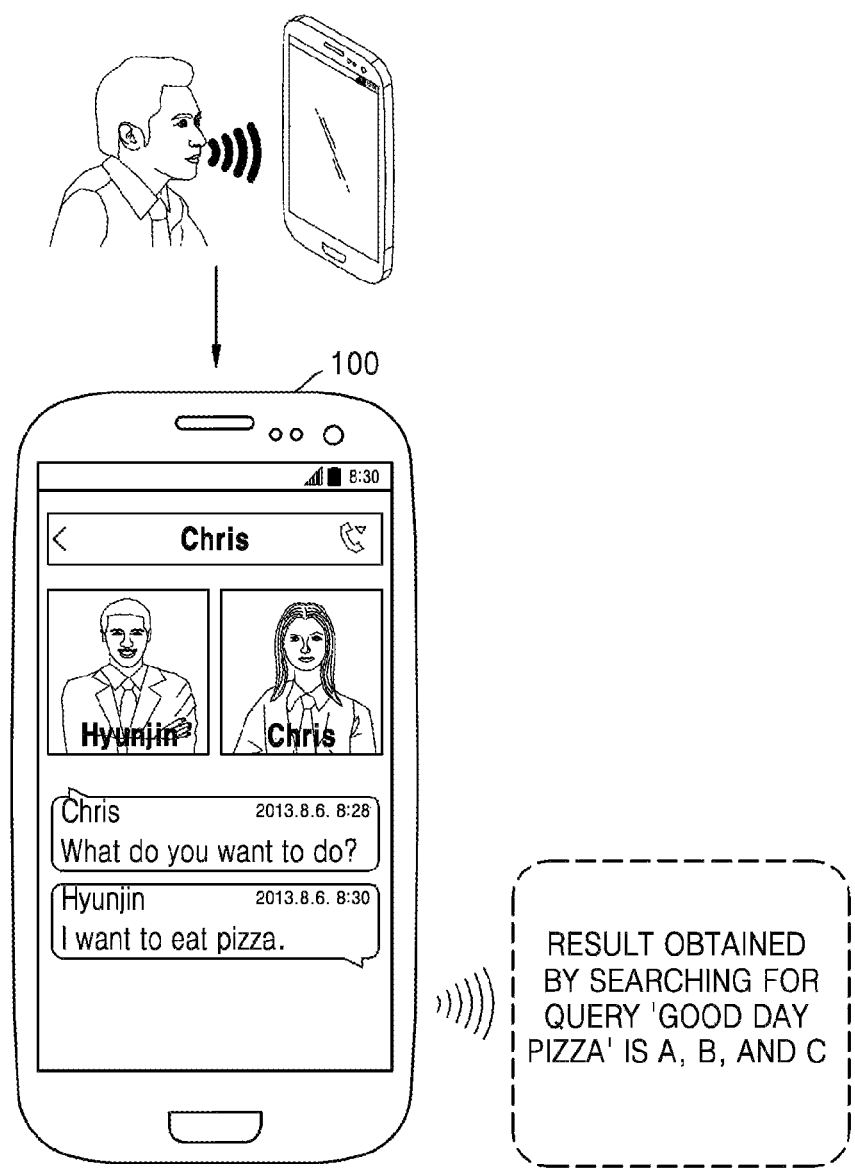

FIG. 23D illustrates an example in which information obtained by the electronic device 100 of FIG. 23A is provided to the first user by using voice.

As illustrated in FIG. 23D, the electronic device 100 may continuously display a screen of a voice chatting interface on a screen of the electronic device 100, and may provide the obtained information by using voice. For example, the electronic device 100 may continuously display the screen of the voice chatting interface on the screen of the electronic device 100, may summarize the obtained information, and may provide the information by using voice.

Figure 23E:
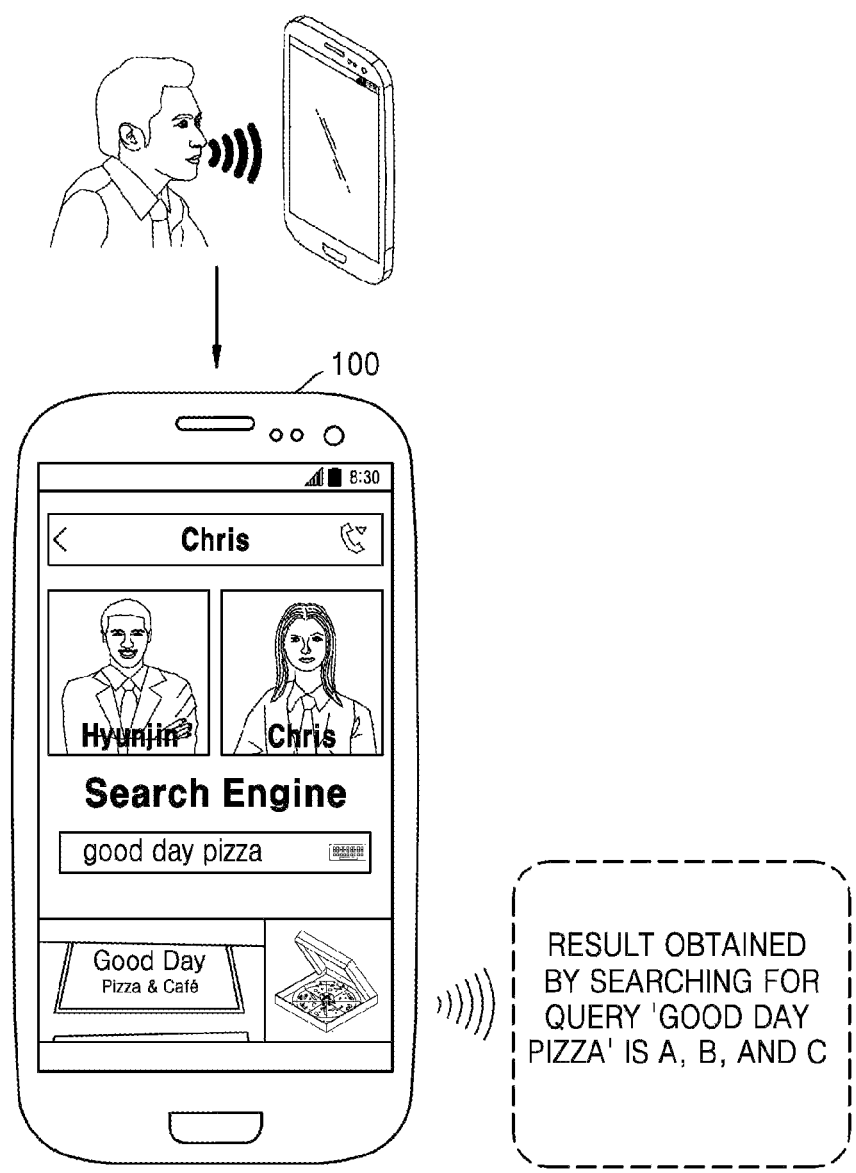

FIG. 23E illustrates an example in which information obtained by the electronic device 100 of FIG. 23A is provided to the first user via voice and screen partition.

As illustrated in FIG. 23E, the electronic device 100 may convert a portion of a screen of a voice chatting interface, which is displayed on a screen of the electronic device 100, to a screen that displays the obtained information, and may provide the obtained information by using voice. Also, for example, the electronic device 100 may convert the portion of the screen of the voice chatting interface, which is displayed on the screen of the electronic device 100, to the screen that displays the obtained information, may summarize a portion of the obtained information, and may provide the information by using voice.

Also, during the voice chatting, the obtained information may be transmitted to the first user, the second user, and/or to one or more of a third user, via a messaging service, an e-mail service, an SNS, and/or an App service, similar to the exemplary embodiments described above with respect to the text chatting between the users.

Here, the obtained information may be transmitted to at least user of the first user, the second user, and/or to one or more of a third user depending on whether the at least one user uses the messaging service, the at least one user uses the e-mail service, the at least one user uses the SNS, and/or the at least one user uses the App service.

FIGS. 24A through 24F illustrate examples in which, when the electronic device 100 is a smartwatch and a user performs text chatting by using the smartwatch, information obtained by the electronic device 100 is provided to the user via an output interface.

Figure 24A:
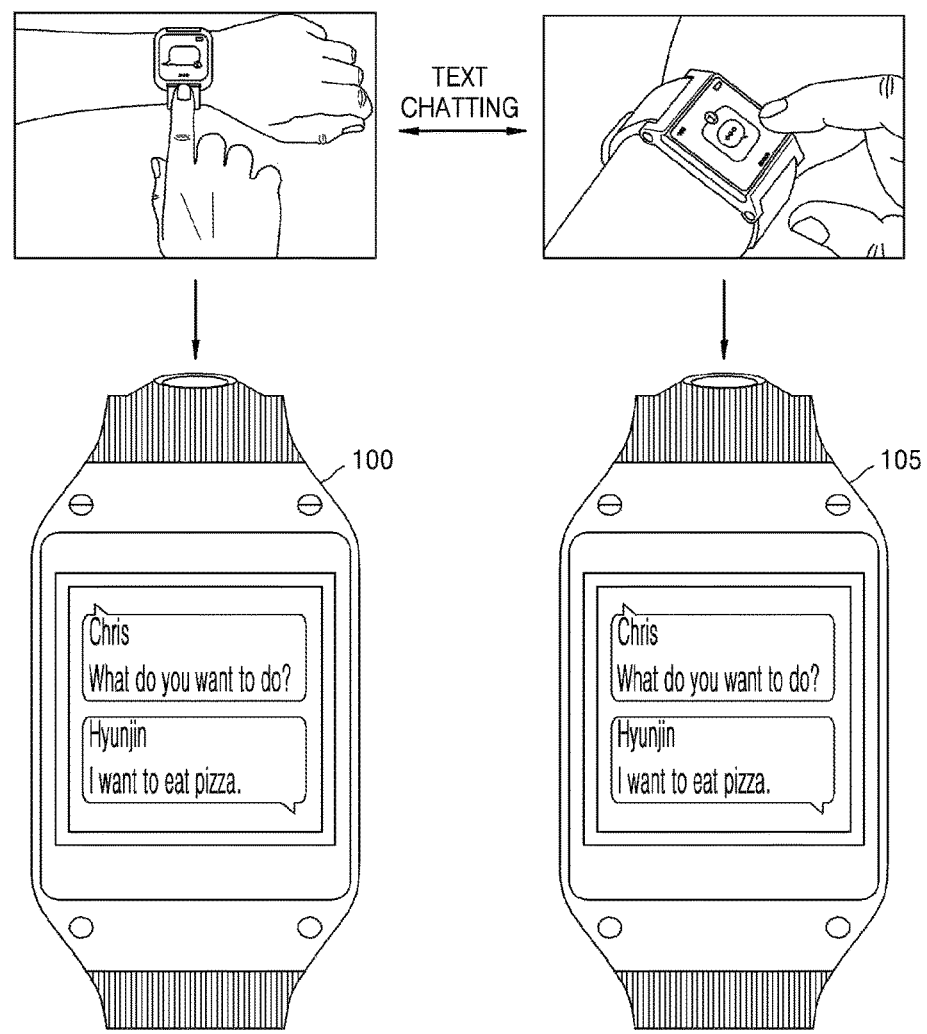
FIGS. 24A through 24F illustrate examples in which, when an electronic device is a smartwatch and a user performs text chatting by using the smartwatch, information obtained by the electronic device is provided to the user via an output interface.

FIG. 24A illustrates a situation in which users perform text chatting by using smartwatches that are electronic devices 100 and 105.

Referring to FIG. 24A, a first user of the electronic device 100 and a second user of the electronic device 105 have a conversation via the text chatting. During the conversation between the first user and the second user, the first user delivers a message 'I want to eat pizza'. While the electronic device 100 monitors the conversation, the electronic device 100 may extract a keyword from a message for which additional information is needed, and may provide a query to the first user. The first user may edit the provided query. The electronic device 100 may obtain information, based on the edited query and location information of the electronic device 100. According to exemplary embodiments, the electronic device 100 may provide the information to the first user via the output interface in manners as shown in FIGS. 24B through 24F.

Figure 24B:
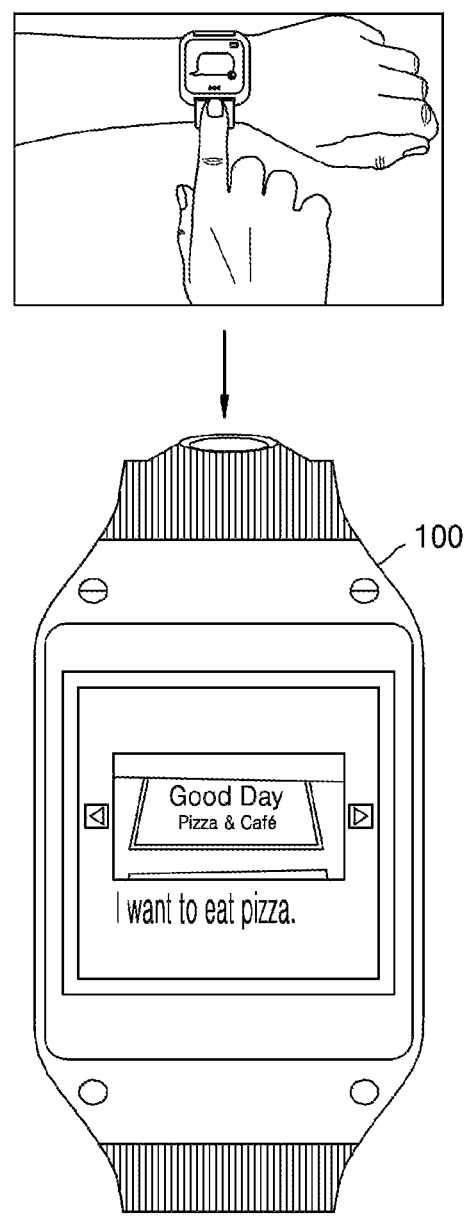

FIG. 24B illustrates an example in which primary information from among a plurality of pieces of information obtained by the electronic device 100 of FIG. 24A is provided to the first user.

As illustrated in FIG. 24B, the electronic device 100 may convert a text chatting interface screen, which is displayed on a screen of the electronic device 100, to a screen that displays the primary information from among the plurality of pieces of obtained information. For example, the electronic device 100 may display one of a plurality of pieces of primary information (e.g., images shown in FIG. 24C) from among the plurality of pieces of obtained information.

Figure 24C:
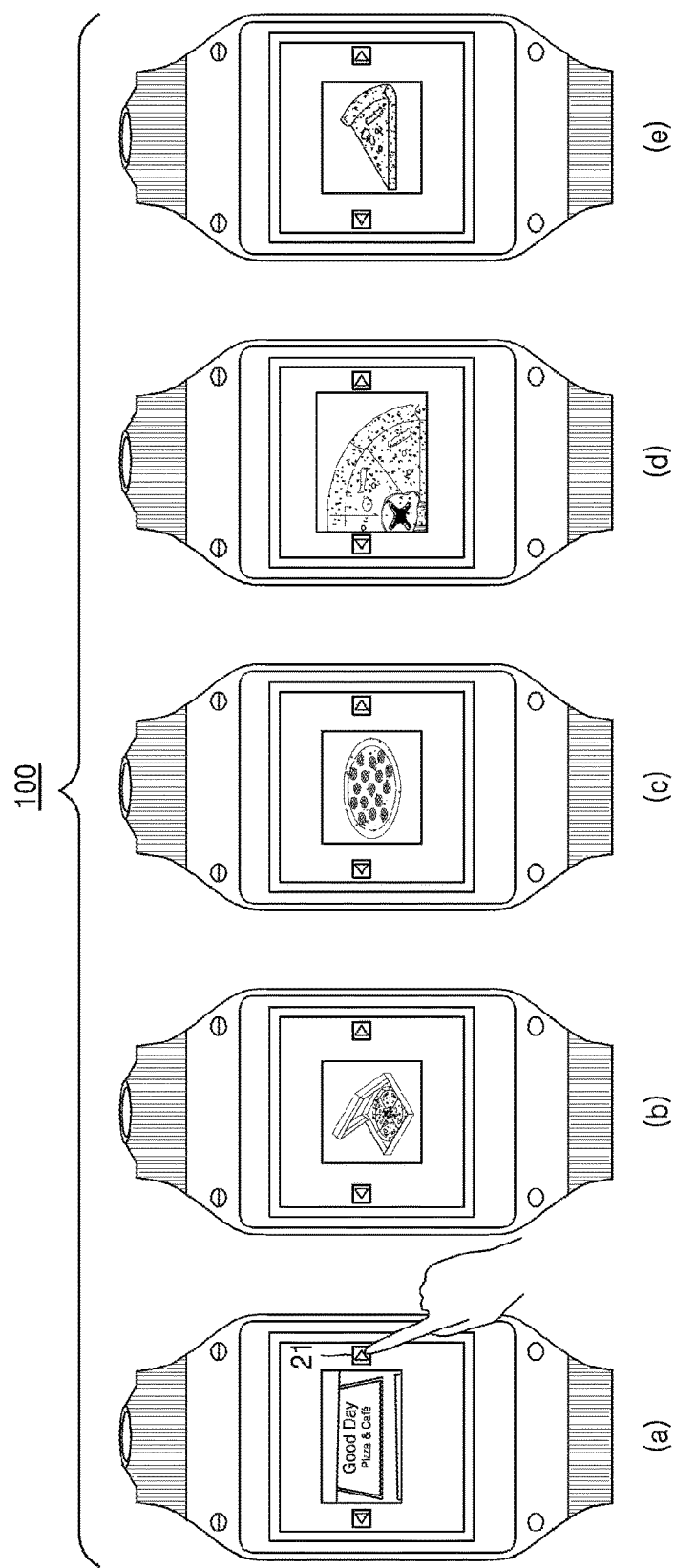

FIG. 24C illustrates an example of a method of providing a user with primary information from among a plurality of pieces of information obtained by the electronic device 100 of FIG. 24A, the method being performed by the electronic device 100.

As illustrated in FIG. 24C, the electronic device 100 may display one of a plurality of pieces of primary information (e.g., the images as shown in (a), (b), (c), (d), and (e) of FIG. 24C) from among the plurality of pieces of obtained information. For example, the first user may check each of the plurality of pieces of primary information by using a shift page button 21 provided by the electronic device 100.

Figure 24D:
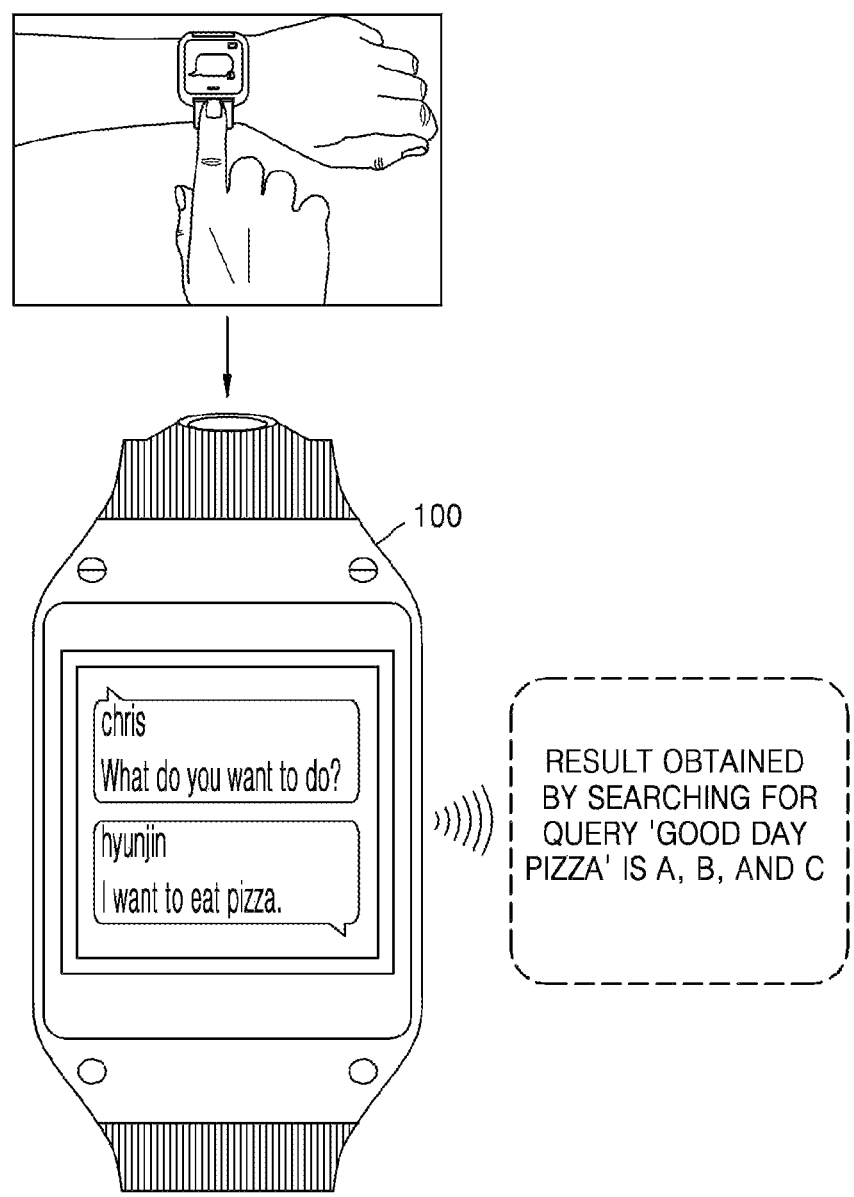

FIG. 24D illustrates an example in which information obtained by the electronic device 100 of FIG. 22A is provided to the first user by using voice.

As illustrated in FIG. 24D, the electronic device 100 may continuously display an image of a text chatting interface which is displayed on a screen of the electronic device 100, and may provide the obtained information by using voice. For example, the electronic device 100 may continuously display the image of the text chatting interface which is displayed on the screen of the electronic device 100, may summarize the obtained information, and may provide the information by using voice.

Figure 24E:
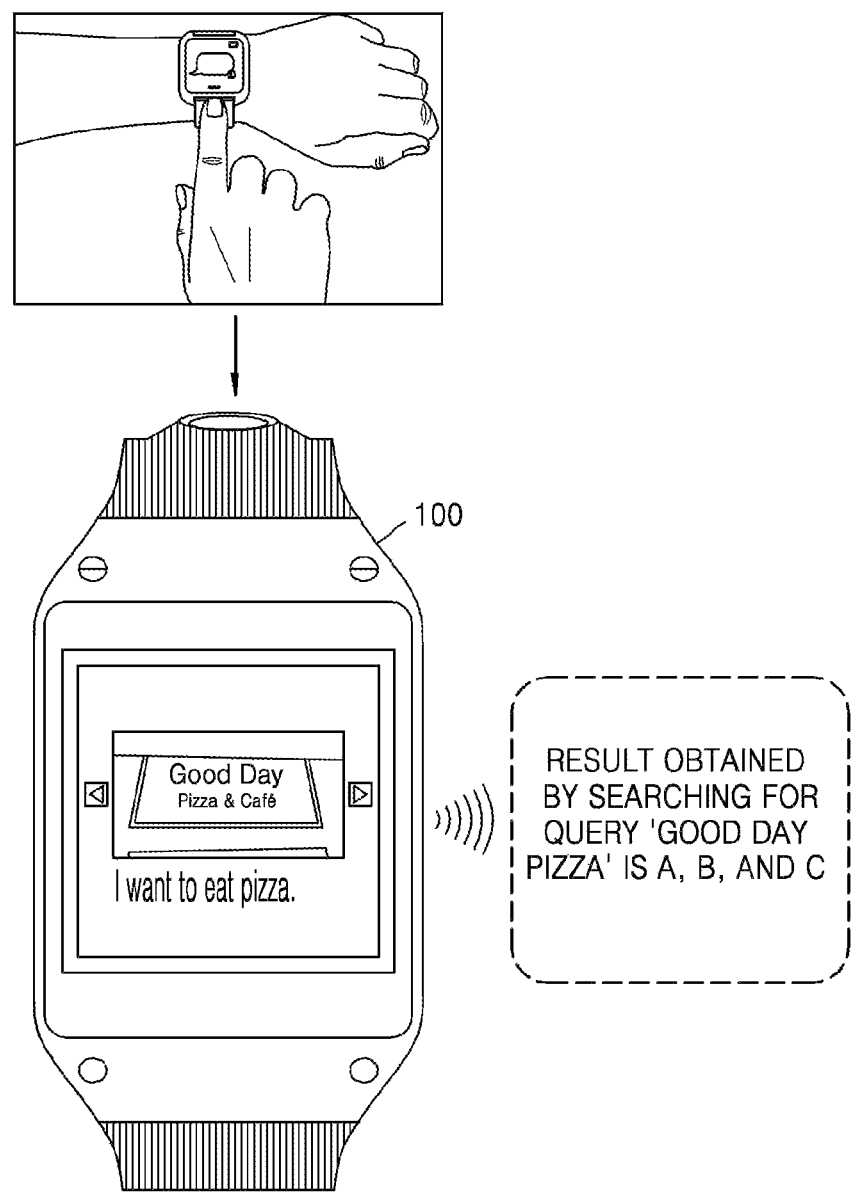

FIG. 24E illustrates an example in which primary image information from among image information obtained by the electronic device 100 of FIG. 22A is provided to the first user by using voice.

As illustrated in FIG. 24E, the electronic device 100 may convert a text chatting interface screen, which is displayed on a screen of the electronic device 100, to a screen that displays the primary image information from among the obtained image information, and may provide the obtained image information by using voice. Also, for example, the electronic device 100 may convert a portion of the text chatting interface screen, which is displayed on the screen of the electronic device 100, to a screen that displays the obtained image information, may summarize a portion of the obtained image information, and may provide the image information by using voice.

Figure 24F:
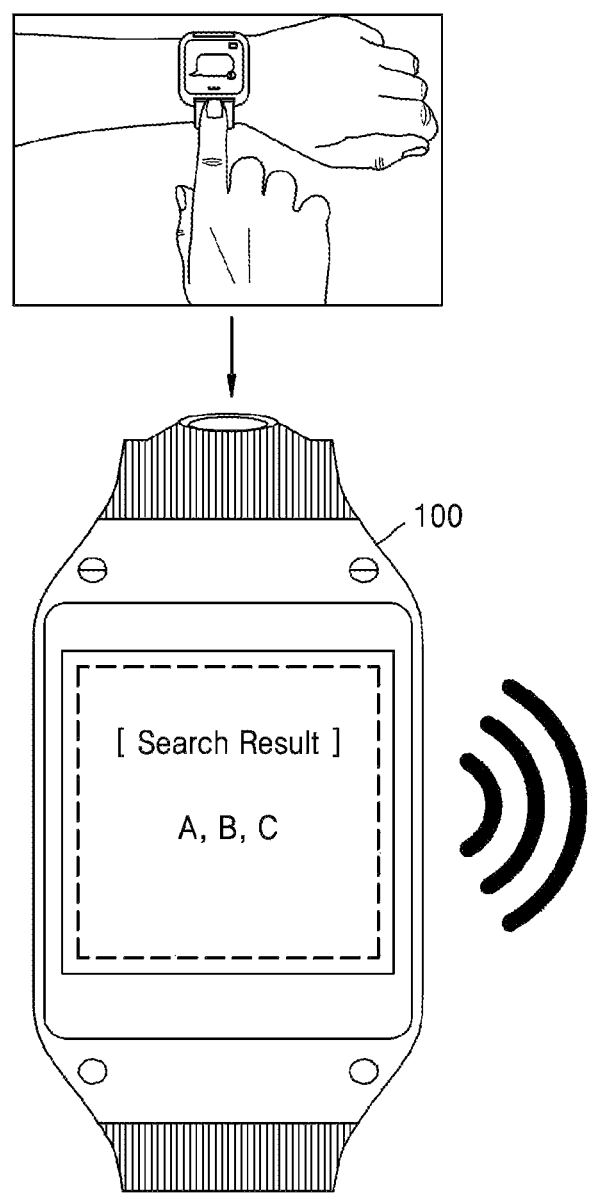

FIG. 24F illustrates an example in which primary text information from among text information obtained by the electronic device 100 of FIG. 22A is provided to the first user by using voice.

As illustrated in FIG. 24F, the electronic device 100 may convert a text chatting interface screen, which is displayed on a screen of the electronic device 100, to a screen that displays the primary text information from among the obtained text information, and may provide the obtained text information by using voice. Also, for example, the electronic device 100 may convert a portion of the text chatting interface screen, which is displayed on the screen of the electronic device 100, to a screen that displays the obtained text information, may summarize a portion of the obtained text information, and may provide the text information by using voice.

Figure 25A:
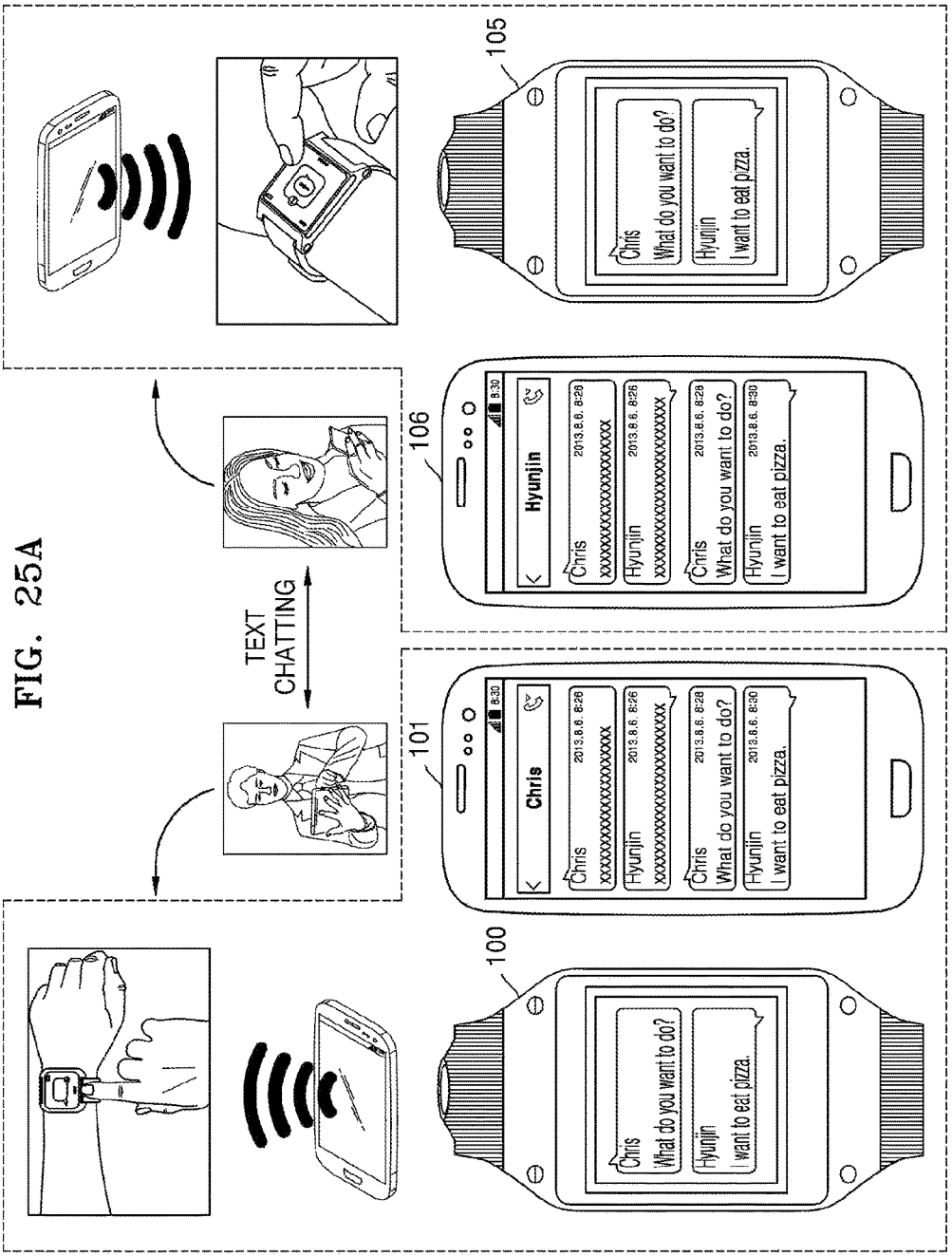
FIGS. 25A and 25B illustrate examples in which, when an electronic device is a smartwatch, and a user performs text chatting by using the smartwatch and a smartphone that is an electronic device interoperating with the smartwatch, information obtained by the electronic device is provided to the user via an output interface.
Figure 25B:
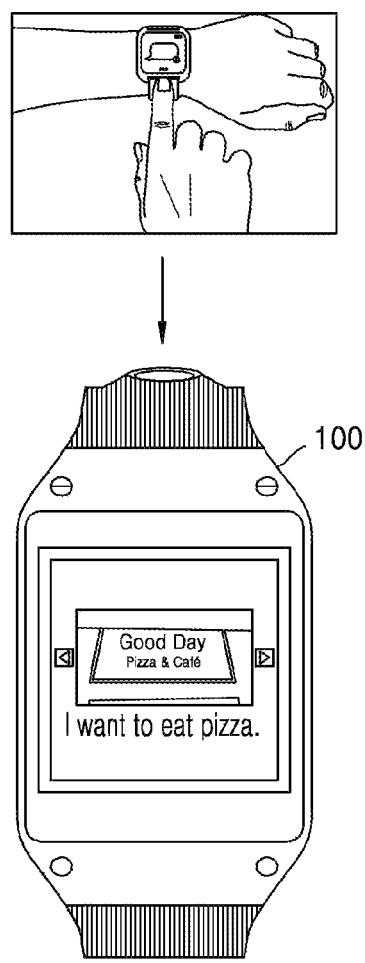

FIGS. 25A and 25B illustrate examples in which, when the electronic device 100 is a smartwatch, and a user performs text chatting by using the smartwatch 100 and a smartphone that is an electronic device 101 interoperating with the smartwatch 100, information obtained by the electronic device 100 is provided to the user via an output interface.

Referring to FIG. 25A, the smartwatch 100 and the smartphone 101 may interoperate with each other. For example, the smartwatch 100 may be connected with the smartphone 101 via short-distance communication. For example, the smartwatch 100 and the smartphone 101 may share a portion of a display screen. For example, when the smartphone 101 receives a message from a server (not shown), the smartwatch 100 may notify a user in a vibration manner that the message is received. For example, when the smartphone 101 receives a voice call from the server, the smartwatch 100 may notify the user in a vibration manner that the voice call is received.

For example, some of messages received by the electronic device 101 may be displayed on the electronic device 100. Also, some of messages that are continuously exchanged between the electronic device 100 and an electronic device 105 may be displayed on the electronic device 101 and an electronic device 106, respectively. For example, the electronic device 106 may be a smartphone that interoperates with the electronic device 105 that may be a smartwatch. A first user of the electronic device 101 may check, via a touchscreen, the messages exchanged between the first user and a second user of the electronic device 105 and the electronic device 106. For example, the first user of the electronic device 101 may vertically scroll the messages exchanged between the first and second users, by performing a touch input such as panning or flick on the touchscreen.

The first user of the electronic device 100 and the electronic device 101, and the second user of the electronic device 105 and the electronic device 106 have a conversation via the text chatting. During the conversation between the first user and the second user, the first user delivers a message 'I want to eat pizza'. In this situation, the electronic device 100 may display a relatively small portion of the conversation, and the electronic device 101 may display a relatively large portion of the conversation.

While the electronic device 100 monitors the conversation, the electronic device 100 may extract a keyword from a message for which additional information is needed, and may provide a query to the first user. The first user may edit the provided query. The electronic device 100 may obtain information, based on the edited query and location information of the electronic device 100.

The electronic device 100 may continuously analyze the conversation between the first user and the second user, and may monitor each of messages. Also, while the electronic device 100 monitors each of the messages, the electronic device 100 may determine whether each of the messages is an inquiring message, and may determine whether it is needed to obtain information for each of the messages. Also, the electronic device 100 may extract a keyword from each of the messages. Also, the electronic device 100 may continuously and differently mark a part of each message from other parts of each message, wherein the part corresponds to the extracted keyword. Also, the electronic device 100 may maintain the marking of each message for a preset time period. Also, the electronic device 100 may adjust, via settings, the marking of each message to be maintained for the preset time period and then to be unmarked after the preset time period (refer to FIG. 30E).

Also, the electronic device 100 may display the marking of each message via an output interface to allow the first user check the marking via, for example, a scroll. Also, when the first user performs a touch input on the marking of each message, the electronic device 100 may obtain information about the marking of each message, and may display the information via the output interface. Also, when the first user performs a touch input on the marking of each message, the electronic device 100 may display information via the output interface which is previously obtained with respect to the marking of each message.

The electronic device 100 may provide the information to the first user in a manner as shown in FIG. 25B via the output interface.

FIG. 25B illustrates an example in which information obtained by the electronic device 100 of FIG. 25A is provided to the first user via the electronic device 100 and the electronic device 101 that interoperates with the electronic device 100.

As illustrated in FIG. 25B, the electronic device 100 may convert a text chatting interface screen, which is displayed on a screen of the electronic device 100, to a screen that displays primary information from among the obtained information. Also, the electronic device 101 may convert the text chatting interface screen, which is displayed on a screen of the electronic device 101, to a screen that displays the obtained information. For example, the electronic device 100 may display one of a plurality of pieces of primary information (e.g. each of images as shown in (a)-(e) as shown in FIG. 24C) from among the obtained information. Further, the electronic device 101 may close the text chatting interface screen displayed on the screen, and may display the obtained information and an interface of a search engine that provided the obtained information.

Figure 26A:
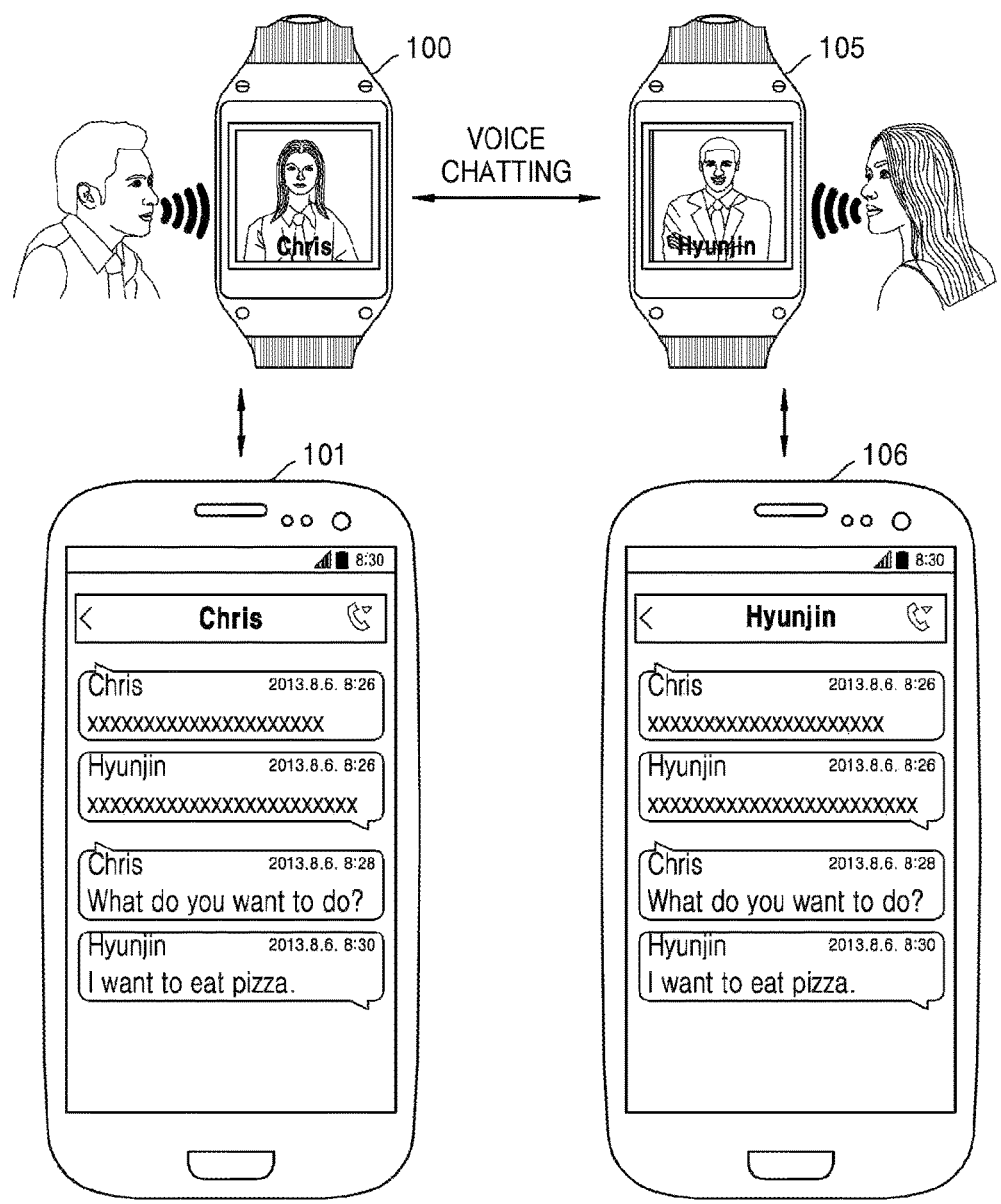
FIGS. 26A and 26B illustrate examples in which, when an electronic device is a smartwatch and a user performs voice chatting by using the smartwatch, information obtained by the electronic device is provided to the user via an output interface.
Figure 26B:
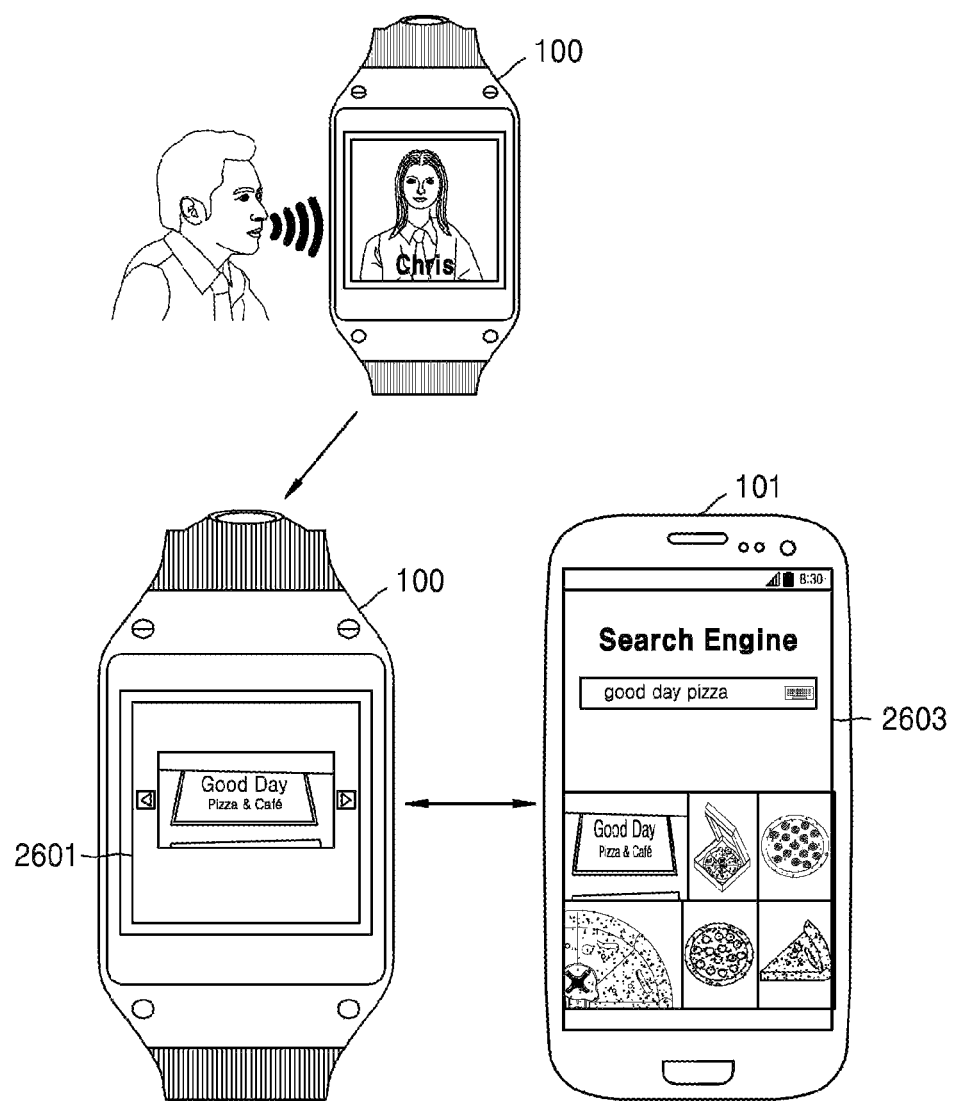

FIGS. 26A and 26B illustrate examples in which, when the electronic device 100 is a smartwatch 100 and a user performs voice chatting by using the smartwatch 100, information obtained by the electronic device 100 is provided to the user via an output interface.

Referring to FIG. 26A, a first user of the electronic device 100 and the electronic device 101, which interoperates with the electronic device 100, and a second user of the electronic device 105 and the electronic device 106, which interoperates with the electronic device 105, have a conversation via the voice chatting. During the conversation between the first user and the second user, the first user delivers a message 'I want to eat pizza'. In this situation, the electronic device 100 may display a call image, and the electronic device 101 may convert a voice message to a text message via STT conversion and may display the text message.

While the electronic device 100 monitors the conversation, the electronic device 100 may extract a keyword from a message for which additional information is needed, and may provide a query to the first user. The first user may edit the provided query. The electronic device 100 may obtain information, based on the edited query and location information of the electronic device 100. The electronic device 100 may provide the information to the first user in a manner as shown in FIG. 26B via the output interface.

FIG. 26B illustrates an example in which information obtained by the electronic device 100 of FIG. 26A is provided to the first user via the electronic device 100 and the electronic device 101 that interoperates with the electronic device 100.

As illustrated in FIG. 26B, the electronic device 100 may convert a voice chatting interface screen 2600, which is displayed on a screen of the electronic device 100, to a screen 2601 that displays primary information from among the obtained information. Also, the electronic device 101 may convert a text chatting interface screen, which is displayed on a screen of the electronic device 101, to a screen 2603 that displays the obtained information. For example, the electronic device 100 may display one of a plurality of pieces of primary information (e.g. each of the images (a)-(e) shown in FIG. 24C) from among the obtained information. Further, the electronic device 101 may close the text chatting interface screen displayed on the screen, and may display the obtained information and an interface of a search engine that provided the obtained information.

Figure 27B:
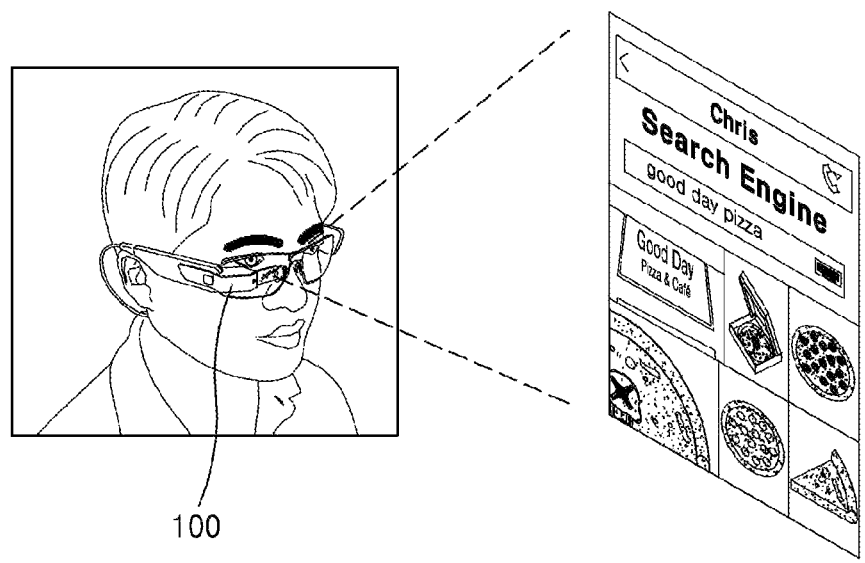

FIGS. 27A and 27B illustrate examples in which, when the electronic device 100 is smartglasses and a user performs text chatting by using the smartglasses, information obtained by the electronic device 100 is provided to the user via an output interface.

Referring to FIG. 27A, a first user of the electronic device 100 and a second user of the electronic device 105 have a conversation via the text chatting. During the conversation between the first user and the second user, the first user delivers a message 'I want to eat pizza'.

The first user and the second user may perform the text chatting by using an input interface of the electronic device 100 and an input interface of the electronic device 105, respectively. For example, the input interface may include a virtual keyboard, a virtual touchscreen, or the like.

Also, the first user and the second user may perform the text chatting by using an output interface of the electronic device 100 and an output interface of the electronic device 105, respectively. For example, the output interface may include a mini-projector and prism, or the like.

While the electronic device 100 monitors the conversation, the electronic device 100 may extract a keyword from a message for which additional information is needed, and may provide a query to the first user. The first user may edit the provided query. The electronic device 100 may obtain information, based on the edited query and location information of the electronic device 100. The electronic device 100 may provide the information to the first user in a manner as shown in FIG. 27B via the output interface FIG. 27B illustrates an example in which information obtained by the electronic device 100 of FIG. 27A is provided to the first user via the electronic device 100.

As illustrated in FIG. 27B, the electronic device 100 may convert a text chatting interface screen, which is displayed on a screen of the electronic device 100, to a screen that displays the obtained information.

Figure 28A:
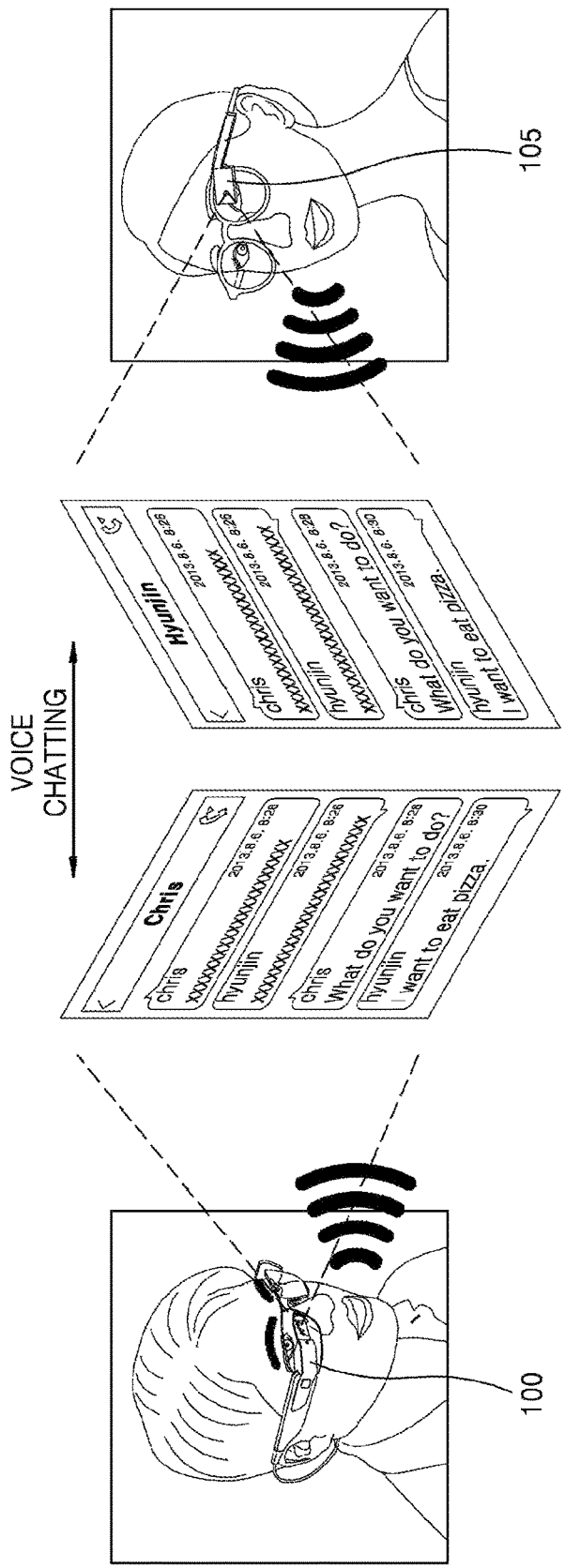
FIGS. 28A and 28B illustrate examples in which, when an electronic device is smartglasses and a user performs voice chatting by using the smartglasses, information obtained by the electronic device is provided to the user via an output interface.
Figure 28B:
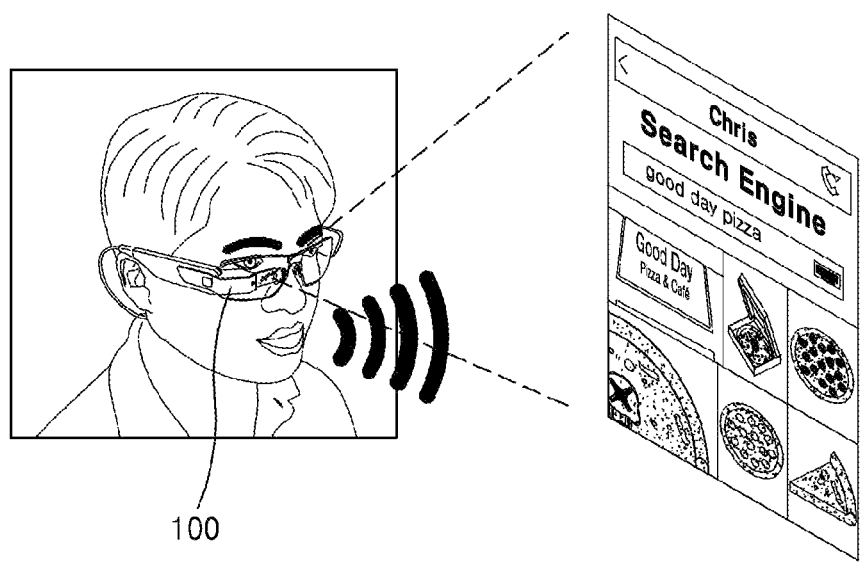

FIGS. 28A and 28B illustrate examples in which, when the electronic device 100 is smartglasses and a user performs voice chatting by using the smartglasses, information obtained by the electronic device 100 is provided to the user via an output interface.

Referring to FIG. 28A, a first user of the electronic device 100 and a second user of the electronic device 105 have a conversation via the voice chatting. During the conversation between the first user and the second user, the first user delivers a message 'I want to eat pizza'.

Also, the first user and the second user may perform the voice chatting by using an output interface of the electronic device 100 and an output interface of the electronic device 105, respectively. For example, the output interface may include a mini-projector and prism, or the like. The electronic device 100 may provide the information to the first user in a manner as shown in FIG. 28B via the output interface.

FIG. 28B illustrates an example in which information obtained by the electronic device 100 of FIG. 28A is provided to the first user via the electronic device 100.

As illustrated in FIG. 28B, the electronic device 100 may convert a voice chatting interface screen, which is displayed on a screen of the electronic device 100, to a screen that displays the obtained information.

Figure 29B:
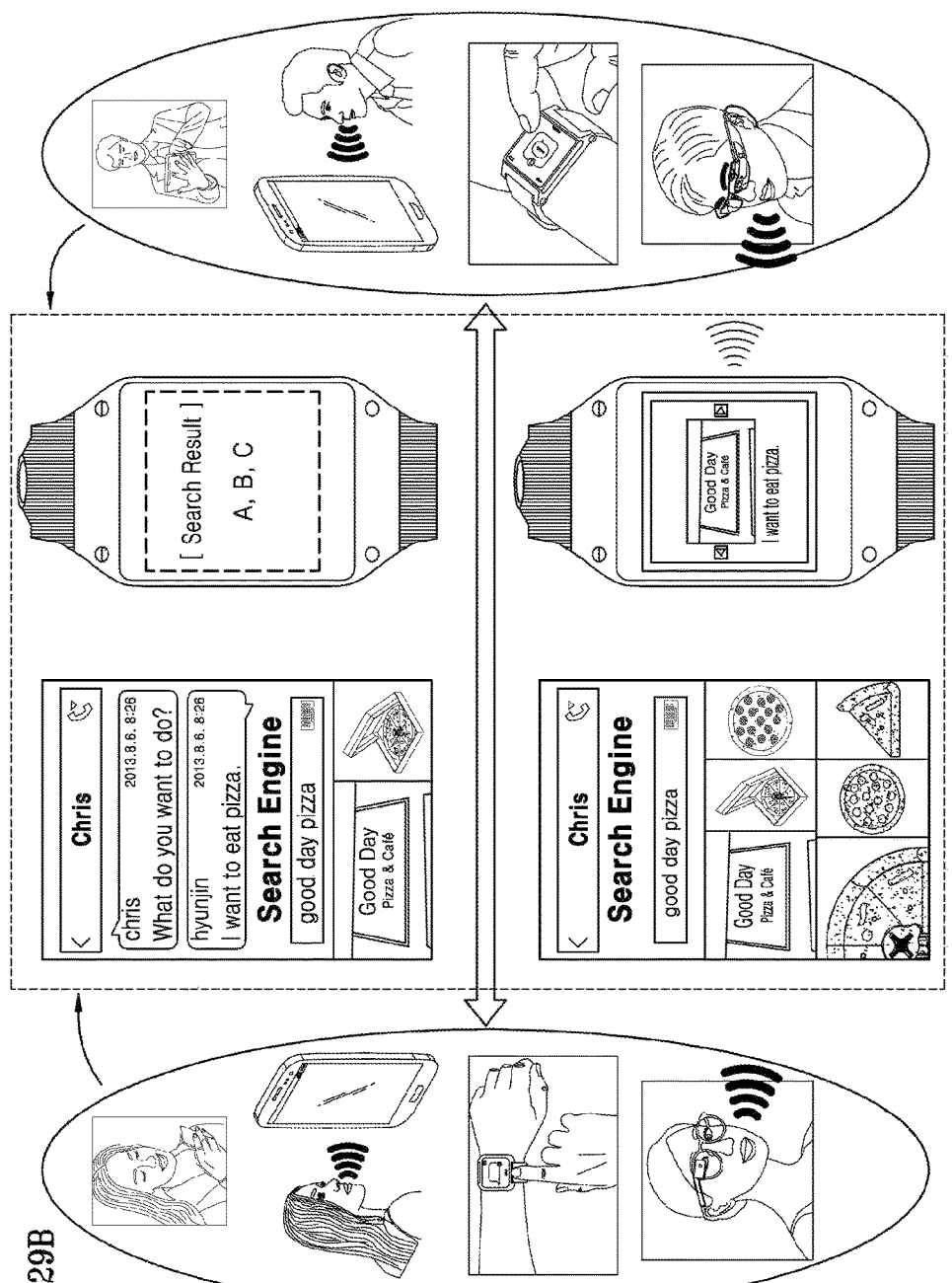

FIGS. 29A and 29B illustrate examples in which, when the electronic device 100 includes various electronic devices including smartglasses, and a user communicates with another user via at least one of voice chatting and text chatting by using the electronic devices, information obtained by the electronic device 100 is provided to the user via an output interface.

As illustrated in FIG. 29A, a plurality of users may communicate via various types of chatting described above with reference to FIGS. 22 through 28, and as illustrated in FIG. 29B, the plurality of users may receive information obtained by the electronic device 100 via various types of chatting described above with reference to FIGS. 22 through 28.

For example, a first user may perform text chatting by using a smartwatch in a manner described with reference to FIG. 25, and a second user may perform text chatting by using smartglasses in a manner described with reference to FIG. 27.

For example, the first user may perform the text chatting by using the smartwatch in a manner described with reference to FIG. 25, and the second user may perform voice chatting by using smartglasses in a manner described with reference to FIG. 28. In this case, a voice message input by the second user may be converted to a text message via STT conversion and may be delivered to the first user. Also, in another exemplary embodiment, a text message input by the first user may be converted to a voice message and may be delivered to the second user.

For example, the chatting in the aforementioned combined manners may be used in communication such as a video conference among at least three users.

Also, for example, the chatting in the aforementioned combined manners may be applied to various communication services such as an SNS which are provided via applications, and various communication services such as an e-mail service which are provided via a server.

The electronic device 100 may provide information to a user in various manners described with reference to FIGS. 22 through 29.

FIGS. 30A through 31B illustrate settings UIs that are provided by the electronic device 100, according exemplary embodiments.

Figure 30A:
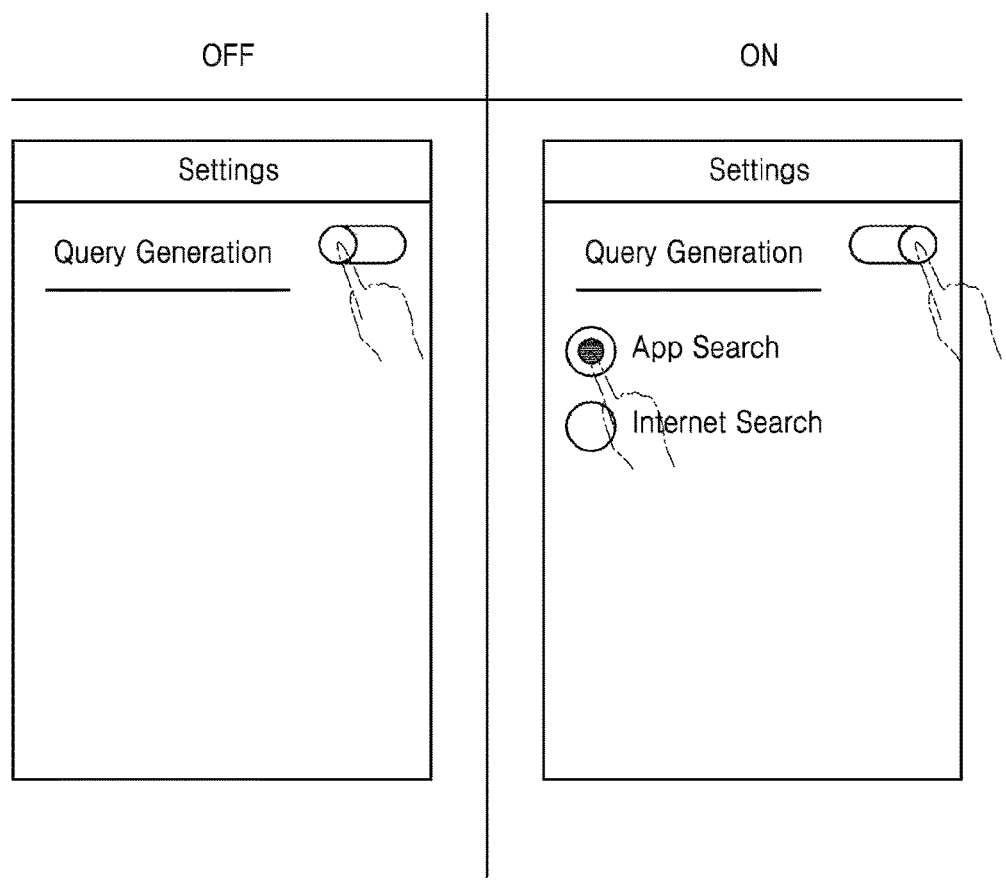
FIGS. 30A-G and 31A-B illustrate settings UIs that are provided by an electronic device, according to exemplary embodiments.

Referring to FIG. 30A, the electronic device 100 may provide a user with a settings UI with respect to ON/OFF of an information providing operation. The user may select, via the settings UI, whether to receive information according to the information providing methods according to the exemplary embodiments. The user may set ON/OFF of the information providing operation according to the exemplary embodiments.

Setting of the electronic device 100 may include presenting operations of the electronic device 100 to receive a setting input by the user, to provide a use environment of the electronic device 100 based on the setting input.

While FIG. 30A illustrates presenting an operation of query generation, the query generation operation may be referred to as different names such as, for example, an autonomic search engine, an autonomic information search, or the like, according to applied products, and thus the name of the operation does not limit the scope of the inventive concept.

The electronic device 100 may provide a further detailed settings UI to the user. For example, when the information providing operation is set as ON, the electronic device 100 may allow the user to select a method of obtaining information.

For example, the electronic device 100 may allow the user to select whether to obtain information by performing an App search or an internet search. Also, the electronic device 100 may obtain information by simultaneously performing the App search and the internet search.

Figure 30B:
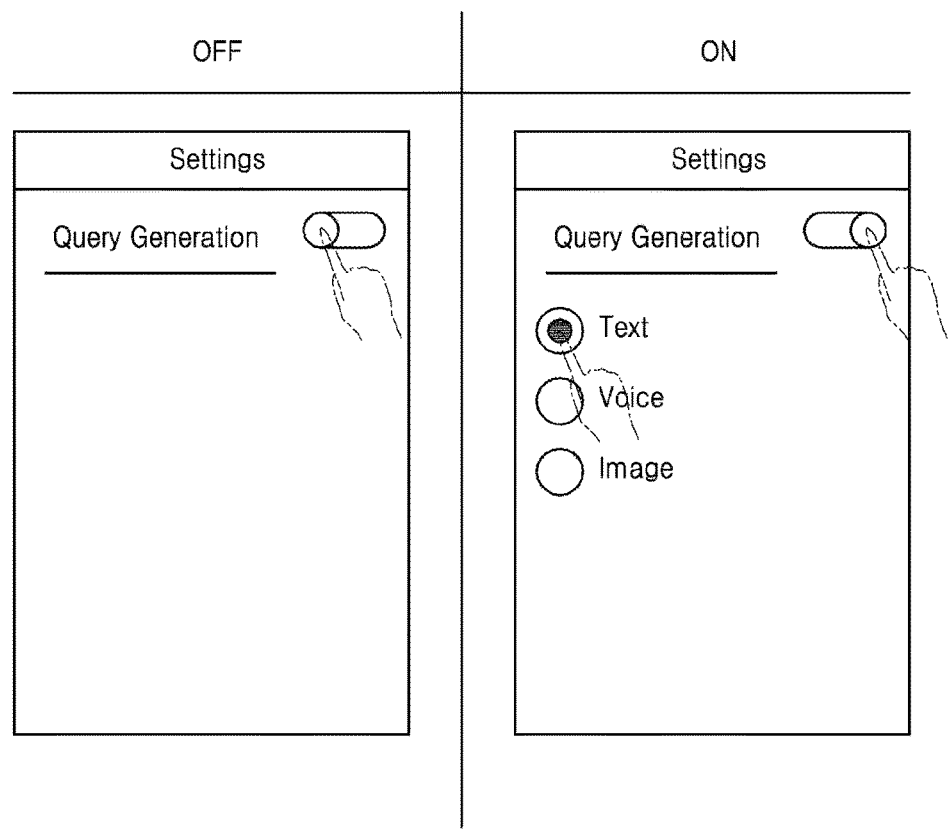

Referring to FIG. 30B, while the electronic device 100 provides the user with the settings UI with respect to ON/OFF of the information providing operation, the electronic device 100 may differently provide differently detailed settings UI to the user.

For example, when the information providing operation is set as ON, the electronic device 100 may allow the user to select how information is provided. For example, the electronic device 100 may allow the user to select whether to provide information in a text, voice, or an image.

For example, when the information providing operation is set as ON, the electronic device 100 may allow the user to select how edited query is received. For example, the electronic device 100 may allow the user to select whether to receive the edited query in a text or voice.

Figure 30C:
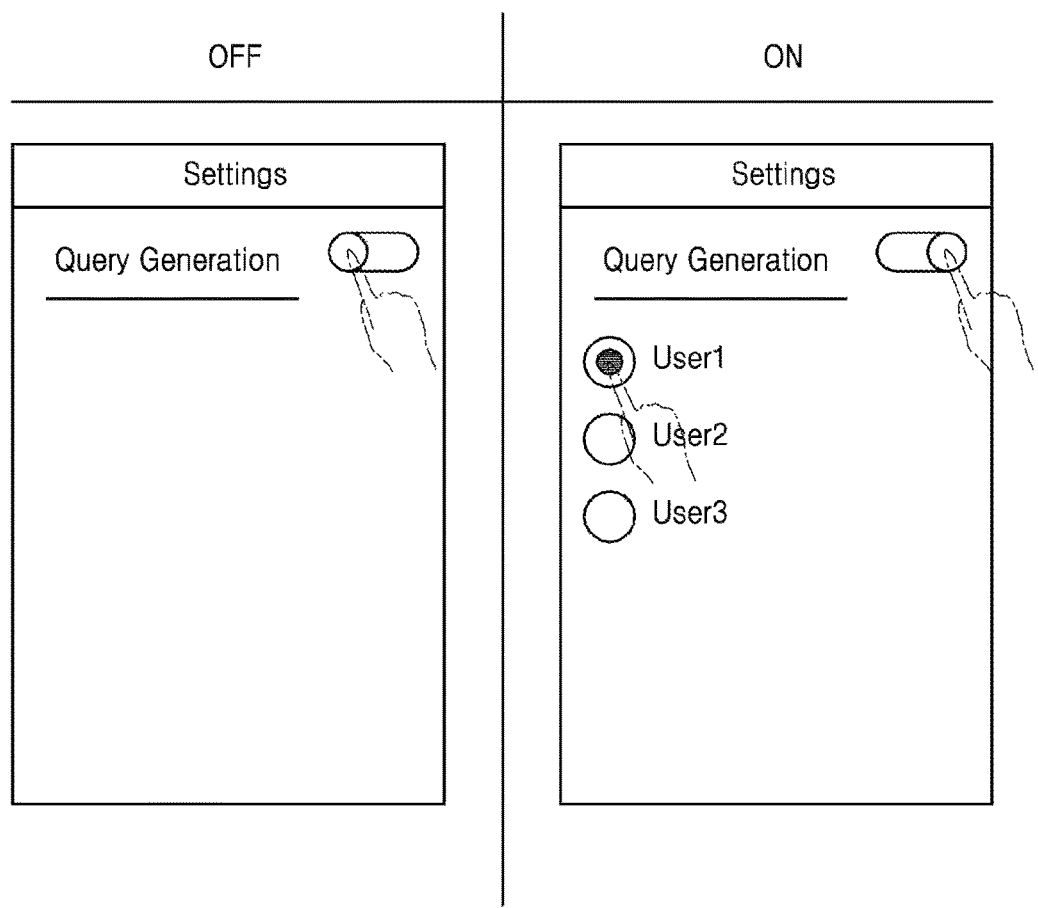

Referring to FIG. 30C, while the electronic device 100 provides the user with the settings UI with respect to ON/OFF of the information providing operation, the electronic device 100 may differently provide detailed settings UI to the user.

For example, when the information providing operation is set as ON, the electronic device 100 may allow the user to select to whose message information is to be provided. For example, the electronic device 100 may be set to extract a keyword only from a message of a first user User 1 and to provide information about the keyword.

Alternatively, for example, when the information providing operation is set as ON, the electronic device 100 may allow the user to select to whom information is to be provided. For example, the electronic device 100 may be set to provide information to the first user User 1 and a second user User 2.

Figure 30D:
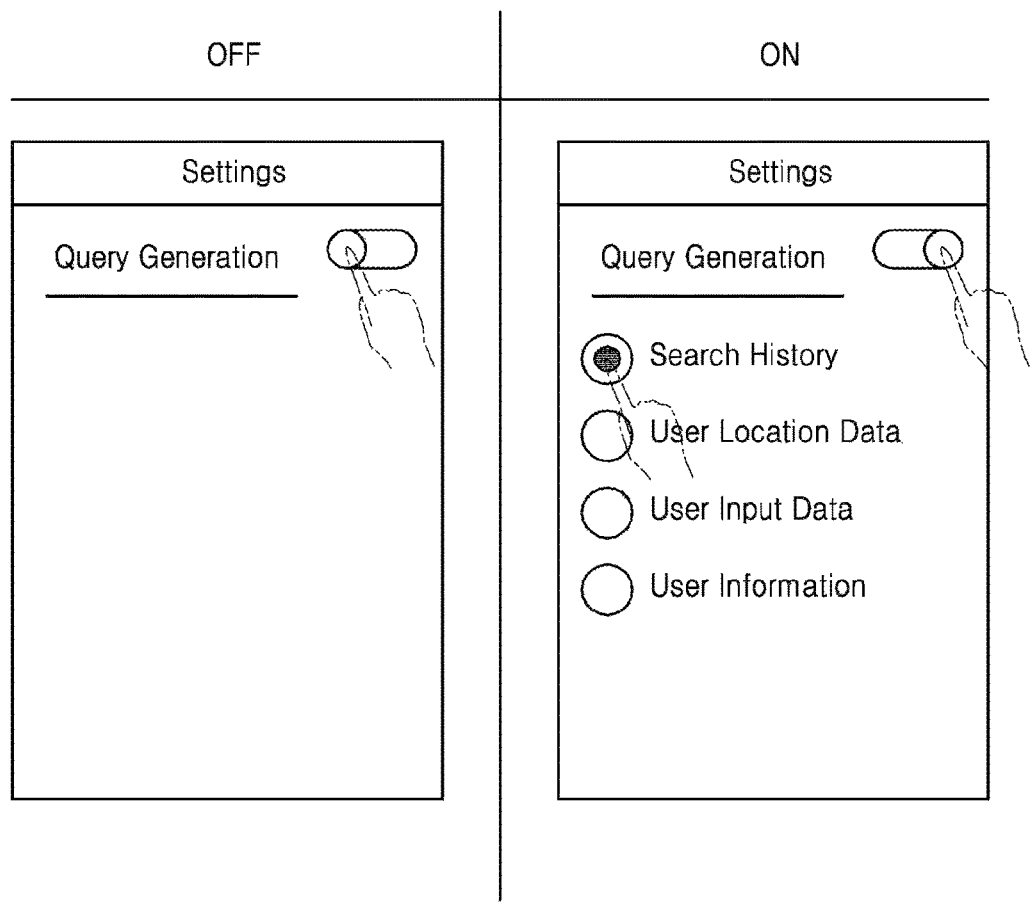

Referring to FIG. 30D, while the electronic device 100 provides the user with the settings UI with respect to ON/OFF of the information providing operation, the electronic device 100 may differently provide detailed settings UI to the user.

For example, when the information providing operation is set as ON, the electronic device 100 may allow the user to select which information is referred to in extracting a keyword. Alternatively, for example, when the information providing operation is set as ON, the electronic device 100 may allow the user to select which information is referred to in generating a query. Alternatively, for example, when the information providing operation is set as ON, the electronic device 100 may allow the user to select which information is referred to in obtaining information based on an edited query and location information of the electronic device 100.

Figure 30E:
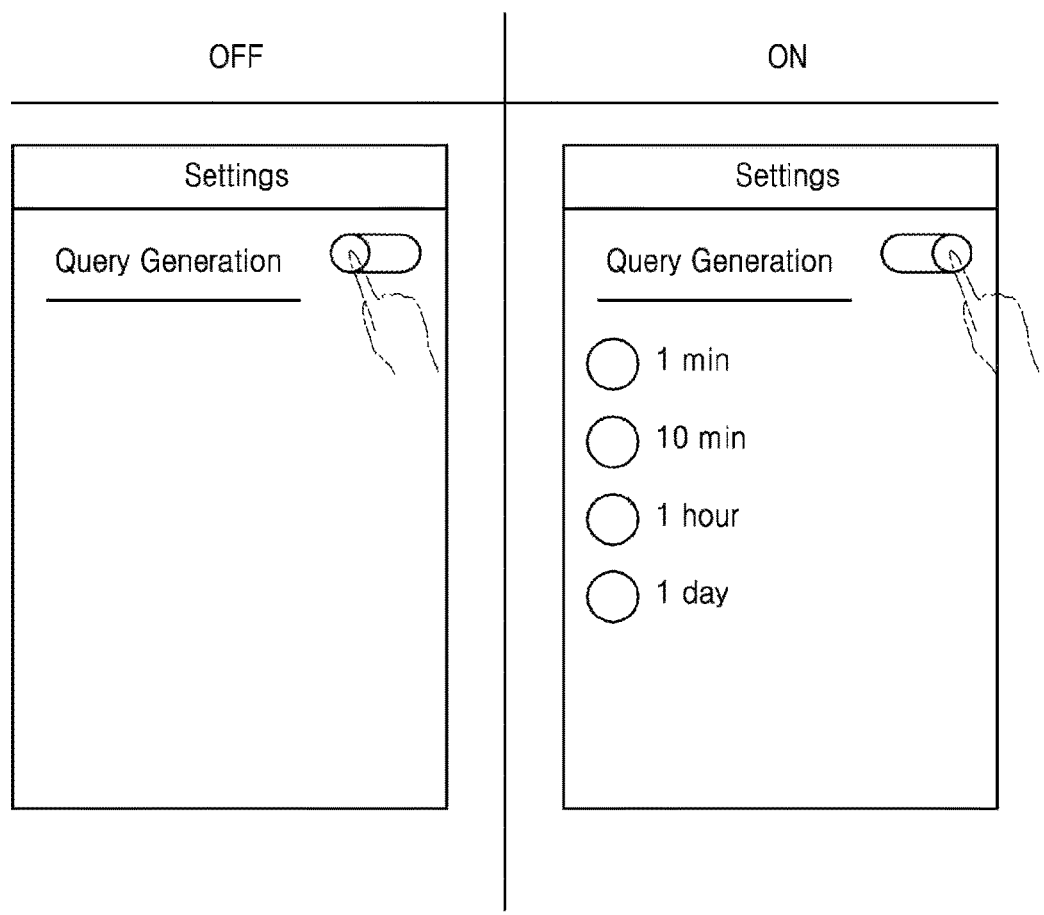

Referring to FIG. 30E, while the electronic device 100 provides the user with the settings UI with respect to ON/OFF of the information providing operation, the electronic device 100 may differently provide detailed settings UI to the user.

For example, when the information providing operation is set as ON, the electronic device 100 may allow the user to select a keyword displaying duration time. For example, the user may set the keyword displaying duration time as one minute, and then, after one minute elapses when a highlighted keyword is displayed, the electronic device 100 may stop highlighting the keyword.

Figure 30F:
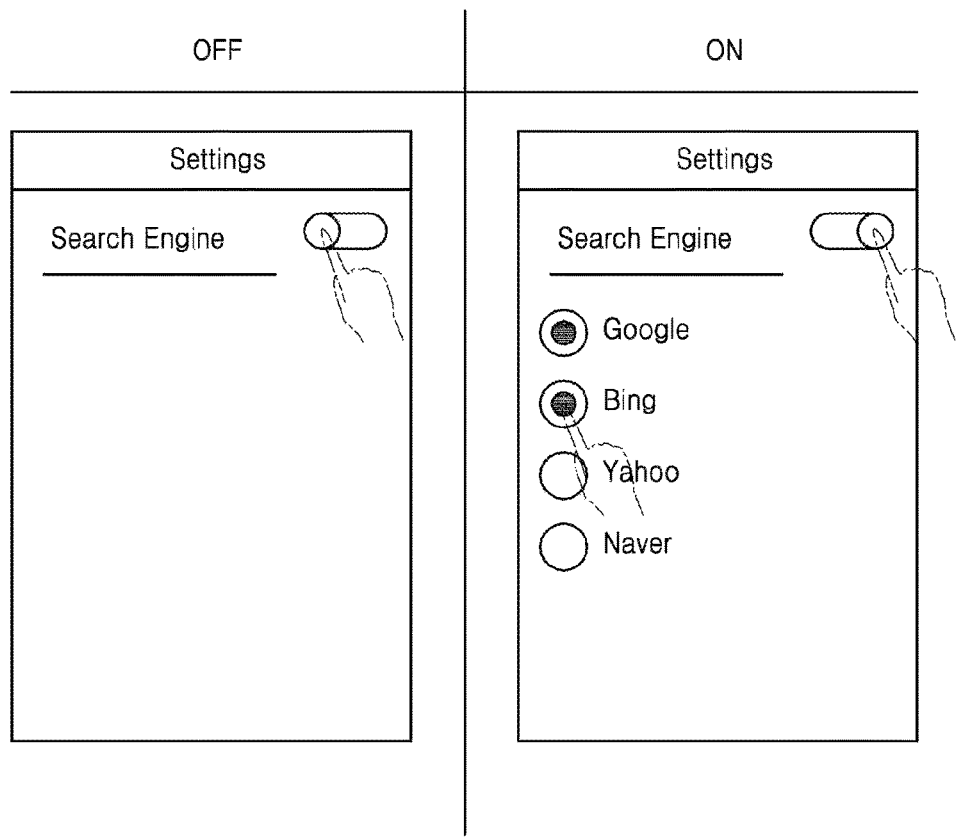

Referring to FIG. 30F, when the electronic device 100 obtains information based on an edited query and location information of the electronic device 100, the electronic device 100 may allow the user to select a search engine to be used. For example, when the electronic device 100 obtains the information based on the edited query and the location information of the electronic device 100, the electronic device 100 may be set to select a commercialized internet search engine such as Google, Bing, Yahoo, or Naver.

Figure 30G:
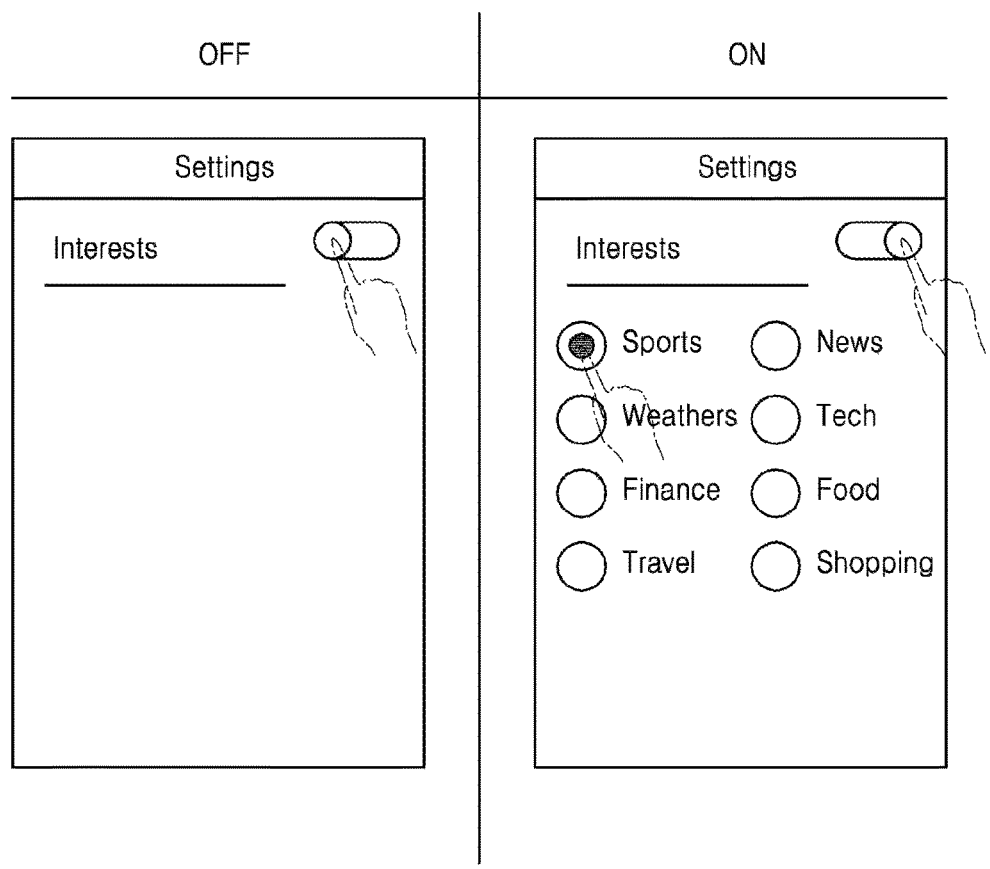

Referring to FIG. 30G, the electronic device 100 may provide the user with a settings UI with respect to setting a field of interest. Also, while the electronic device 100 provides the user with the settings UI with respect to setting the field of interest, the electronic device 100 may differently provide detailed settings UI to the user.

For example, the electronic device 100 may allow the user to select a category of a keyword when the keyword is extracted. Alternatively, for example, when the information providing operation is set as ON, the electronic device 100, the electronic device 100 may allow the user to select a category of information when the information is obtained based on an edited query and location information of the electronic device 100.

Figure 31A:
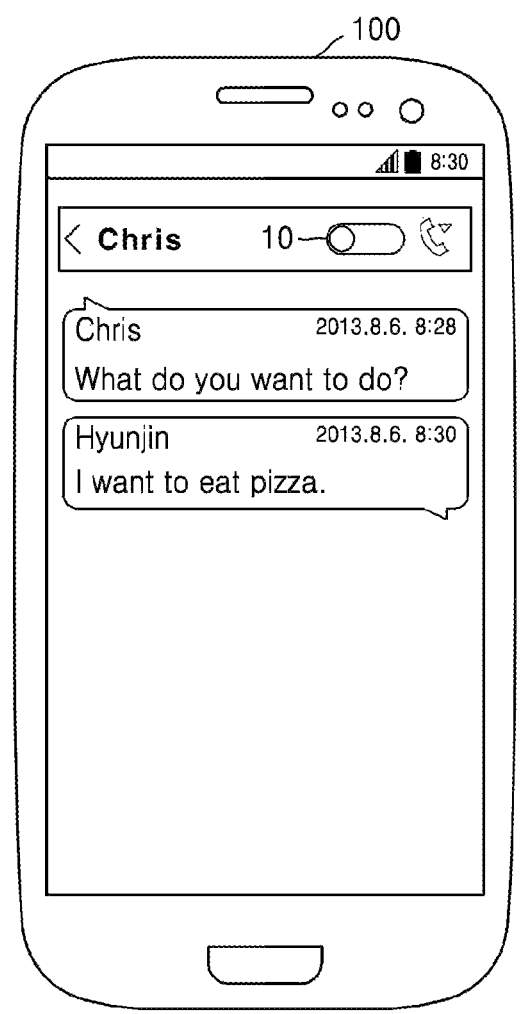

Referring to FIG. 31A, during communication, the electronic device 100 may provide a user with a settings switch 10 with respect to ON/OFF of an information providing operation by using an interface of the communication. The user may determine whether to activate the information providing operation, by using the settings switch 10. The user may set the settings switch 10 as ON, and thus may set the electronic device 100 to perform the information providing operation according to the inventive concept. The user may set the settings switch 10 as OFF, and thus may set the electronic device 100 not to perform the information providing operation according to the inventive concept.

Figure 31B:
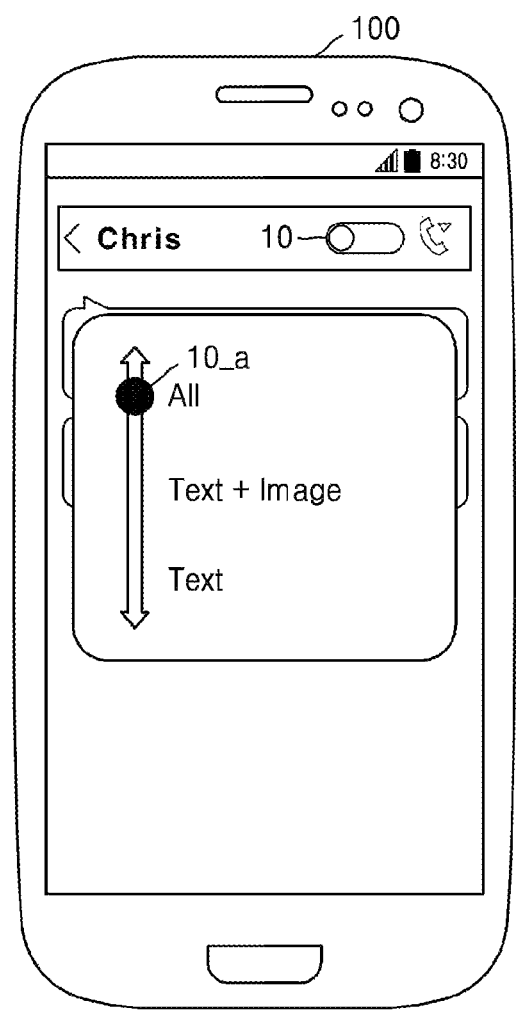

Referring to FIG. 31B, during communication, the electronic device 100 may provide a user with a settings bar 10_a with respect to a user input (a text, an image, and voice) by using an interface of the communication. The user may select, by using the settings bar 10_a, how to receive the user input.

For example, the user may set the settings bar 10_a as 'Text', and thus may set the electronic device 100 to search for a query via texts. Also, the user may set the settings bar 10_a as 'Text+Image', and thus may set the electronic device 100 to search for a query via at least one of texts and images. Also, the user may set the settings bar 10_a as 'All', and thus may set the electronic device 100 to search for a query via at least one of texts, images, and voices.

For example, if the user sets the settings bar 10_a as 'Text', the electronic device 100 may generate the query, based on texts generated by the user or texts provided to the user via a screen of the electronic device 100. For example, if the user sets the settings bar 10_a as 'Text+Image', the electronic device 100 may generate the query, based on texts and images generated by the user and/or texts and images provided to the user via the screen. The user input may be set through settings, other than the interface of the communication.

FIGS. 32 through 35 are flowcharts illustrating a method of providing information, the method being performed by the electronic device 100, according to exemplary embodiments.

Figure 32:
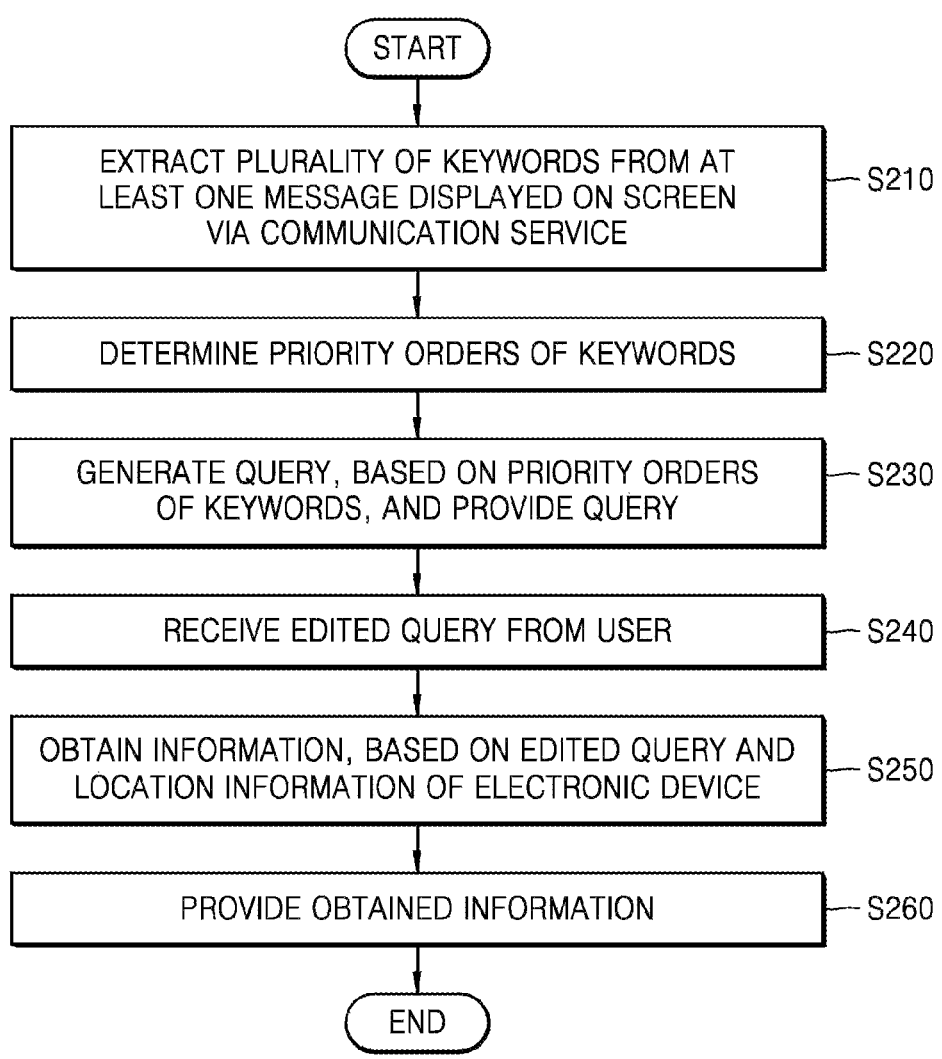
FIGS. 32 through 35 are flowcharts illustrating a method, performed by an electronic device, of providing information, according to exemplary embodiments.

Referring to FIG. 32, a processor of the electronic device 100 may extract a plurality of keywords from at least one message displayed on a screen of the electronic device 100 via a communication service (S210). The processor may determine priority orders of the keywords (S220). The processor may generate a query, based on the priority orders of the keywords, and may provide the query (S230). An input interface of the electronic device 100 may receive an edited query from a user (S240). The processor may obtain information, based on the edited query and location information of the electronic device 100 (S250). An output interface of the electronic device 100 may provide the information obtained by the processor (S260).

The method of providing information, the method being performed by the electronic device 100, according to an exemplary embodiment may determine the priority orders of the keywords, and may generate the query, based on the priority orders.

For example, as illustrated in FIG. 17, a plurality of keywords such as 'batman', 'Sumin', and 'L.A.' may be extracted. For example, the electronic device 100 may determine priority orders of the keywords, based on at least one of 1) content of conversation between users, 2) a user's location log, 3) user's previously input information, and 4) history information about a user. For example, a keyword having the highest priority order from among the keywords may be generated as the query.

A method of providing information, the method being performed by the electronic device 100, according to another exemplary embodiment may obtain information by using the query generated in operation S230. Also, a method of providing information, the method being performed by the electronic device 100, according to another exemplary embodiment may obtain information by using the edited query received in operation S240. Also, a method of providing information, the method being performed by the electronic device 100, according to another exemplary embodiment may obtain information by using the query generated in operation S230 and the edited query received in operation S240, and may display the information. Also, a method of providing information, the method being performed by the electronic device 100, according to another exemplary embodiment may obtain information by using the query generated in operation S230 and the edited query received in operation S240, and may display the information obtained in operation S250.

Figure 33:
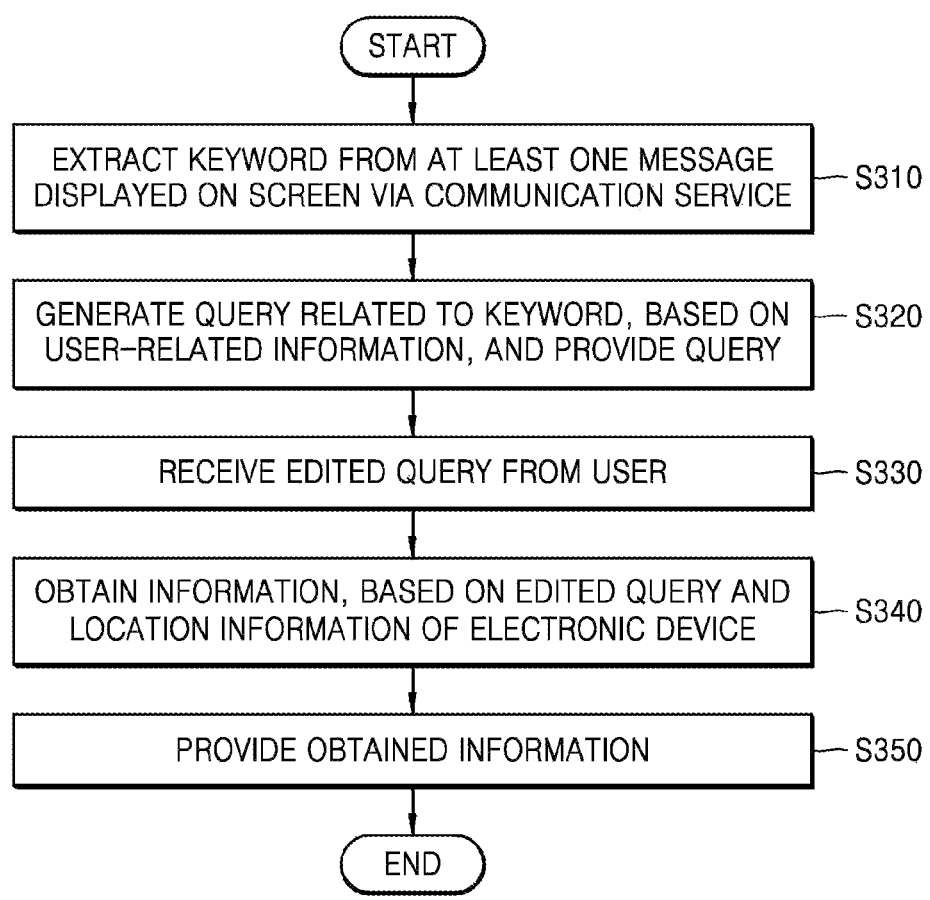

Referring to FIG. 33, the processor may extract a keyword from at least one message displayed on the screen via the communication service (S310). The processor may generate a query related to the keyword, based on user-related information, and may provide the query (S320). The input interface may receive an edited query from the user (S330). The processor may obtain information, based on the edited query and location information of the electronic device 100 (S340). The output interface may provide the information obtained by the processor (S350).

The method of providing information, the method being performed by the electronic device 100, according to an exemplary embodiment may extract the keyword or may generate the query, based on the user-related information. For example, the user-related information may include at least one of a user's location log, user's previously input information, and history information about the user.

Figure 34:
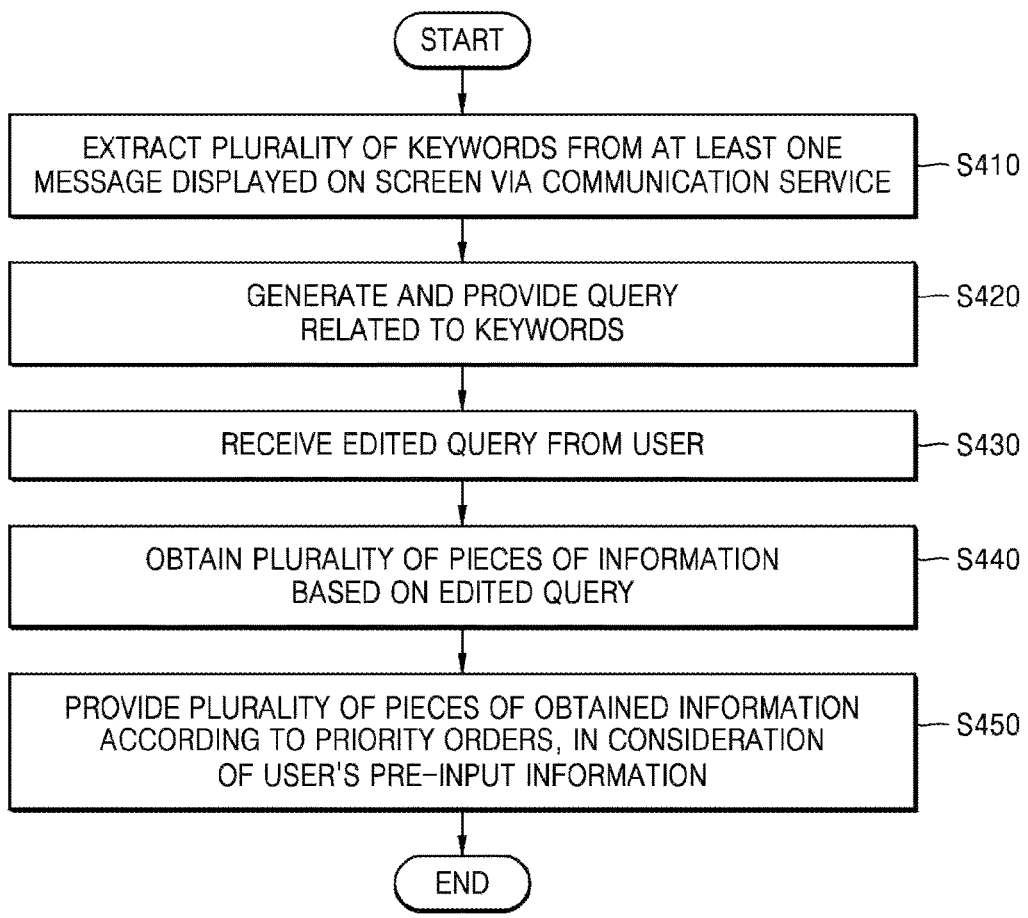

Referring to FIG. 34, the processor may extract a plurality of keywords from at least one message displayed on the screen via the communication service (S410). The processor may generate and provide a query related to the keywords (S420). The input interface may receive an edited query from the user (S430). The processor may obtain a plurality of pieces of information, based on the edited query (S440). The output interface may provide the plurality of pieces of information obtained by the processor (S450).

According to the method of providing information, the method being performed by the electronic device 100, according to an exemplary embodiment, the processor may obtain the plurality of pieces of information, based on the edited query, and may provide the plurality of pieces of information by considering priority orders of the plurality of pieces of information. For example, the electronic device 100 may determine the priority orders of the plurality of pieces of information, based on user-related information. For example, the user-related information may include at least one of a user's location log, user's previously input information, and history information about the user.

Figure 35:
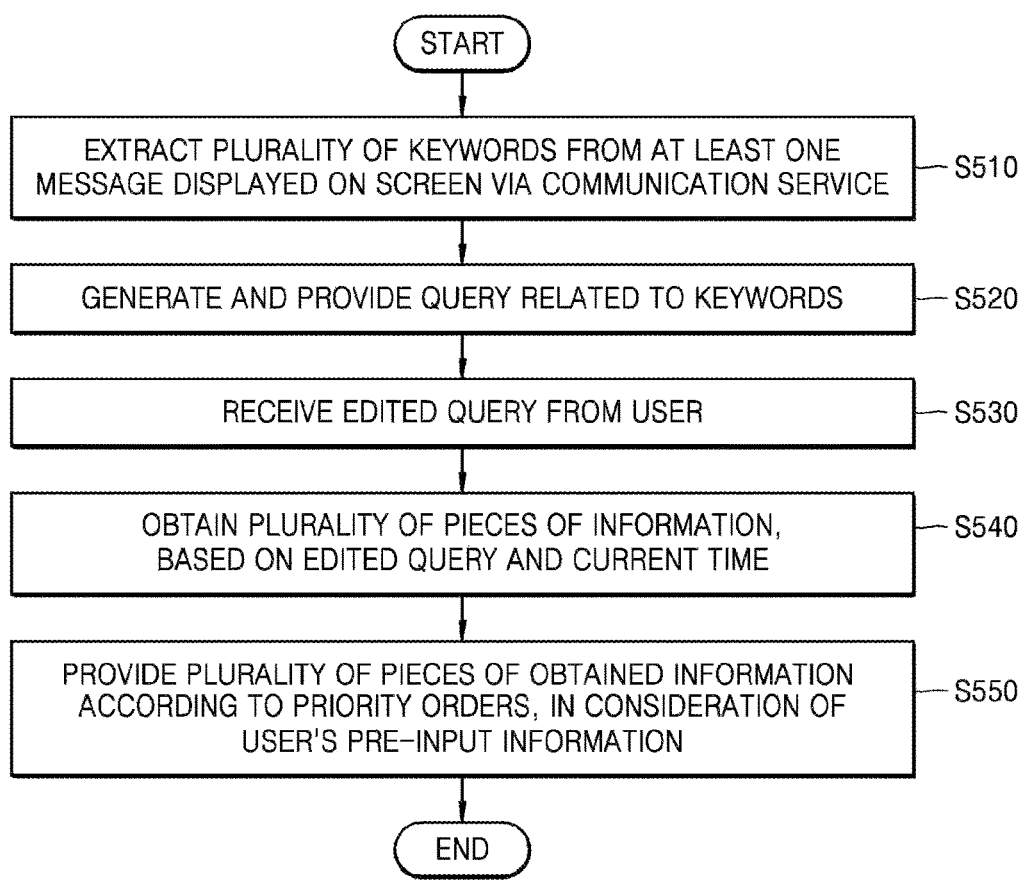

Referring to FIG. 35, the processor may extract a plurality of keywords from at least one message displayed on the screen via the communication service (S510). The processor may generate and provide a query related to the keywords (S520). The input interface may receive an edited query from the user (S530). The processor may obtain a plurality of pieces of information, based on the edited query and a current time (S540). The output interface may provide the plurality of pieces of information obtained by the processor (S550).

The method of providing information, the method being performed by the electronic device 100, according to an exemplary embodiment may obtain information, based on an edited query and a current time. For example, if the current time is a lunch time of the user, the electronic device 100 may obtain the information by prioritizing keywords related to a restaurant.

FIG. 36 illustrates an electronic device 1000, according to an exemplary embodiment.

Referring to FIG. 36, the electronic device 1000 may provide communication service Apps APP1, APP2, APP3, APP4, and APP5 (also, referred to as the applications) to a user of the electronic device 1000. The user may communicate with a user of another electronic device (not shown) by using a service provided by one of the communication service Apps APP1 through APP5.

For example, the communication service Apps APP1 through APP5 may include a messaging service App, a mailing service App, and an SNS App. The messaging service App may include, for example, Microsoft network (MSN) messenger, Yahoo messenger, Nateon, Buddybuddy, KakaoTalk, KakaoStory, Skype, or the like. For example, the communication service Apps APP1 through APP5 may include Facebook, Twitter, KakaoTalk, Skype, or the like.

For example, each of the communication service Apps APP1 through APP5 may provide at least one of a one-to-one communication service, a one-to-many communication service, and a many-to-many communication service. For example, each of the communication service Apps APP1 through APP5 may provide a one-to-one communication type messenger service or a one-to-one communication type video call service. For example, each of the communication service Apps APP1 through APP5 may provide a one-to-many communication type video lecturing service. For example, each of the communication service Apps APP1 through APP5 may provide a many-to-many communication type video conference service.

For example, each of the communication service Apps APP1 through APP5 may provide a voice or video communication service. For example, each of the communication service Apps APP1 through APP5 may provide a communication service by using a 3D image. For example, each of the communication service Apps APP1 through APP5 may provide a communication service by using a 3D hologram.

The electronic device 1000 may include a query generation framework 1100. The query generation framework 1100 may exchange information with the communication service Apps APP1 through APP5 via an application programming interface (API).

The electronic device 1000 may generate a query by using the query generation framework 1100, without considering a type of an App used by a user. For example, the electronic device 1000 may generate the query, regardless of whether an App installed in the electronic device 1000 is the mailing service App, a chatting service App, or the SNS App. The electronic device 1000 according to an exemplary embodiment may generate the query any App installed therein by using the query generation framework 1100.

The query generation framework 1100 may extract at least one keyword from a message displayed on a screen of the electronic device 1000 via a communication service. The query generation framework 1100 may extract the at least one keyword from the message by using the natural language processor 1200.

The query generation framework 1100 may provide a query related to the at least one keyword. For example, the query generation framework 1100 may generate the query related to the at least one keyword by performing a statistical analysis and/or a semantic analysis.

For example, the query generation framework 1100 may generate 'good day pizza' as the query, based on the at least one keyword, by performing the statistical analysis and/or the semantic analysis. For example, the query generation framework 1100 may generate 'good day pizza' as the query, based on 1) content of conversation between users, 2) a user's location log, 3) user's previously input information, and 4) history information about the user.

The query generation framework 1100 may include the natural language processor 1200. The natural language processor 1200 may recognize a meaning of the message by considering situational elements related to the message. For example, the natural language processor 1200 of the electronic device 1000 may recognize the meaning of the message, based on types of words included in the message, a relation between the words, and meanings of the words. The natural language processor 1200 may determine a category of a search, based on the recognized meaning.

The electronic device 1000 may provide the user with the query generated by using the query generation framework 1100. For example, the electronic device 1000 may provide, via the screen, the user with an image as the query that is generated by using the query generation framework 1100. For example, the electronic device 1000 may provide, via a speaker, the user with voice as the query that is generated by using the query generation framework 1100.

The electronic device 1000 may receive an edited query from the user. For example, the electronic device 1000 may provide the generated query to the user, and may receive, via an interface, the query edited by the user.

The electronic device 1000 may obtain information, based on the query edited by the user and location information of the user. The electronic device 1000 may obtain the information from an external search server 2000. For example, the electronic device 1000 may obtain the information from the external search server 2000 via an App service. For example, the electronic device 1000 may obtain the information from the external search server 2000 via a search service provided by an internet website.

Therefore, the electronic device 1000 according to an exemplary embodiment may allow the user to conveniently receive information related to ongoing communication while the user uses a communication service.

Figure 37:
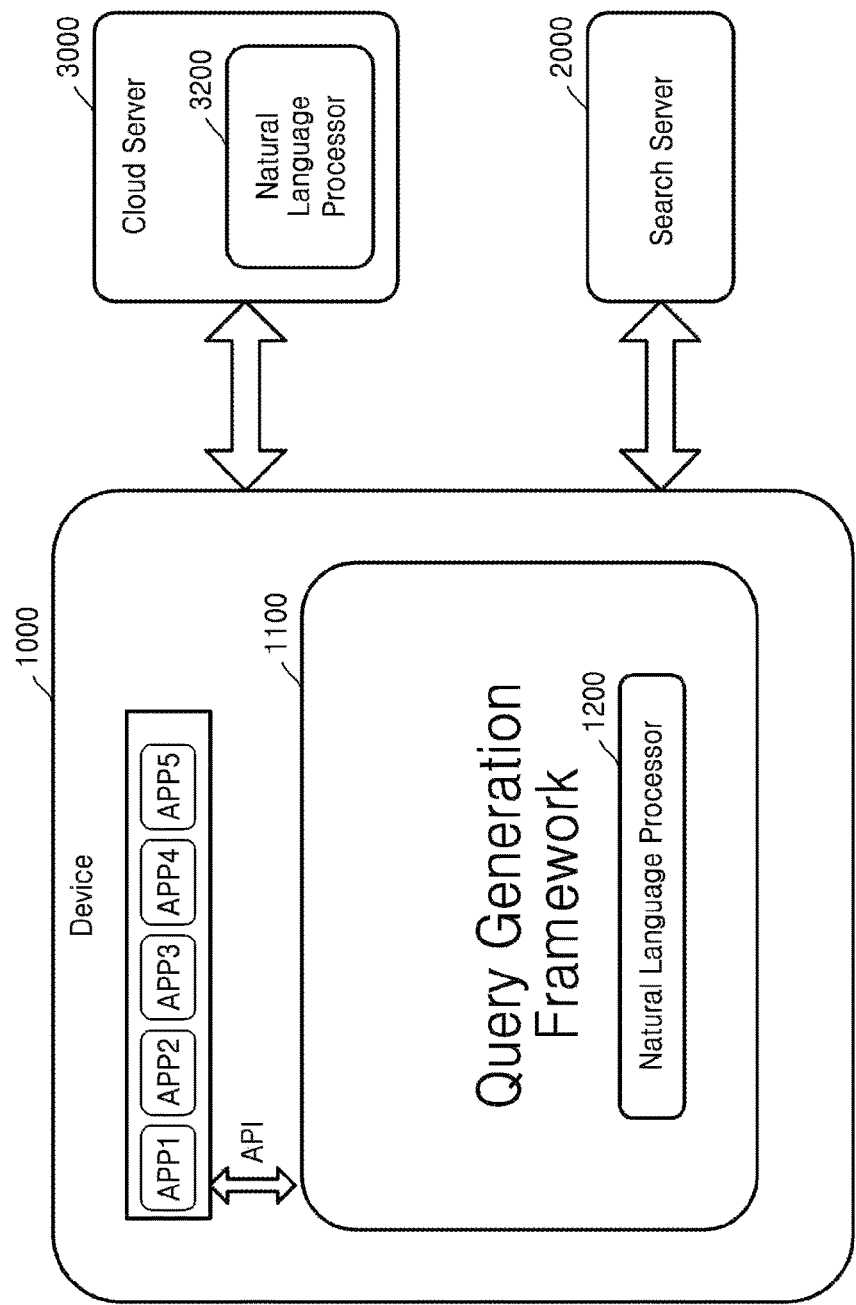
FIG. 37 is a block diagram illustrating an electronic device, according to another exemplary embodiment.

FIG. 37 is a block diagram illustrating the electronic device 1000, according to another exemplary embodiment.

Referring to FIG. 37, the electronic device 1000 may provide communication service Apps APP1, APP2, APP3, APP4, and APP5 to a user of the electronic device 1000. The user may communicate with a user of another electronic device (not shown) by using a service provided by one of the communication service Apps APP1 through APP5.

The electronic device 1000 may include the query generation framework 1100. The query generation framework 1100 may exchange information with the communication service Apps APP1 through APP5 via an API. The query generation framework 1100 may extract at least one keyword from a message displayed on a screen of the electronic device 1000 via a communication service.

The query generation framework 1100 may extract the at least one keyword from the message by using a natural language processor 3200 included in a cloud server 3000.

The query generation framework 1100 may provide a query related to the at least one keyword. For example, the query generation framework 1100 may generate the query related to the at least one keyword by performing a statistical analysis and/or a semantic analysis.

The query generation framework 1100 may recognize a meaning of the message by exchanging information with the natural language processor 3200 included in the cloud server 3000. The natural language processor 3200 may recognize the meaning of the message according to a situation related to the message. The natural language processor 3200 may determine a category of a search, based on the recognized meaning. The electronic device 1000 may provide the user with the query generated by using the query generation framework 1100. The electronic device 1000 may obtain information, based on a query edited by the user and location information of the user.

Therefore, by using the external natural language processor 3200, the electronic device 1000 according to an exemplary embodiment may allow the user to conveniently receive information related to ongoing communication while the user uses a communication service.

Figure 38:
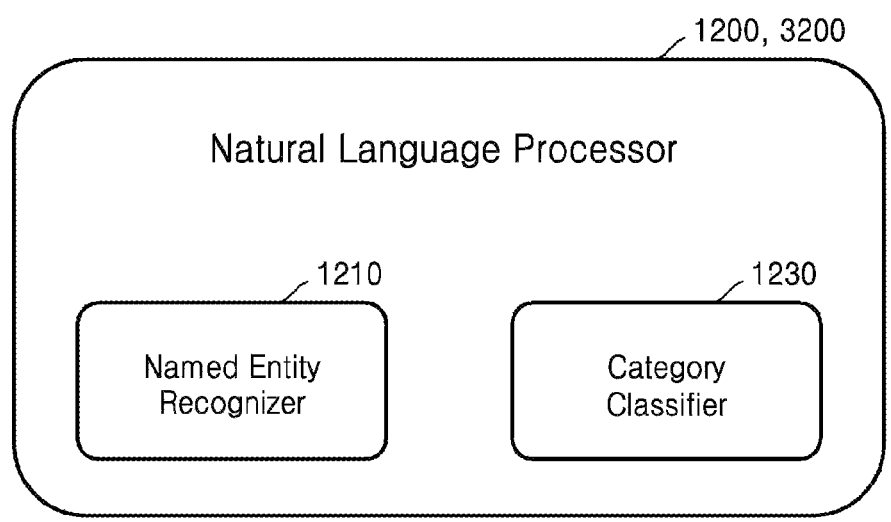
FIG. 38 illustrates a configuration of a natural language processor shown in FIGS. 36 and 37.

FIG. 38 illustrates a configuration of the natural language processor 1200 shown in FIG. 36 and the natural language processor 3200 shown in FIG. 37.

The natural language processor 1200 or 3200 may include a named entity recognizer 1210 and a category classifier 1230. The named entity recognizer 1210 may recognize a meaning of each of words used in messages in communication. Also, the named entity recognizer 1210 may recognize a meaning of each of the messages. The category classifier 1230 may classify categories of the messages, respectively. That is, the category classifier 1230 may check a keyword of each of the messages by analyzing contents of each of the messages, and may classify the categories of the messages, respectively.

Figure 39:
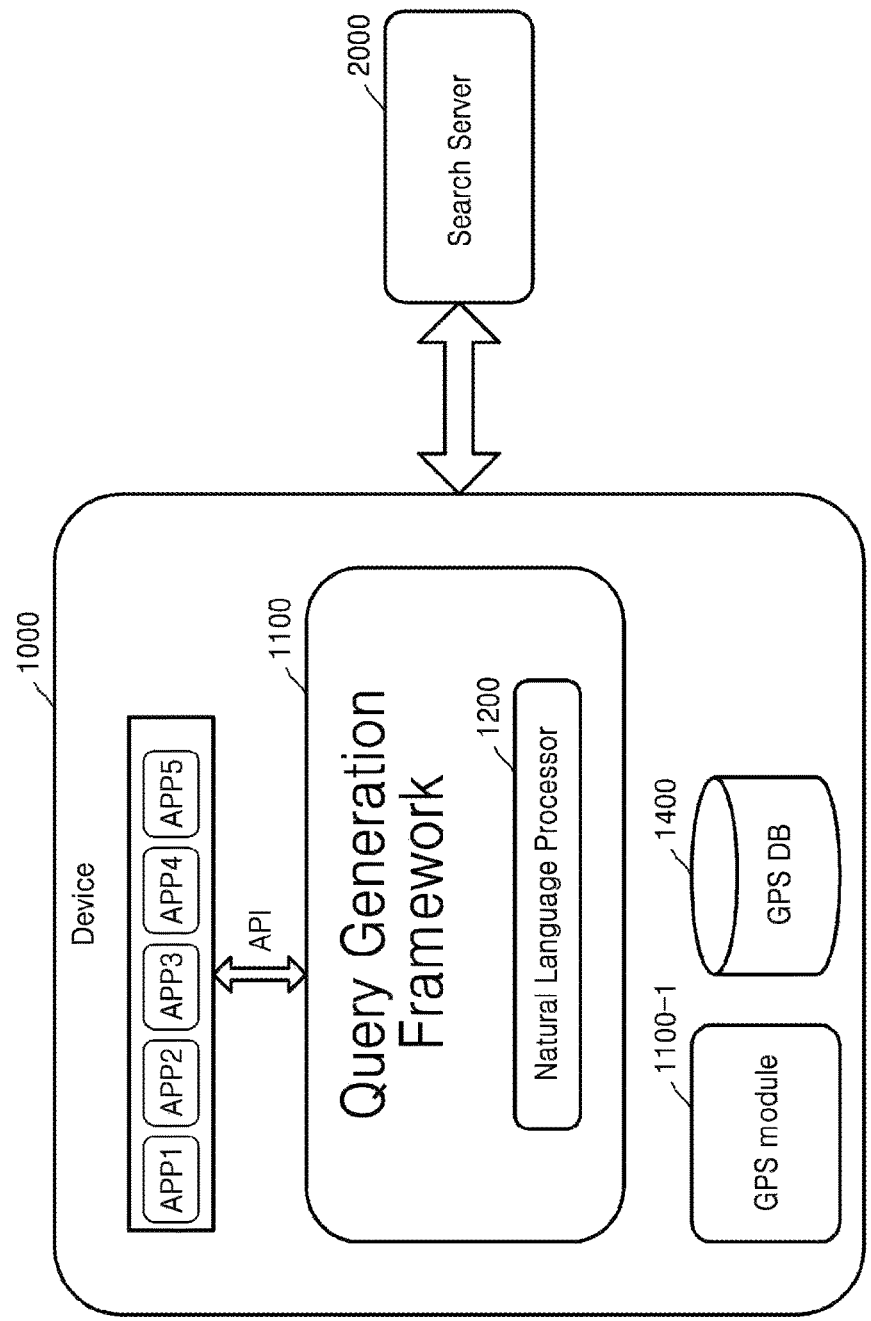
FIG. 39 is a block diagram illustrating an electronic device, according to still another exemplary embodiment.

FIG. 39 is a block diagram illustrating the electronic device 1000, according to another exemplary embodiment.

Referring to FIG. 39, the electronic device 1000 may provide communication service Apps APP1, APP2, APP3, APP4, and APP5 to a user of the electronic device 1000. The user may communicate with a user of another electronic device (not shown) by using a service provided by one of the communication service Apps APP1 through APP5.

The electronic device 1000 may include the query generation framework 1100. The query generation framework 1100 may exchange information with the communication service Apps APP1 through APP5 via an API. The query generation framework 1100 may extract at least one keyword from a message displayed on a screen of the electronic device 1000 via a communication service.

The electronic device 1000 may further include a GPS database 1400. A GPS module (or GPS processor) 1100-1 may continuously track a location of the electronic device 1000 by using a location tracking engine included in the electronic device 1000. The GPS database 1400 may continuously accumulate data of the location tracked by the GPS module 1100-1, and may continuously store information about the location of the electronic device 1000.

The GPS module 1100-1 may receive a GPS signal from a GPS satellite, may determine the location of the electronic device 1000, and may generate location information. To do so, the GPS module 1100-1 may include a GPS antenna and a GPS receiver. The GPS module 1100-1 analyzes navigation data included in the GPS signal, and extracts latitude and longitude data, time information, or the like of the electronic device 1000. The GPS signal includes an identification (ID) code, an orbit position, and time information of the GPS satellite and the GPS module 1100-1 calculates coordinates of the location of the electronic device 1000 by calculating a difference between speeds of electromagnetic waves transmitted from a plurality of GPS satellites. The aforementioned operations may be performed by a GPS positioning program embedded in the GPS module 1100-1.

Here, the GPS positioning program may determine the location of the electronic device 1000 by using one or more of conventional GPS (C-GPS) positioning, differential GPS (DGPS) positioning, assisted GPS (A-GPS) positioning, and double differential GPS positioning. Also, for more precise positioning according to the A-GPS positioning, the DGPS positing, the double differential GPS positioning, etc., the GPS positioning program may receive a signal related to error correction from an external base station or the like, and may correct the positioned location.

If the electronic device 1000 is a terminal that does not include the GPS module 1100-1, the electronic device 1000 may connect a separate GPS kit, which includes a GPS antenna, a GPS receiver, etc., to the electronic device 1000, and may receive information about a location positioned by the GPS kit.

Therefore, the electronic device 1000 according to an exemplary embodiment may continuously track the location of the electronic device 1000, may continuously store location data, and thus may allow a user to conveniently receive information related to ongoing communication while the user uses a communication service.

Figure 40:
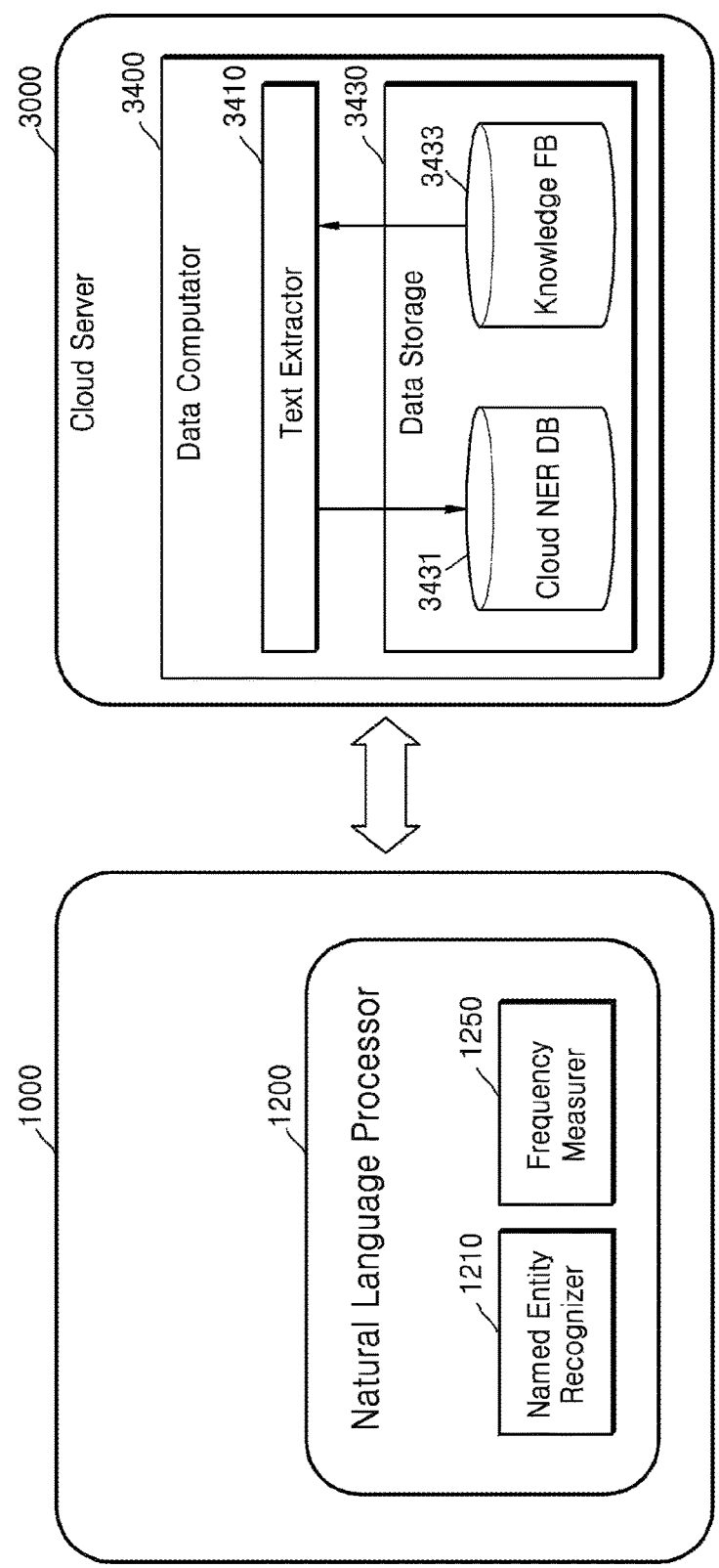
FIG. 40 is a block diagram illustrating an operation, performed an the electronic device, of recognizing an entity, according to an exemplary embodiment.

FIG. 40 is a block diagram illustrating an operation of recognizing an entity, the operation being performed by the electronic device 1000, according to an exemplary embodiment.

Referring to FIG. 40, the natural language processor 1200 included in the electronic device 1000 may include the named entity recognizer 1210 and a frequency measurer 1250.

The frequency measurer 1250 may measure a frequency of use of recognized entities in a conversation. For example, the named entity recognizer 1210 may recognize <Peter Higgs> as an entity in a sentence [Who is Peter Higgs?]. The frequency measurer 1250 may count the number of times that <Peter Higgs>, which is recognized as the entity by the named entity recognizer 1210, is used in the conversation between users.

The frequency measurer 1250 may calculate a rate of the frequency of use of the entity <Peter Higgs> in the conversation between the users. For example, the named entity recognizer 1210 may also recognize <Nobel Prize> as an entity. When the entity <Nobel Prize> is used seven times in the conversation, and the entity <Peter Higgs> is used fourteen times in the conversation, the frequency measurer 1250 may calculate the frequency of the entity <Peter Higgs> as 0.67. The frequency measurer 1250 may calculate a usage frequency by dividing <the number of times that a particular entity is used> by <a total number of times all of the entities are used>.

The named entity recognizer 1210 may receive information about each of the entities from the cloud server 3000.

The cloud server 3000 may include a data computator 3400. The data computator 3400 may include a text extractor 3410 and a data storage 3430. The data storage 3430 may include various types of databases such as a cloud-named-entity recognition database (cloud NER DB) 3431 and a knowledge DB 3433.

The text extractor 3410 may mine a text from the knowledge DB 3433 stored in the data storage 3430. The text extractor 3410 may store mined data in the cloud NER DB 3431 of the cloud server 3000. The data computator 3400 may arrange information about the cloud NER DB 3431, according to a table chart shown in FIG. 41, and may store the information in the data storage 3430.

The electronic device 1000 according to an exemplary embodiment may include the named entity recognizer 1210, may recognize each of entities included in one or more messages in a conversation between users, and may count a frequency that each of the entities is used. Therefore, the electronic device 1000 may extract a keyword, may generate a query, or may limit extraction of a keyword or a query, by using entity information such as a frequency that each of the entities is used in the conversation.

FIG. 41 illustrates a table chart generated by the named entity recognizer 1210 after the named entity recognizer 1210 recognizes entities, according to an exemplary embodiment.

Referring to FIG. 41, the named entity recognizer 1210 of FIG. 40 may recognize <Peter Higgs>, <European Center for Nuclear Research>, <United States>, and <Switzerland> as the entities. The named entity recognizer 1210 may extract information about each of the entities (hereinafter, referred to as the entity information) from the data storage 3430 included in the cloud server 3000. For example, the entity information may include relevance, a sentiment, a type, and linked data.

The electronic device 1000 may extract a keyword or may generate a query by using the entity information. Therefore, the electronic device 1000 uses the entity information in a natural language analysis, so that the electronic device 1000 may further clearly recognize user's intention included in a message.

Figure 42:
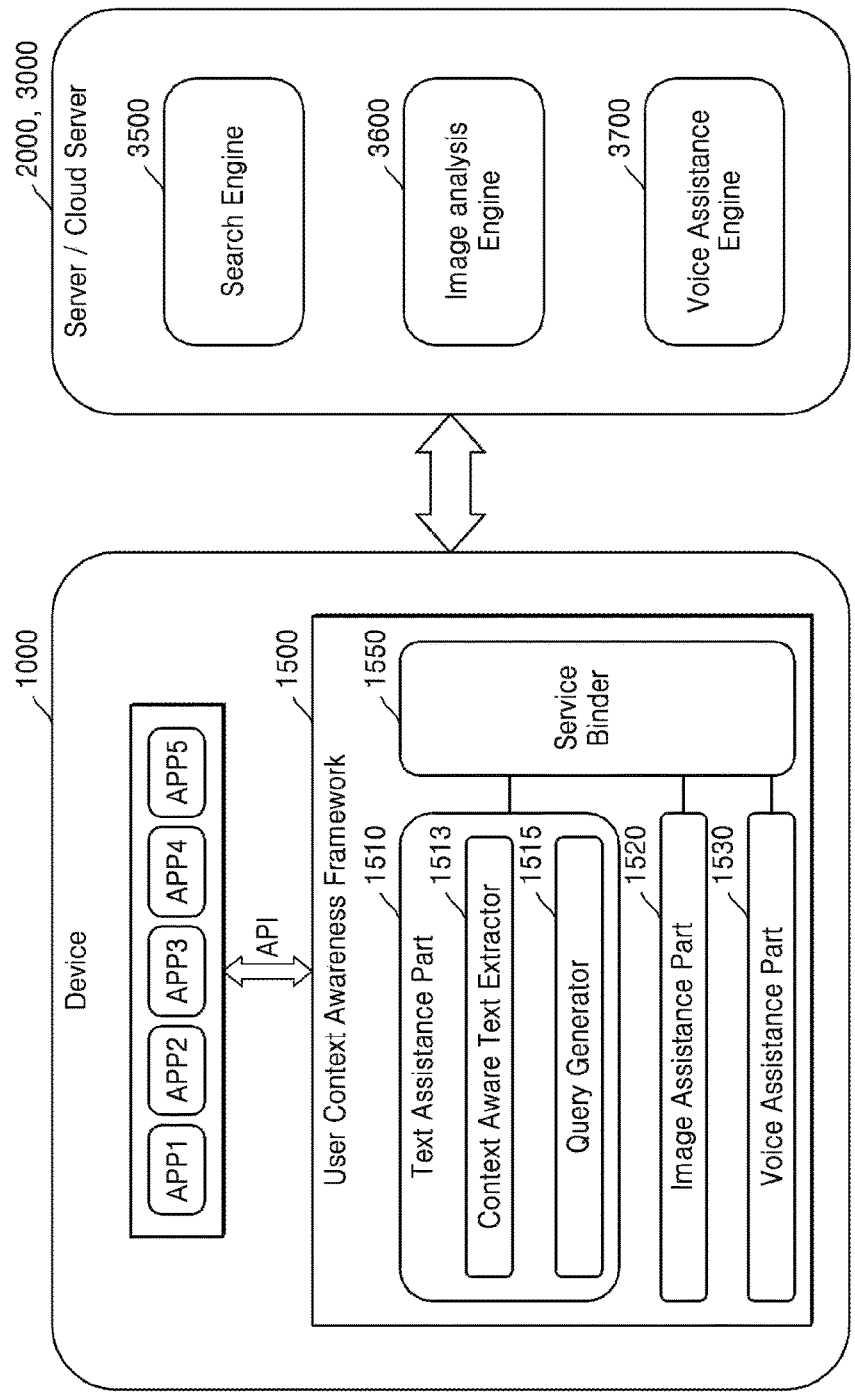
FIG. 42 is a block diagram illustrating an operation, performed by an electronic device, of obtaining a user input, according to an exemplary embodiment.

FIG. 42 is a block diagram illustrating an operation of obtaining a user input, the operation being performed by the electronic device 1000, according to an exemplary embodiment.

Referring to FIG. 42, a user context awareness framework 1500 included in the electronic device 1000 may include a text assistance part 1510, an image assistance part 1520, and a voice assistance part 1530. Also, the user context awareness framework 1500 may include a service binder 1550. The text assistance part 1510 may include a context aware text extractor 1513 and a query generator 1515.

The service binder 1550 may receive the user input, and may deliver the user input to one of the text assistance part 1510, the image assistance part 1520, and the voice assistance part 1530, according to an input type. Also, the service binder 1550 may receive a generated query from the text assistance part 1510, and may deliver the generated query to a user.

The text assistance part 1510 may generate a query with respect to a text-type user input received via the service binder 1550. The text assistance part 1510 may continuously mine texts by using the context aware text extractor 1513, and may generate the query by using the query generator 1515. The generated query may be connected to the search server 2000 or the cloud server 3000 and thus may be connected to a search engine 3500, an image analysis engine 3600, or a voice assistance engine 3700.

The image assistance part 1520 may receive an image and may generate a text corresponding to the received image. The generated text may be transmitted to the query generator 1515, and then the query generator 1515 may generate a query in a same manner as the text-type user input.

The voice assistance part 1530 may receive voice and may generate a text corresponding to the received voice. The generated text may be transmitted to the query generator 1515, and then the query generator 1515 may generate a query in a same manner as the text-type user input.

The text assistance part 1510, the image assistance part 1520, and the voice assistance part 1530 may be activated or inactivated via the interface shown in FIG. 31B. For example, when the user sets the settings bar 10_a as 'Text' by using the interface of FIG. 31B, the image assistance part 1520 and the voice assistance part 1530 may be inactivated, and even if the electronic device 1000 receives an image input or a voice input, the electronic device 1000 may not generate a query corresponding to the image input or the voice input.

Figure 43:
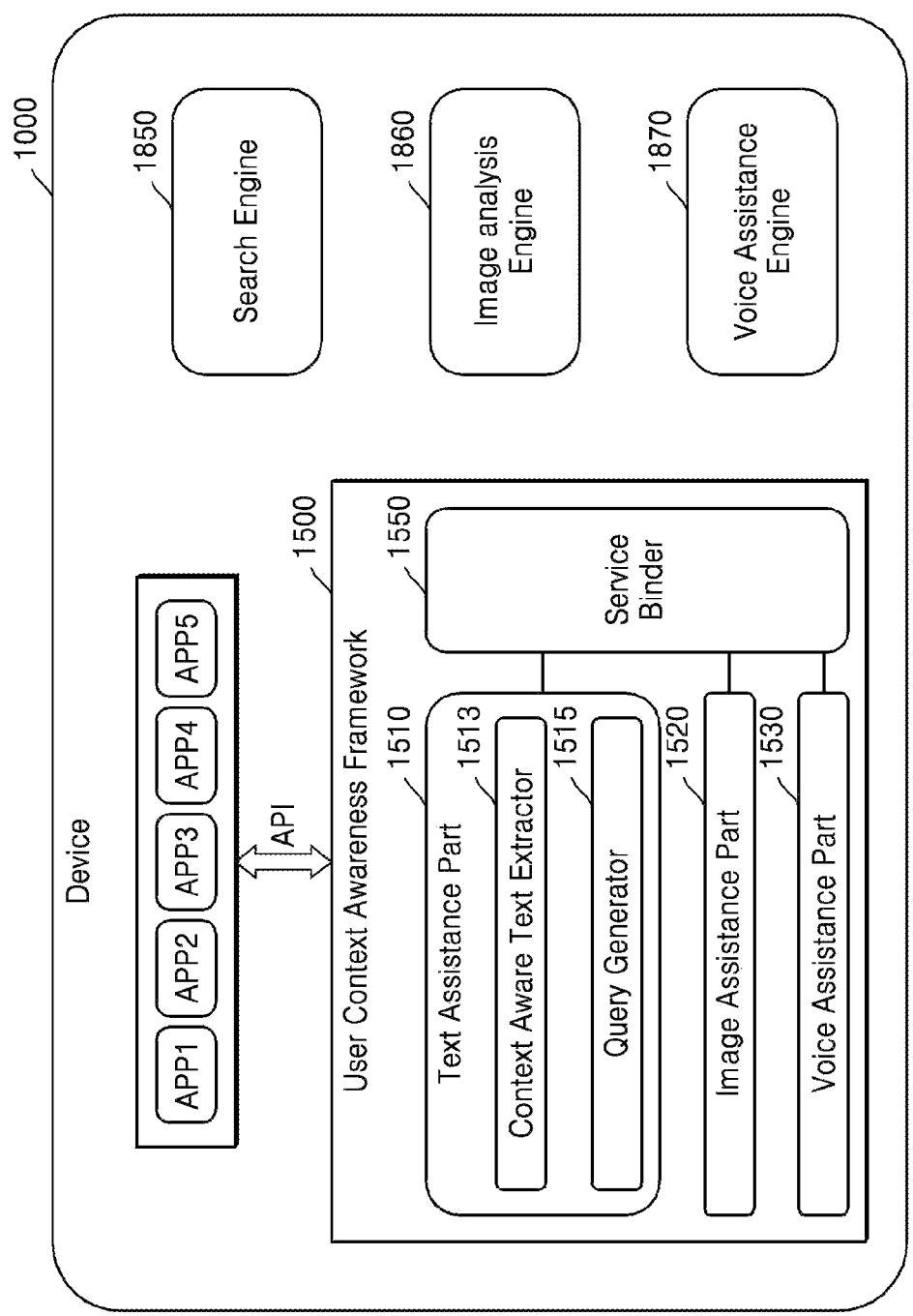
FIG. 43 is a block diagram illustrating an operation, performed by an electronic device, of obtaining a user input, according to another exemplary embodiment.

FIG. 43 is a block diagram illustrating an operation of obtaining a user input, the operation being performed by the electronic device 1000, according to another exemplary embodiment.

Referring to FIG. 43, the electronic device 1000 may include a search engine 1850, an image analysis engine 1860, and/or a voice assistance engine 1870. That is, unlike the exemplary embodiment of FIG. 42, the search engine 1850, the image analysis engine 1860, and/or the voice assistance engine 1870 may be included in the electronic device 1000. The electronic device 1000 may use the search engine 1850, the image analysis engine 1860, or the voice assistance engine 1870 to receive a query and to obtain information.

Figure 44:
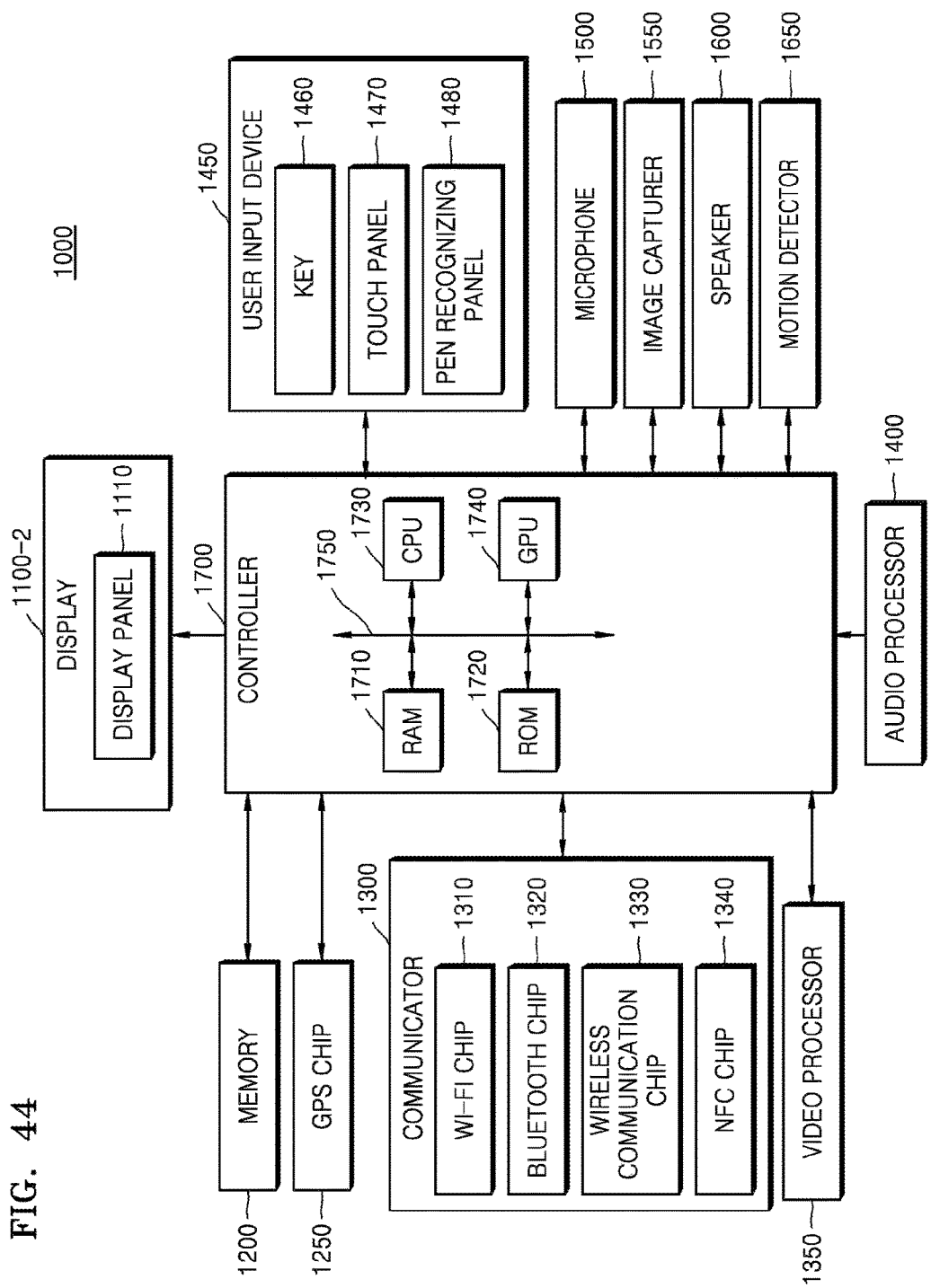
FIG. 44 is a block diagram illustrating a configuration of a user terminal device, according to an exemplary embodiment.

FIG. 44 is a block diagram illustrating a configuration of a user terminal device 1000, according to an exemplary embodiment. The user terminal device 1000 shown in FIG. 44 may correspond to the electronic device 100 of FIG. 1.

As illustrated in FIG. 44, the configuration of the user terminal device 1000 may be applied to various types of devices including a mobile phone, a tablet PC, PDA, an MP3 player, a kiosk, an electronic photo-frame, a navigation device, a digital television (TV), or wearable devices including a wristwatch, a HMD, or the like.

Referring to FIG. 44, the user terminal device 1000 may include at least one of a display 1100-2, a controller 1700, a memory 1200, a GPS chip 1250, a communicator 1300, a video processor 1350, an audio processor 1400, a user input device 1450, a microphone 1500, an image capturer 1550, a speaker 1600, and a motion detector 1650.

The display 1100-2 may include a display panel 1110 and a controller (not shown) that controls the display panel 1110. The display panel 1110 may be embodied as various displays including a liquid crystal display (LCD), an organic light-emitting diode (OLED) display, an active matrix OLED (AMOLED) display, a plasma display panel (PDP), or the like. The display panel 1110 may be formed to be flexible, transparent, and/or wearable. The display panel 1110 may be combined with a touch panel 1470 of the user input device 1450, and thus may be provided as a touchscreen (not shown). For example, the touchscreen may include an integrated module having a stack structure containing the display panel 1110 and the touch panel 1470.

The memory 1200 may include at least one of an internal memory (not shown) and an external memory (not shown).

The internal memory may include at least one of a volatile memory (e.g., a dynamic random-access memory (DRAM), a static random access memory (SRAM), a synchronous dynamic random access memory (SDRAM), etc.), a non-volatile memory (e.g., a one-time programmable read-only memory (OTPROM), a programmable read only memory (PROM), an erasable and programmable read only memory (EPROM), an electrically erasable and programmable read only memory (EEPROM), a mask read only memory (ROM), a flash ROM, etc.), a hard disk drive (HDD), and a solid-state drive (SSD). According to an exemplary embodiment, the controller 1700 may load a command or data, which is received from at least one of the non-volatile memory and another element, to the volatile memory, and may process the command or the data. Also, the controller 1700 may store, in the non-volatile memory, data that is received from or is generated by another element.

The external memory may include at least one of a compact flash (CF) memory, a secure digital (SD) memory, a micro secure digital (micro-SD) memory, a mini secure digital (mini-SD) memory, an extreme digital (xD) memory, and a memory stick.

The memory 1200 may store various programs and data used in operations of the user terminal device 1000. For example, the memory 1200 may temporarily or semi-permanently store a portion of contents to be displayed on a lock screen.

The controller 1700 may control the display 1100-2 to display the portion of the contents which is stored in the memory 1200. In other words, the controller 1700 may display, on the display 1100-2, the portion of the contents which is stored in the memory 1200. Alternatively, when a user's gesture is performed in a region of the display 1100-2, the controller 1700 may perform a control operation that corresponds to the user's gesture.

The controller 1700 may include at least one of a random access memory (RAM) 1701, a ROM 1720, a central processing unit (CPU) 1730, a graphics processor unit (GPU) 1740, and a bus 1750. The RAM 1710, the ROM 1720, the CPU 1730, and the GPU 1740 may be connected to each other via the bus 1750.

The CPU 1730 may access the memory 1200, and performs a booting operation by using an operating system (OS) stored in the memory 1200. Also, the CPU 1730 performs various operations by using the various programs, a plurality of contents, a plurality of pieces of data, etc. stored in the memory 1200.

The ROM 1720 stores a command set for booting up a system. For example, when a turn-on command is input to the user terminal device 1000, and power is supplied to the user terminal device 1000, the CPU 1730 may copy the OS stored in the memory 1200 to the RAM 1710, according to the command stored in the ROM 1720, may execute the OS, and thus may boot up the system. When the booting operation is completed, the CPU 1730 copies the various programs stored in the memory 1200 to the RAM 1710, and performs the various operations by executing the programs copied to the RAM 1710. When the user terminal device 1000 is booted up, the GPU 1740 displays a user interface screen in a region of the display 1100-2. In more detail, the GPU 1740 may generate a screen that displays an electronic document including various objects such as content, an icon, a menu, or the like. The GPU 1740 calculates coordinate values of the objects that are to be displayed according to a layout of the user interface screen, and calculates attribute values of shapes, sizes, or colors of the objects. Then, the GPU 1740 may generate user interface screens with various layouts including the objects based on the calculated attribute values. The user interface screen generated by the GPU 1740 may be provided to the display 1100-2 and thus may be displayed in regions of the display 1100-2.

The GPS chip 1250 may receive a GPS signal from a GPS satellite and may calculate a current position of the user terminal device 1000. In a case where a navigation program is used or a current position of the user is needed, the controller 1700 may calculate a position of the user by using the GPS chip 1250.

The communicator 1300 may perform communication with various external devices according to various types of communication methods. The communicator 1300 may include at least one selected from a Wi-Fi chip 1310, a Bluetooth chip 1320, a wireless communication chip 1330, and a near field communication (NFC) chip 1340. The controller 1700 may perform the communication with the various external devices by using the communicator 1300.

The Wi-Fi chip 1310 and the Bluetooth chip 1320 may perform communication by using Wi-Fi and Bluetooth, respectively. If the Wi-Fi chip 1310 or the Bluetooth chip 1320 is used, the Wi-Fi chip 1310 or the Bluetooth chip 1320 may first transmit and receive various types of connection information including a service set identification (SSID), a session key, or the like, may establish a connection for communication by using the connection information, and then may transmit and receive various types of information. The wireless communication chip 1330 may indicate a chip that performs communication according to various communication standards such as the Institute of Electrical and Electronics Engineers (IEEE), ZigBee, 3rd generation (3G), 3rd Generation Partnership Project (3GPP), Long Term Evolution (LTE), or the like. The NFC chip 1340 indicates a chip that operates in using NFC by using a 13.56 MHz band from among various radio frequency-identification (RF-ID) frequency bands such as 135 kHz, 13.56 MHz, 433 MHz, 860~960 MHz, 2.45 GHz, or the like.

The video processor 1350 may process video data included in content received by using the communicator 1300 or may process video data included in content stored in the memory 1200. The video processor 1350 may perform various image processing such as decoding, scaling, noise filtering, frame rate conversion, resolution conversion, or the like on the video data.

The audio processor 1400 may process audio data included in content received by using the communicator 1300 or may process audio data included in content stored in the memory 1200. The audio processor 1400 may perform various processing such as decoding, amplification, noise filtering, or the like on the audio data.

When a reproducing program for multimedia content is executed, the controller 1700 may reproduce the multimedia content by driving the video processor 1350 and the audio processor 1400. The speaker 1600 may output audio data generated in the audio processor 1400.

The user input device 1450 may receive an input of various instructions from a user. The user input device 1450 may include at least one selected from a key 1460, a touch panel 1470, and a pen recognizing panel 1480.

The key 1460 may be of various types such as a mechanical button, a wheel, or the like that may be formed in a front portion, a side portion, a rear portion, etc., of an external surface of a body of the user terminal device 1000.

The touch panel 1470 may sense a touch input by the user and may output a value of a touch event that corresponds to a signal generated by the sensed touch input. When the touch panel 1470 is combined with the display panel 1110 and thus is formed as a touchscreen, the touchscreen may be configured as, for example, a capacitive touchscreen, a resistive touchscreen, or a piezoelectric touchscreen by using various types of touch sensors. The capacitive touchscreen may calculate touch coordinates by sensing a small amount of electricity generated when a body part of the user touches the surface of the capacitive touchscreen, which is coated with a dielectric material. The resistive touchscreen may include two embedded electrode plates and may calculate touch coordinates by sensing a flow of current that occurs when the user touches the resistive touchscreen which causes upper and lower plates of a touched point to contact each other. The touch event that occurs on the touchscreen may be mainly generated by a finger of a person but may also be generated by an object formed of a conductive material capable of changing capacitance.

The pen recognizing panel 1480 may sense a proximity input or a touch input of a touch pen (e.g., a stylus pen or a digitizer pen) which is performed by a user, and may output a sensed pen proximity event or a sensed pen touch event. The pen recognizing panel 1480 may include, for example, an electromagnetic resonance (EMR)-type pen recognizing panel, and may sense the touch input or the proximity input according to changes in a strength of an electromagnetic field, which occur when the touch pen approaches or touches the touchscreen. In more detail, the pen recognizing panel 1480 may include an electromagnetic induction coil sensor (not shown) having a grid structure, and an electric signal processor (not shown) for sequentially providing an alternating current (AC) signal having a predetermined frequency to each loop coil of the electromagnetic induction coil sensor. When a pen having an internal resonance circuit is positioned near a loop coil of the pen recognizing panel 1480, a magnetic field transmitted from the loop coil generates a current in the resonance circuit in the pen, based on mutual electrostatic induction. Due to the current, an induction field is generated from a coil forming the resonance circuit in the pen, and the pen recognizing panel 1480 detects the induction field from the loop coil capable of receiving a signal, and thus senses the touch input or the proximity input by the pen. The pen recognizing panel 1480 may be arranged to occupy a preset area below the display panel 1110, e.g., may have a size capable of covering a display region of the display panel 1110.

The microphone 1500 may receive an input of a user's voice or other sound and may convert the user's voice or other sound to audio data. The controller 1700 may use the user's voice, which is input via the microphone 1500, in a call-related operation or may convert the user's voice to the audio data and may store the audio data in the memory 1200.

The image capturer 1550 may capture a still image or a moving picture according to a control by the user. The image capturer 1550 may be plural in number and include a front camera, a rear camera, or the like.

If the image capturer 1550 and the microphone 1500 are provided, the controller 1700 may perform a control operation according to a user's voice input via the microphone 1500 or a user's motion recognized by the image capturer 1550. For example, the user terminal device 1000 may operate in a motion control mode or a voice control mode. If the user terminal device 1000 operates in the motion control mode, the controller 1700 may activate the image capturer 1550 and may capture an image of the user, may trace a change in motions of the user, and may perform a control operation corresponding thereto. If the user terminal device 1000 operates in the voice control mode (i.e., a voice recognition mode), the controller 1700 may analyze a user's voice input via the microphone 1500, and may perform a control operation according to the analyzed user's voice.

The motion detector 1650 may detect movement of a body of the user terminal device 1000. The user terminal device 1000 may rotate or may tilt in various directions. Here, the motion detector 1650 may detect a movement characteristic such as a rotation direction, a rotation angle, a tilted angle, or the like by using at least one of a magnetic sensor, a gyroscope sensor, an acceleration sensor, etc.

In addition, an exemplary embodiment may further include a universal serial bus (USB) port for connecting the user terminal device 1000 and a USB connector, various external input ports including a headset, a mouse, a local area network (LAN), etc. for connection with various external terminals, a digital multimedia broadcasting (DMB) chip for receiving and processing a DMB signal, various sensors, or the like.

Names of elements in the user terminal device 1000 may vary. Also, the user terminal device 1000 according to an exemplary embodiment may include at least one from among the aforementioned elements, or may be embodied with more or less elements than the aforementioned elements.

Figure 45A:
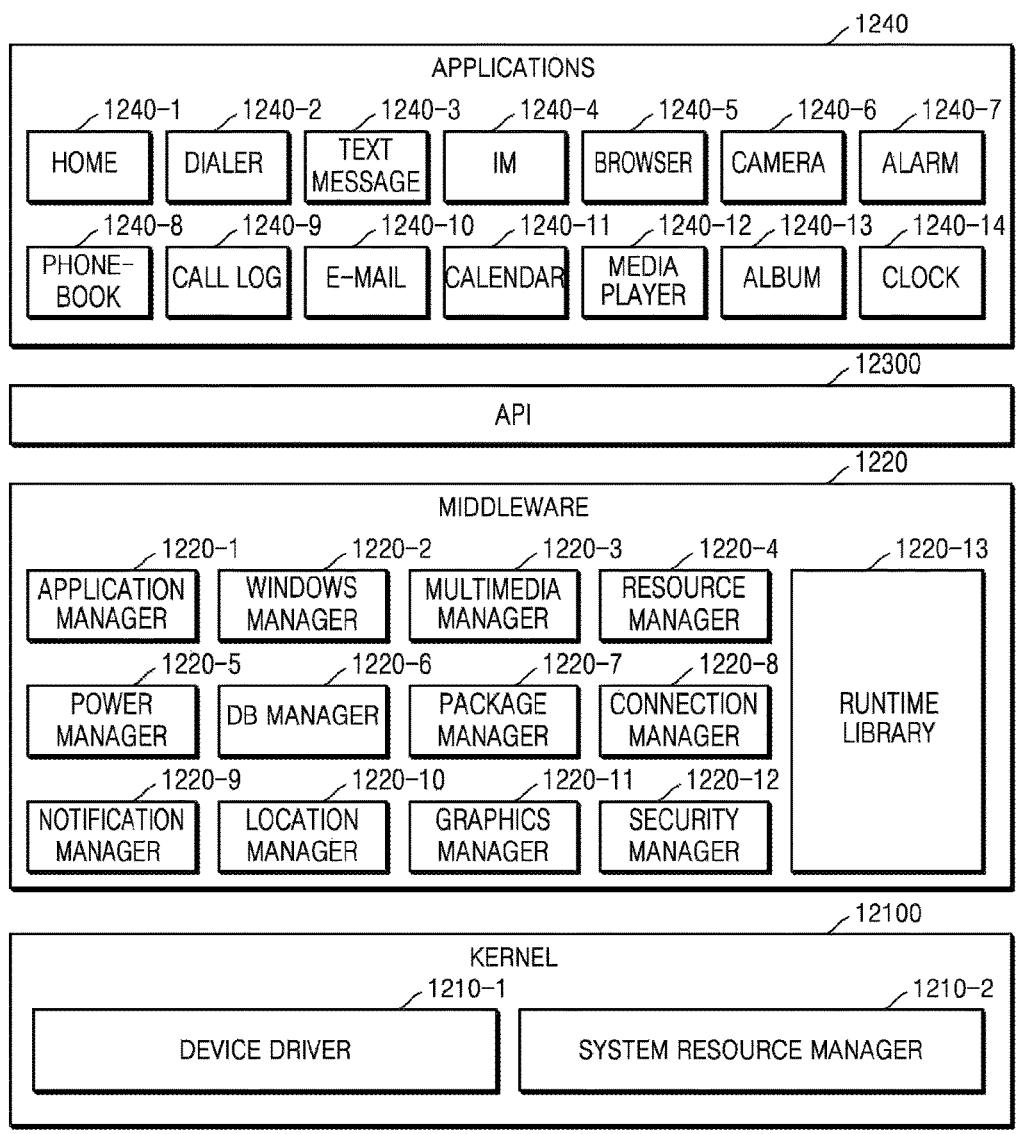
FIG. 45A is a block diagram illustrating a software configuration of an user terminal device, according to an exemplary embodiment.

FIG. 45A is a block diagram illustrating a software configuration of the user terminal device 1000, according to an exemplary embodiment.

Referring to FIG. 45A, the memory 1200 may store an OS for controlling resources of the user terminal device 1000, an application program for an operation of an application, or the like. The OS may include a kernel 12100, middleware 1220, an API 12300, etc. Examples of the OS may include Android, iOS, Windows, Symbian, Tizen, Bada or the like.

The kernel 12100 may include at least one of a device driver 1210-1 and a system resource manager 1210-2 that are capable of managing resources. The device driver 1210-1 may allow hardware of the user terminal device 1000 to be accessed and controlled by using software. To do so, the device driver 1210-1 may be divided into an interface and discrete driver modules provided by discrete hardware companies. For example, the device driver 1210-1 may include at least one of a display driver, a camera driver, a Bluetooth driver, a shared memory driver, an USB driver, a keypad driver, a Wi-Fi driver, an audio driver, and an inter-process communication (IPC) driver. The system resource manager 1210-2 may include at least one of a process manager, a memory manager, and a file system manager. The system resource manager 1210-2 may perform controlling, allocating, or retrieving of system resources.

The middleware 1220 may include a plurality of modules that are pre-embodied to provide a function that is commonly requested by various applications. The middleware 1220 may provide the function via the API 12300 to control applications 1240 to efficiently use the resources of the user terminal device 1000. The middleware 1220 may include at least one of a plurality of modules including an application manager 1220-1, a Windows manager 1220-2, a multimedia manager 1220-3, a resource manager 1220-4, a power manager 1220-5, a DB manager 1220-6, a package manager 1220-7, a connection manager 1220-8, a notification manager 1220-9, a location manager 1220-10, a graphics manager 1220-11, and a security manager 1220-12.

The application manager 1220-1 may manage a life cycle of at least one of the applications 1240. The Windows manager 1220-2 may manage a GUI resource used in a screen. The multimedia manager 1220-3 may detect formats for reproducing various types of multimedia files, and may encode or decode a media file by using a codec appropriate for a format of the media file. The resource manager 1220-4 may manage resources such as a source code, a memory, or storage spaces of at least one of the applications 1240. The power manager 1220-5 may interoperate with a Basic Input/Output System (BIOS), thereby managing a battery or power supply and providing power information to an operation. The DB manager 1220-6 may manage a database, which is to be used in at least one of the applications 1240, to be generated, searched, or changed. The package manager 1220-7 may manage installing or updating an application that is distributed in the form of a package file. The connection manager 1220-8 may manage wireless connection such as Wi-Fi, Bluetooth, or the like. The notification manager 1220-9 may display or notify an event such as a received message, an appointment, an approach notification, or the like while a user is not disturbed by the event. The location manager 1220-10 may manage location information of the user terminal device 1000. The graphics manager 1220-11 may manage graphics effects to be provided to the user, and a UI related to the graphics effects. The security manager 1220-12 may provide general security functions requested for system security or user authentication. If the user terminal device 1000 has a phone function, the middleware 1220 may further include a call manager (not shown) for managing a voice or video call function of the user terminal device 1000.

The middleware 1220 may further include a runtime library 1220-13 or other library modules (not shown). The runtime library 1220-13 is a library module used by a compiler to add a new function by using a programming language while an application is being executed. For example, the runtime library 1220-13 may perform input/output, memory management, or an operation for performing a mathematical function. The middleware 1220 may generate and use a new middleware module by combining various functions of the aforementioned internal configuration element modules. The middleware 1220 may provide a module that is specialized according to each type of the OS, to provide a differentiated function. The middleware 1220 may dynamically delete some of existing configuration elements or may dynamically add new configuration elements. Some configuration elements in an exemplary embodiment may be omitted, other configuration elements may be further included, or some of the configuration elements may be substituted with other configuration elements that have different names but perform similar functions.

The API 12300 is a set of API programming functions, and may be provided with a different configuration according to each type of OS. Android or iOS may provide one API set for each platform, and Tizen may provide at least two API sets for each platform.

The applications 1240 may include at least one pre-loaded application that is installed as a default, or a third party application that is installed and used by the user while the user uses the user terminal device 1000. For example, the applications 1240 may include at least one of a home application 1240-1 for returning to a home screen, a dialer application 1240-2 for establishing a call with the other party, a text message application 1240-3 for receiving a message from the other party identified based on a telephone number, an instant message (IM) application 1240-4, a browser application 1240-5, a camera application 1240-6, an alarm application 1240-7, a phone-book application 1240-8 for managing telephone numbers or addresses of other parties, a call log application 1240-9 for managing a call log of the user, reception/transmission logs of text messages, or an unanswered call log, an e-mail application 1240-10 for receiving an e-mail from another party identified based on an e-mail account, a calendar application 1240-11, a media player application 1240-12, an album application 1240-13, and a clock application 1240-14. Names of the aforementioned elements of software according to an exemplary embodiment may vary according to each type of OS. Also, the software according to an exemplary embodiment may include or omit at least one of the aforementioned elements, or may further include at least one additional element.

The applications 1240 may receive a query via the middleware 1220 and the API 12300. When a keyword is extracted by performing a natural language analysis while an application is being executed, the user terminal device 1000 may determine a query corresponding to the keyword via the API 12300 and the middleware 1220. For example, when a keyword "6th of a certain month" is extracted while a user executes the text message application 1240-3, the user terminal device 1000 may search for schedule data generated in the calendar application 1240-11 via the API 12300 and the middleware 1220, and may display a search result on an execution window of the text message application 1240-3.

Also, when a keyword "execute xx" is extracted while the user executes the text message application 1240-3, the user terminal device 1000 may search for data corresponding to "execute xx" in the calendar application 1240-11, the phone-book application 1240-8, and the e-mail application 1240-10 via the API 12300 and the middleware 1220, and may display a search result on the execution window of the text message application 1240-3.

The user terminal device 1000 may deliver the extracted keyword to the middleware 1220 via a dedicated API, may access, via the DB manager 1220-6, data generated in another application, and may provide the search result by referring to the data.

A plurality of pieces of data generated in the applications 1240 may be stored in a DB (not shown), and when the keyword is extracted while an application is being executed, the user terminal device 1000 may access the DB via the API 12300 and the middleware 1220, and may provide the search result by referring to data stored in the DB.

Figure 45B:
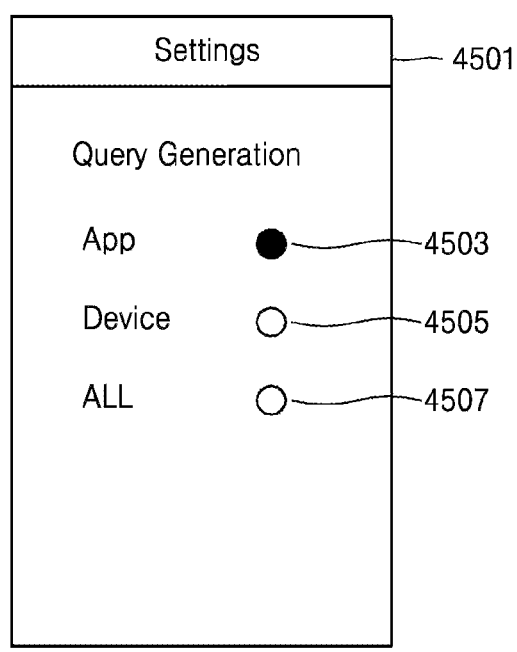
FIG. 45B illustrates a user settings screen provided by an electronic device, according to an exemplary embodiment.

FIG. 45B illustrates a user settings screen provided by the electronic device 100, according to an exemplary embodiment.

Referring to FIG. 45B, the electronic device 100 may provide a user with a settings screen 4501 with respect to an information providing operation. The user may select an information providing method via the settings screen 4501. While FIG. 45B illustrates an operation of "Query Generation", this operation may be differently expressed according to products, and thus the expression of the operation does not limit the scope of the inventive concept.

The query generation may provide three types, i.e., "App 4503", "Device 4505", and "ALL 4507". When the user selects "App 4503" displayed on the settings screen 4501, the electronic device 100 may generate a query by considering only an executed application, and may provide a search result performed by using the query. For example, when the user selects "App 4503" from the settings screen 4501, and executes the text message application 1240-3, the electronic device 100 may extract a keyword by performing a natural language analysis, may determine a query by considering only the text message application 1240-3, and may perform a search operation.

When the user selects "Device 4505" from the settings screen 4501, the electronic device 100 may determine a query by considering data generated in an executed application and another application stored in a DB (not shown), and may perform a search operation. For example, when the user selects "Device 4505" from the settings screen 4501, and executes the text message application 1240-3, the electronic device 100 may extract a keyword by performing a natural language analysis, may determine a query corresponding to the keyword by considering the calendar application 1240-11, the phone-book application 1240-8, and the e-mail application 1240-10 via the API 12300 and the middleware 1220, and may display a search result on an execution window of the text message application 1240-3.

The electronic device 100 may deliver the extracted keyword to the middleware 1220 via a dedicated API, may access, via the DB manager 1220-6, data generated in another application, and may provide the search result by referring to the data.

A plurality of pieces of data generated in the applications 1240 may be stored in the DB, and when the keyword is extracted while an application is being executed, the electronic device 100 may access the DB via the API 12300 and the middleware 1220, and may provide the search result by referring to data stored in the DB.

When the user selects "ALL 4507" from the settings screen 4501, the electronic device 100 may select all of "App 4503" and "Device 4505", and may perform a search operation.

Figure 46:
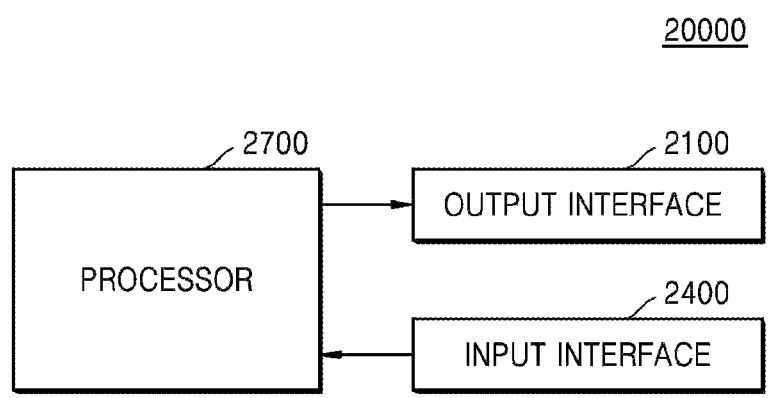
FIG. 46 illustrates a UI of an electronic device, according to another exemplary embodiment.

FIG. 46 illustrates a UI of an electronic device 20000, according to another exemplary embodiment. The electronic device 20000 may correspond to the electronic device 100 of FIG. 1.

The electronic device 20000 may include a processor 2700, an input interface 2400, and an output interface 2100.

The processor 2700 may include a mobile application processor or a CPU. The processor 2700 may be referred to as a controller, a controller, or the like. Also, the processor 2700 may further include a core, a display controller, and an image signal processor (ISP).

The processor 2700 according to an exemplary embodiment may extract at least one keyword from a message displayed on a screen of the electronic device 20000 via a communication service. Also, the processor 2700 according to an exemplary embodiment may generate a query related to the keyword. Also, the processor 2700 according to an exemplary embodiment may obtain information, based on an edited query and location information of the electronic device 20000.

The input interface 2400 may be a unit used by a user to input data to control the electronic device 20000. For example, the input interface 2400 may be a key pad, a dome switch, a touch pad (for example, a touch capacitive type touch pad, a pressure resistive type touch pad, an infrared beam sensing type touch pad, a surface acoustic wave type touch pad, an integral strain gauge type touch pad, a piezo effect type touch pad, etc.), a jog wheel, a jog switch, or the like. Also, the input interface 2400 may include a touch-screen, a touch panel, a microphone, and/or a keyboard.

Also, the input interface 2400 may include at least one module to receive an input of data from the user. For example, the input interface 2400 may include a motion recognition module, a touch recognition module, a voice recognition module, etc.

The touch recognition module may sense a touch gesture by the user on the touchscreen, and may deliver information about the touch gesture to the processor 2700. The voice recognition module may recognize voice of the user by using a voice recognition engine, and may deliver the recognized voice to the processor 2700. The motion recognition module may recognize a motion of an object, and may deliver information about the motion of the object to the processor 2700.

Throughout the specification, a user input via the input interface 2400 of the electronic device 20000 may include, but is not limited to, at least one selected from a touch input, a bending input, a voice input, a key input, and a multimodal input.

The touch input indicates a gesture of the user which is performed on a touch screen to control the electronic device 20000. For example, the touch input according to one or more exemplary embodiments may include a tap gesture, a touch & hold gesture, a double tap gesture, a drag gesture, a panning gesture, a flick gesture, a drag & drop gesture, or the like.

"Tapping" is a user's motion of touching a screen by using a finger or a touch tool (e.g., an electronic pen) and then instantly lifting the finger or touch tool from the screen.

"Touching & holding" is a user's motion of touching a screen by using a finger or a touch tool (e.g., an electronic pen) and then maintaining the above touching motion for a predetermined time (e.g., 2 seconds) or longer, after touching the screen. For example, a time difference between a touch-in time and a touch-out time is greater than or equal to the predetermined time (e.g., 2 seconds). When a touch input lasts more than the predetermined time, in order to inform the user whether the touch input is tapping or touching & holding, a feedback signal may be provided in a visual, acoustic, or tactile manner. In other exemplary embodiments, the predetermined time may vary.

"Double tapping" is a user's motion of rapidly touching the screen twice by using a finger or touch tool (such as a stylus pen).

"Dragging" is a user's motion of touching a screen by using the finger or touch tool and moving the finger or touch tool to another position on the screen while keeping the touching motion. The dragging motion may enable the moving or panning motion of an object.

"Panning" is a user's motion of performing a dragging motion without selecting an object. Since no object is selected in the panning motion, no object is moved in a page but the page itself is moved on the screen or a group of objects may be moved within a page.

"Flicking" is a user's motion of rapidly performing a dragging motion over a predetermined speed (e.g., 100 pixel/s) by using the finger or touch tool. The dragging (panning) motion or the flicking motion may be distinguished from each other based on whether a moving speed of the finger or touch tool is over the predetermined speed (e.g., 100 pixel/s) or not.

"Dragging & Dropping" is a user's motion of dragging an object to a preset position on the screen with the finger or touch tool and then dropping the object at that position.

"Pinching" is a user's motion of moving two fingers touching the screen in opposite directions. The pinching motion is a gesture to magnify (open pinch) or contract (close pinch) an object or a page. A magnification value or a contraction value is determined according to the distance between the two fingers.

"Swiping" is a user's motion of touching an object on the screen with the finger or touch tool and simultaneously moving the object horizontally or vertically by a predetermined distance. A swiping motion in a diagonal direction may not be recognized as a swiping event.

"Motion input" indicates a motion that a user does with the device to control the electronic device 20000. For example, the motion input may include an input of the user who rotates the electronic device 20000, tilts the electronic device 20000, or moves the electronic device 20000 in up, down, right, and/or left direction. The electronic device 20000 may sense a motion input preset by the user, by using an acceleration sensor, a tilt sensor, a gyro sensor, a 3-axis magnetic sensor, etc.

Throughout the specification, "bending input" indicates an input of a user who bends a whole or partial area of the electronic device 20000 to control the electronic device 20000, and here, the electronic device 20000 may be a flexible display device. According to an exemplary embodiment, the electronic device 20000 may sense a bending position (a coordinates-value), a bending direction, a bending angle, a bending speed, the number of times that the bending motion is performed, a time of occurrence of the bending motion, a hold time of the bending motion, etc.

Throughout the specification, "key input" indicates an input of the user who controls the electronic device 20000 by using a physical key formed on the electronic device 20000 or by using a virtual key provided by the electronic device 20000.

Throughout the specification, "multimodal input" indicates a combination of at least two input methods. For example, the electronic device 20000 may receive a touch input and a motion input of the user, or may receive a touch input and a voice input of the user. Also, the electronic device 20000 may receive a touch input and an eye input of the user. The eye input indicates an input by which the user adjusts a blinking motion of his or her eye, a gaze position, a moving speed of his or her eye, etc. to control the electronic device 20000.

The input interface 2400 according to an exemplary embodiment may receive an edited query from the user.

The output interface 2100 may output an audio signal, a video signal, or an alarm signal, and may include a display module, a sound output module, or the like. Also, the output interface 2100 may include a flat display capable of displaying a 2D image, and a flat display capable of displaying a 3D image. The output interface 2100 may include a device capable of outputting a 3D hologram.

The output interface 2100 according to an exemplary embodiment may provide the query generated by the processor 2700. The output interface 2100 according to an exemplary embodiment may provide information obtained by the processor 2700.

The electronic device 20000 may exchange information with a search server (not shown) via communication with the search server. For example, the electronic device 20000 may communicate with the search server by using at least one protocol. For example, the electronic device 20000 may communicate with the search server by using at least one of a trivial file transfer protocol (TFTP), a simple network management protocol (SNMP), a simple mail transfer protocol (SMTP), a post office protocol (POP), an internet control message protocol (ICMP), a serial line interface protocol (SLIP), a point-to-point protocol (PPP), a dynamic host configuration protocol (DHCP), a network basic input/output system (NetBIOS), an internetwork packet exchange/sequenced packet exchange (IPX/SPX), an Internet control message protocol (ICMP), an Internet protocol (IP), an address resolution protocol (ARP), a transmission control protocol (TCP), a user datagram protocol (UDP), Winsock, a dynamic host configuration protocol (DHCP), and a routing information protocol (RIP), but one or more exemplary embodiments are not limited thereto.

The electronic device 20000 may short-distance communication by using a short-distance communication module. Examples of the short-distance communication may include a wireless LAN (e.g., Wi-Fi), Bluetooth, ZigBee, Wi-Fi direct (WFD), UWB, or infrared data association (IrDA), but one or more exemplary embodiments are not limited thereto.

FIGS. 47 through 50 illustrate examples of a UI provided by the electronic device 100 for a communication via a messaging service.

Figure 47:
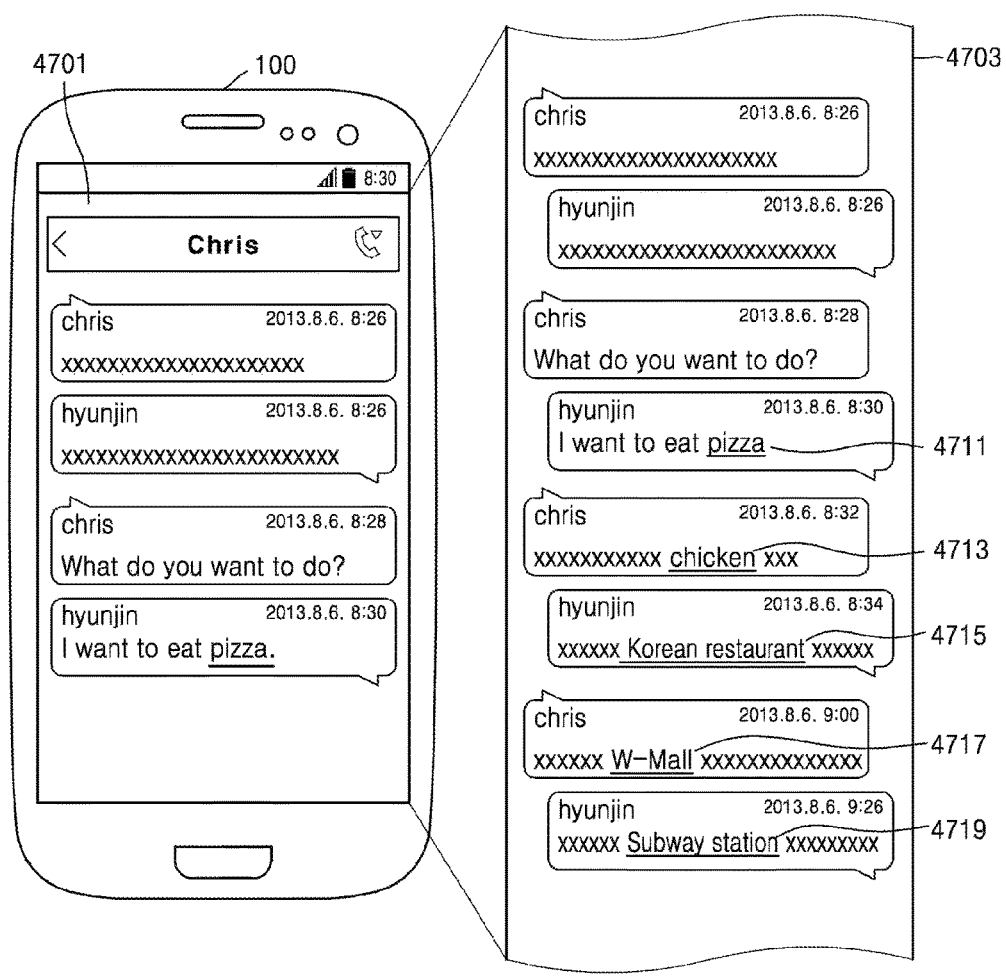
FIGS. 47 through 50 illustrate examples of a UI provided by the electronic device 100 for a communication via a messaging service.

Referring to FIG. 47, the electronic device 100 may time-sequentially display, on a display 4701, messages received from another electronic device, and messages transmitted to the other electronic device. A reference numeral 4703 of FIG. 47 indicates a virtual screen that shows magnified and extended view of messages displayed on the display 4701. Only a portion of the virtual screen 4703 is displayed on the display 4701. That is, when the electronic device 100 time-sequentially displays the messages, the electronic device 100 may display a previously-displayed message on an upper area of the display 4701, and the time-sequentially displayed messages may be shown on the display 4701 while being scrolled.

While the electronic device 100 continuously monitors content of conversation between users, the electronic device 100 may separately indicate or may separately mark a keyword included in the messages, and may maintain the indication or the mark for a preset time period. The electronic device 100 may extract at least one keyword from the messages, and may determine a query of a search service, based on the extracted at least one keyword and context information of the user. The electronic device 100 may extract the at least one keyword by performing a natural language analysis on contents of the messages. The electronic device 100 may extract a keyword by using a previous message and a current message displayed on the display 4701. Also, the electronic device 100 may use the extracted keyword as a query of the search service, or may deduce another keyword from the extracted keyword and may use the deduced keyword as a query of the search service.

The display 4701 may differently mark the keyword to be distinguishable from other contents of the displayed messages, wherein the keyword is used in determining the query.

On the virtual screen 4703 of FIG. 47, keywords 4711, 4713, 4715, 4717, and 4719 of communication messages are marked to be distinguishable from other contents of the communication messages. The keyword may be differently (or distinguishably) marked from other contents for a preset time period, e.g., for one hour. That is, the keyword that is differently marked may return to its originally-displayed state after an elapse of the preset time period. The keyword may return to its originally-displayed state after one hour, and may be equally displayed as the other contents. Alternatively, a time period during which the keyword is differently marked from the other contents may be determined, according to a user input. For example, if a user sets two hours as the time period during which the keyword is differently marked from the other contents of the communication messages, the keyword may be differently marked from the other contents for two hours.

Figure 48:
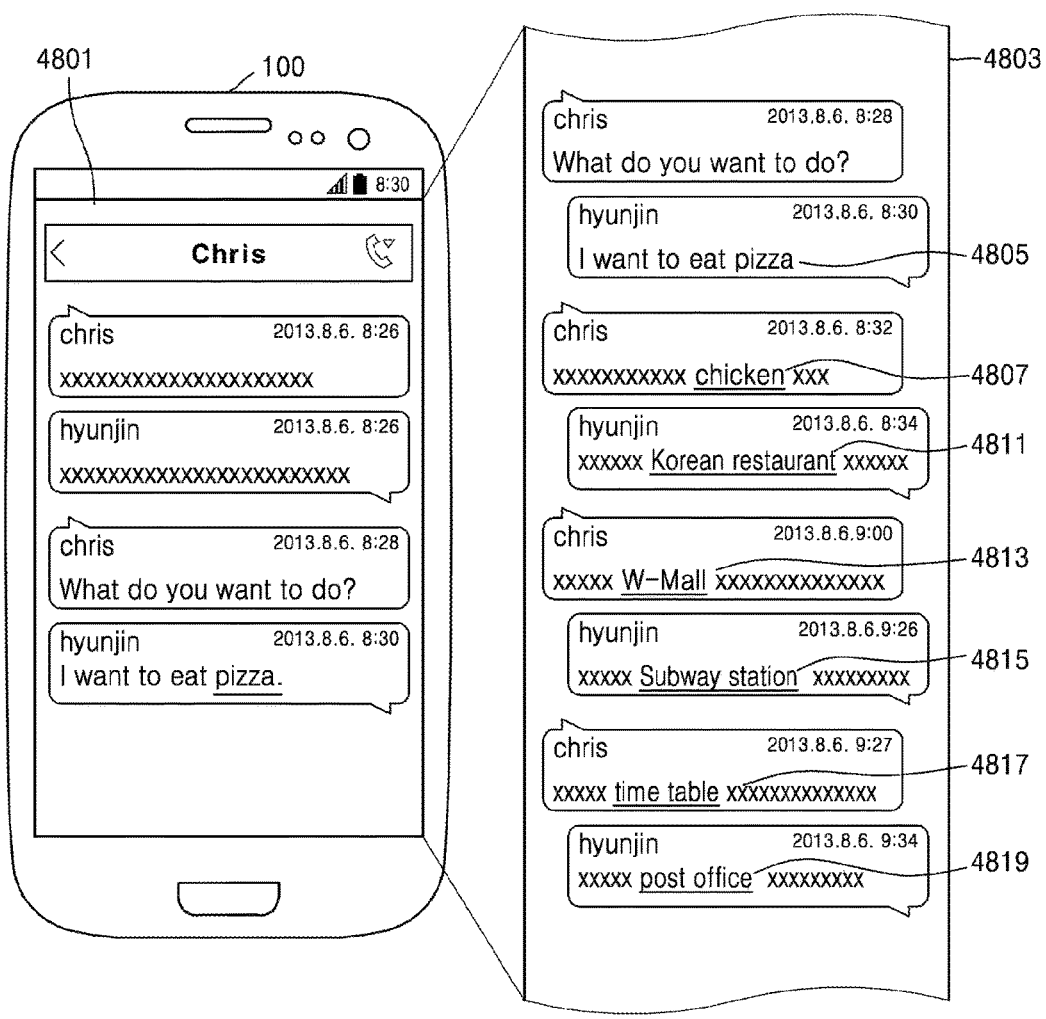

Referring to FIG. 48, the electronic device 100 may time-sequentially display, on a display 4801, messages received from another electronic device, and messages transmitted to the other electronic device. A reference numeral 4803 of FIG. 48 indicates a virtual screen that shows a magnified and extended view of messages displayed on the display 4801. Only a portion of the virtual screen 4803 is displayed on the display 4801. That is, when the electronic device 100 time-sequentially displays the messages, the electronic device 100 may display a previously-displayed message on an upper area of the display 4801, and the time-sequentially displayed messages may be shown on the display 4801 while being scrolled.

While the electronic device 100 continuously monitors content of conversation between users, the electronic device 100 may separately indicate or may separately mark a keyword included in the messages on the display 4801, and may maintain the indication or the mark for a preset time period. The electronic device 100 may extract at least one keyword by using one or more keywords included in the messages, and may determine a query of a search service, based on the extracted at least one keyword and context information of the user. The electronic device 100 may extract the at least one keyword by performing a natural language analysis on contents of the messages. The electronic device 100 may extract a keyword by using a previous message and a current message displayed on the display 4801. Also, the electronic device 100 may use the extracted keyword as a query of the search service, or may deduce another keyword from the extracted keyword and may use the deduced keyword as a query of the search service.

The display 4801 may differently mark the keyword to be distinguishable from other contents of the displayed messages, wherein the keyword is used in determining the query.

On the virtual screen 4803 of FIG. 48, keywords 4811, 4813, 4815, 4817, and 4819 of communication messages are differently marked from other contents of the communication messages. The keyword may be differently marked from other contents for a preset time period, e.g., for one hour. The keyword may return to its originally-displayed state after one hour, and may be equally displayed as the other contents. A keyword 4805 (corresponding to the keyword 4711 in FIG. 47) may be differently marked from other contents in FIG. 47, but after one hour, the keyword 4805 returns to its originally-displayed state and thus is equally displayed as the other contents. On the other hand, keywords 4817 and 4819 that are newly added, compared to FIG. 47, may be differently marked from the other contents.

Figure 49:
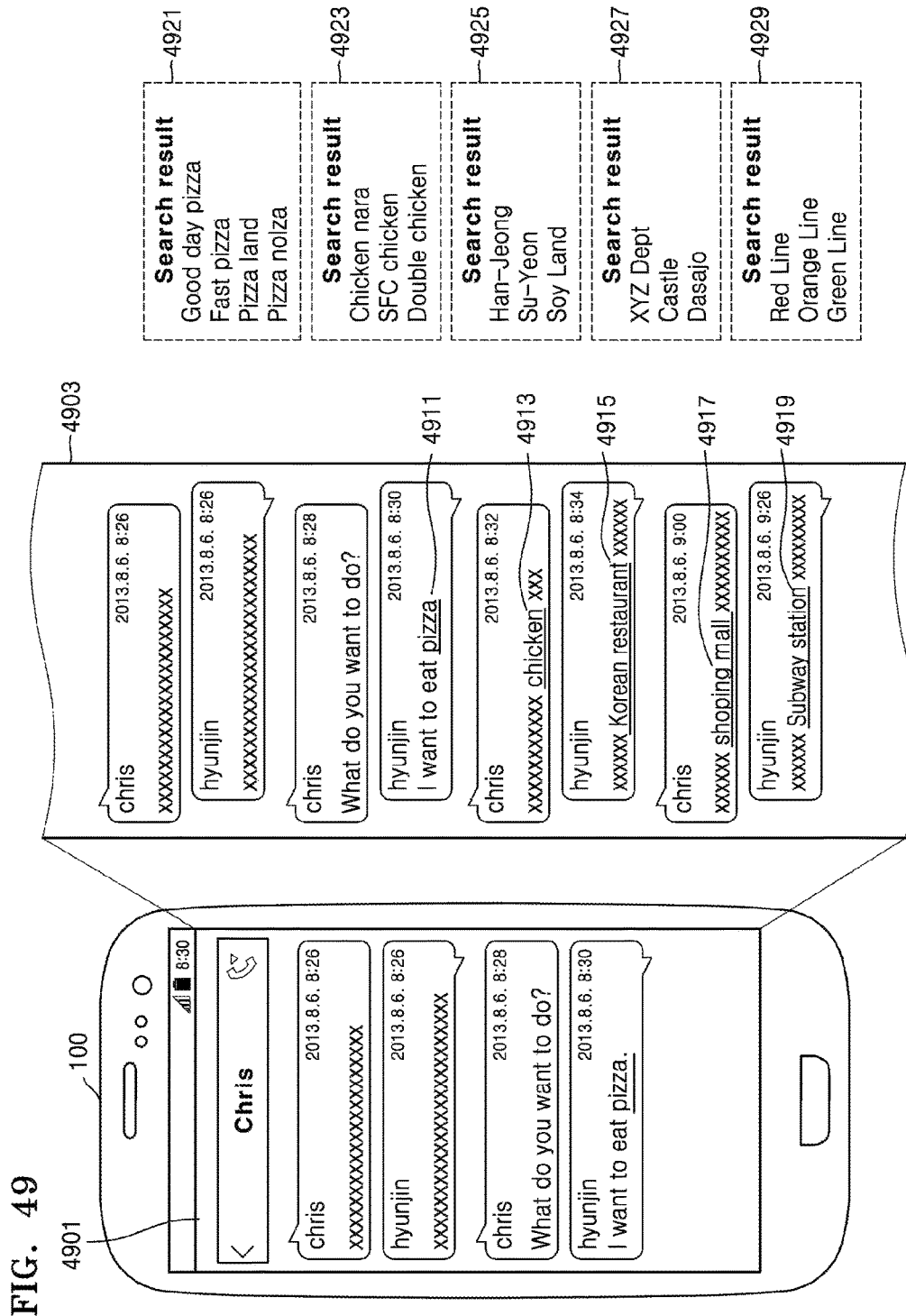

Referring to FIG. 49, the electronic device 100 may time-sequentially display, on a display 4901, messages received from another electronic device, and messages transmitted to the other electronic device. A reference numeral 4903 of FIG. 49 indicates a virtual screen that shows a magnified and extended view of messages displayed on the display 4901. Only a portion of the virtual screen 4903 is displayed on the display 4901. That is, when the electronic device 100 time-sequentially displays the messages, the electronic device 100 may display a previously-displayed message on an upper area of the display 4901, and the time-sequentially displayed messages may be shown on the display 4901 while being scrolled.

While the electronic device 100 continuously monitors content of conversation between users, the electronic device 100 may separately indicate or may separately mark a keyword included in the messages on the display 4901, and may maintain the indication or the mark for a preset time period. The electronic device 100 may extract at least one keyword by using one or more keywords included in the messages, and may determine a query of a search service, based on the extracted at least one keyword and context information of the user. The electronic device 100 may extract the at least one keyword by performing a natural language analysis on contents of the messages. The electronic device 100 may extract a keyword by using a previous message and a current message displayed on the display 4901. Also, the electronic device 100 may use the extracted keyword as a query of the search service, or may deduce another keyword from the extracted keyword and may use the deduced keyword as a query of the search service.

The display 4901 may differently mark the keyword to distinguish the keyword different from other contents of the displayed messages, wherein the keyword is used in determining the query.

On the virtual screen 4903 of FIG. 49, keywords 4911, 4913, 4915, 4917, and 4919 of communication messages are differently marked from other contents of the communication messages. The keyword may be differently marked from other contents for a preset time period, e.g., for one hour.

The keyword may return to its originally-displayed state after one hour, and may be equally displayed as the other contents.

The electronic device 100 may determine the query by using the extracted or deduced keyword and the context information of the user, and may perform a search operation. The context information of the user may include location information of the user, communication history information of the user, and search log information of the user. Also, the context information of the user may include, but is not limited to, at least one of peripheral environment information of the electronic device 100 of the user, state information of the electronic device 100 of the user, state information of the user, and schedule information of the user.

The peripheral environment information of the electronic device 100 indicates information about an environment within a preset radius from the electronic device 100, and may include, but is not limited to, weather information, temperature information, humidity information, illumination information, noise information, and sound information.

The state information of the electronic device 100 may include, but is not limited to, information about a mode of the electronic device 100 (e.g., a sound mode, a vibration mode, a silent mode, a power-saving mode, a blocking mode, a multiwindows mode, an automatic rotation mode, etc.), location information of the electronic device 100, time information of the electronic device 100, communication module activation information (e.g., Wi-Fi ON/Bluetooth OFF/GPS ON/NFC ON, etc.), network access state information of the electronic device 100, and information (e.g. ID information of the application, a type of the application, a use time of the application, a use period of the application, etc.) about at least one application executed in the electronic device 100.

The state information of the user may indicate information about movement of the user, a life pattern of the user, or the like, and may include, but is not limited to, information about a walking state of the user, an exercising state of the user, a driving state of the user, a sleeping state of the user, and a mood of the user.

When the query is determined, the electronic device 100 may perform the search operation without a user input, and may temporally or permanently store a search result in a memory of the electronic device 100. The search result may be displayed on the display 4901 according to a request by the user, or may be displayed on a preset area of the display 4901, regardless of a request by the user.

The electronic device 100 may extract the keywords 4911, 4913, 4915, 4917, and 4919, may perform search operations by using the extracted keywords 4911, 4913, 4915, 4917, and 4919 and the context information of the user, and may temporally or permanently store search results 4921, 4923, 4925, 4927, and 4929 in the memory. For example, the electronic device 100 may perform the search operation, based on the extracted keyword 4911 and the location information of the user, and may store the search result 4921 in the memory. Here, the search result 4921 may not be displayed on the display 4901. Alternatively, the search result 4921 may be displayed on the display 4901, according to a user input. Alternatively, the search result 4921 may be displayed on a preset area of the display 4901, regardless of a user input.

The electronic device 100 may perform the search operation, based on the extracted keyword 4911 and the location information of the user, and may store the search result 4921 in the memory. Here, the search result 4921 may not be displayed on the display 4901. Alternatively, the search result 4921 may be displayed on the display 4901, according to a request by the user. Alternatively, the search result 4921 may be displayed on a preset area of the display 4901, regardless of a request by the user.

The electronic device 100 may perform the search operation, based on the extracted keyword 4913, the location information of the user, and the time information, and may store the search result 4923 in the memory. The search result 4923 may be filtered, in consideration of a location close to a current location of the user, and a current time. Here, the search result 4923 may not be displayed on the display 4901. Alternatively, the search result 4923 may be displayed on the display 4901, according to a request by the user. Alternatively, the search result 4923 may be displayed on a preset area of the display 4901, regardless of a request by the user.

The electronic device 100 may perform the search operations, based on the extracted keywords 4915, 4917, and 4919, a location of the user, and history information of the user, and may store the search results 4925, 4927, and 4929 in the memory. The search results 4925, 4927, and 4929 may be filtered, in consideration of a location close to a current location of the user, and the history information (e.g., a frequently visited restaurant, a shopping mall, a subway station, etc.). Here, the search results 4925, 4927, and 4929 may not be displayed on the display 4901. Alternatively, the search results 4925, 4927, and 4929 may be displayed on the display 4901, according to a request by the user. Alternatively, the search results 4925, 4927, and 4929 may be displayed on a preset area of the display 4901, regardless of a request by the user.

Figure 50:
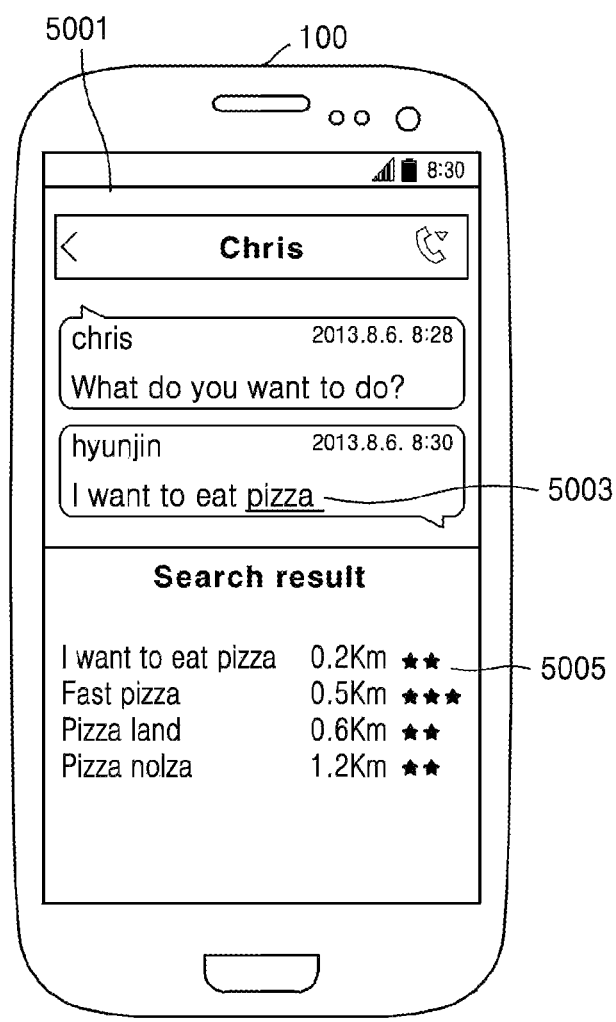

Referring to FIG. 50, the electronic device 100 may time-sequentially display, on a display 5001, messages received from another electronic device, and messages transmitted to the other electronic device. Also, the electronic device 100 may display a search result 5005 on the display 5001 while the messages are displayed.

When the electronic device 100 time-sequentially displays the messages, the electronic device 100 may display the messages by scrolling upward a previously-displayed message.

While the electronic device 100 continuously monitors content of conversation between users, the electronic device 100 may separately indicate or may separately mark a keyword included in the messages, and may maintain the indication or the mark for a preset time period. The electronic device 100 may extract at least one keyword 5003 by using the messages, and may determine a query of a search service, based on the keyword 5003 and context information of the user. The context information of the user may include location information of the user, communication history information of the user, and search log information of the user.

The electronic device 100 may extract the keyword 5003 by performing a natural language analysis on contents of the messages. The electronic device 100 may extract the keyword 5003 by using a previous message and a current message displayed on the display 5001.

The display 5001 may differently mark the keyword 5003 to distinguish the keyword 5003 from other contents of the displayed messages, wherein the keyword 5003 is used in determining the query.

The keyword 5003 may be differently marked from the other contents for a preset time period, e.g., for one hour. The keyword 5003 may return to its originally-displayed state after one hour, and may be equally displayed as the other contents.

The electronic device 100 may determine the query by using the keyword 5003 and context information of the user, and may perform a search operation. The context information of the user may include location information of the user, communication history information of the user, search log information of the user, and sensing information of the electronic device 100.

When the query is determined, the electronic device 100 may perform the search operation without a user input, and may temporally or permanently store the search result in the memory. The search result may be displayed on a preset area 5005 of the display 5001 according to a request by the user, or may be displayed on the preset area 5005 of the display 5001, regardless of a request by the user.

The search result may include distances from a current location of the user, and recommendation rankings.

The electronic device 100 may receive a user input of selecting a keyword, may perform a search operation, and may display a search result on the preset area 5005 of the display 5001.

At least one of the components, elements or units represented by a block as illustrated in the above diagrams may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Functional aspects of the above exemplary embodiments may be implemented in algorithms that are executed by one or more processors and stored in a computer readable recording medium. Furthermore, the components, elements or units represented by a block or processing steps may employ any number of related art techniques for electronics configuration, signal processing and/or control, data processing and the like.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electronic apparatus comprising:
a display; and
a processor configured to:
control the display to display a first window of a first application, the first window displaying one or more textual messages exchanged between the electronic apparatus and an external electronic apparatus,
analyze the one or more textual messages to extract a keyword for a search query from the one or more textual messages,
visually differentiate the keyword from other words in the one or more textual messages on the first window,
in response to receiving a selection of the keyword from a user, display a user interface of the search query together with the first window, the user interface of the search query comprising a candidate list that provides selectable candidate search queries that are associated with the selected keyword,
in response to receiving a selection of a candidate search query from the user among the candidate search queries in the candidate list, transmit a search request based on the selected candidate search query to a search server, and
control the display to display a second window of a second application together with the first window of the first application, the second window displaying a search result, responsive to the search request based on the selected candidate search query, received from the search server,
wherein the search result comprises a user interface of a search engine to which the selected candidate search query is inputted, and
wherein the search result is displayed with an object indicating a user name of the external electronic apparatus, which exchanges the one or more textual messages with the electronic apparatus, the object being used to return to display of the first application.

2. The electronic apparatus of claim 1, wherein the processor is further configured to control the display to display a graphical user interface (GUI), the GUI configured to receive the selection from the user.

3. The electronic apparatus of claim 1, wherein the processor is further configured to receive the search result via at least one from among a search application that is installed in the electronic apparatus and an Internet search service.

4. The electronic apparatus of claim 3, wherein the processor is further configured to execute the search application, and to transmit the search request to the search server by inputting the selected candidate search query to the search application.

5. The electronic apparatus of claim 1, wherein the processor is further configured to control the display a graphical user interface (GUI), the GUI configured to receive a user input to select the keyword, and to control the display to display a query editing window for editing the selected candidate search query, according to the user input.

6. The electronic apparatus of claim 5, wherein the processor is further configured to control the display to display the selected candidate search query via the query editing window, and to receive a user input to edit the selected candidate search query that is displayed on the query editing window.

7. The electronic apparatus of claim 6, wherein the processor is further configured to obtain the search result by using the edited search query.

8. The electronic apparatus of claim 1, wherein the processor is further configured to obtain at least one of location information of the electronic apparatus measured by using a global positioning system (GPS) processor included in the electronic apparatus and location information of the electronic apparatus extracted from the one or more textual messages.

9. The electronic apparatus of claim 8, wherein the candidate search queries comprise the extracted keyword and at least one other keyword, the at least one other keyword being determined by prioritizing use of the location information extracted from the one or more textual messages over use of the location information obtained by using the GPS processor.

10. The electronic apparatus of claim 1, wherein the candidate search queries comprise the extracted keyword and at least one other keyword, the at least one other keyword being determined based on user information associated with the electronic apparatus.

11. A method of providing information in an electronic apparatus, the method comprising:
  displaying a first window of a first application, the first window displaying one or more textual messages exchanged between the electronic apparatus and an external electronic apparatus, on a display of the electronic apparatus;
  analyzing the one or more textual messages to extract a keyword for a search query from one or more messages;
  visually differentiating the keyword from other words in the one or more textual messages on the first window;
  in response to receiving a selection of the keyword from a user, displaying a user interface of the search query together with the first window, the user interface of the search query comprising a candidate list that provides selectable candidate search queries that are associated with the selected keyword;
  in response to receiving a selection of a candidate search query from the user among the candidate search queries in the candidate list, transmitting a search request based on the selected candidate search query to a search server; and
  displaying, on the display of the electronic apparatus, a second window of a second application together with the first window of the first application, the second window displaying a search result, responsive to the search request based on the selected candidate search query, received from the search server,
  wherein the search result comprises a user interface of a search engine to which the selected candidate search query is inputted, and
  wherein the search result is displayed with an object indicating a user name of the external electronic apparatus which exchanges the one or more textual messages with the electronic apparatus, the object being used to return to display of the first application.

12. The method of claim 11, further comprising:
  displaying a graphical user interface (GUI) configured to receive the selection from the user.

13. The method of claim 11, further comprising:
  receiving the search result via at least one from among a search application that is installed in the electronic apparatus and an Internet search service.

14. The method of claim 13, further comprising:
  executing the search application, and transmitting the search request to the search server by inputting the selected candidate search query to the search application.

15. The method of claim 11, further comprising:
  receiving a user input to select the keyword; and
  displaying a query editing window to edit the selected candidate search query, according to the user input.

16. The method of claim 15, further comprising:
  displaying the selected candidate search query via the query editing window; and
  receiving a user input to edit the selected candidate search query that is displayed on the query editing window.

17. The method of claim 16, wherein the search result is searched by the search server based on the edited search query.

18. The method of claim 11, wherein the candidate search queries comprise the extracted keyword and at least one other keyword, the method further comprising:
  determining the at least one other keyword based on a location of the electronic apparatus, and
  obtaining at least one of location information of the electronic apparatus measured by using a global positioning system (GPS) processor included in the electronic apparatus and location information from the one or more textual messages.

19. The method of claim 18, wherein the determining comprises determining the at least one other keyword by prioritizing use of the location information extracted from the one or more textual messages over use of the location information obtained by using the GPS processor.

20. The method of claim 11, wherein the candidate search queries comprise the extracted keyword and at least one other keyword, the at least one other keyword being determined based on user information associated with the electronic apparatus.

21. At least one non-transitory computer-readable recording medium for storing a computer program, which, when executed by a computer, causes the computer to execute the method of claim 11.

* * * * *